United States Patent
Oka et al.

(10) Patent No.: US 7,623,236 B2
(45) Date of Patent: *Nov. 24, 2009

(54) SPECTROSCOPIC POLARIMETRY

(75) Inventors: Kazuhiko Oka, Sapporo (JP); Atsushi Taniguchi, Sapporo (JP); Hiroshi Okabe, Kyoto (JP)

(73) Assignees: National University Corporation Hokkaido University, Sapporo-Shi (JP); OMRON Corporation, Kyoto-Shi (JP)

( * ) Notice: Subject to any disclaimer, the term of this patent is extended or adjusted under 35 U.S.C. 154(b) by 313 days.

This patent is subject to a terminal disclaimer.

(21) Appl. No.: 11/329,389

(22) Filed: Jan. 11, 2006

(65) Prior Publication Data

US 2006/0170921 A1     Aug. 3, 2006

(30) Foreign Application Priority Data

Jan. 21, 2005 (JP) ............................ P2005-014304
Jul. 29, 2005 (JP) ............................ P2005-221819

(51) Int. Cl.
*G01J 4/00* (2006.01)
(52) U.S. Cl. .......................... 356/364; 356/369; 702/40; 702/85; 702/135
(58) Field of Classification Search ......... 356/364–369; 702/40, 85–87, 135
See application file for complete search history.

(56) References Cited

U.S. PATENT DOCUMENTS 7,336,360 B2 *  2/2008  Oka et al. .................... 356/367

OTHER PUBLICATIONS

Kim, E., et.al. "Polarization based microscopy using a fiber optic spectral polarimeter", Proceedings of the SPIE—The International Society for Optical Engineering SPIE-INT. SOC. OPT. ENG USA, vol. 4617, pp. 191-199 (2002).
Oka, K., et. al., "Spectroscopic Polarimetry with a channeled spectrum", Optics Letters, Optical Society of America, Washington, DC, USA, vol. 24, No. 21, pp. 1475-1477 (Nov. 1999).
Oka, K., et. al., "Singleshot spectroscopic polarimetry using channeled spectrum", Proceedings of the SPIE—The International Society for Optical Engineering SPIE-INT. SOC. OPT. ENG USA, vol. 4919, pp. 167-175 (2002).
Sabatke D.S., et. al., "Linear calibration and reconstruction techniques for channeled spectropolarimetry", Optics Express, Optical Society of America, vol. 11, No. 22, Abstract. pp. 2946-2947, (Nov. 2003).
Kato et al., "Measurement of Spectral Distribution of Polarized Light Based on Frequency Region Interference Method," Preliminary Manuscript Collection for 34th Academic Lecture Meeting of Hokkaido Branch of Japan Society of Applied Physics, p. 41, 1998.

* cited by examiner

*Primary Examiner*—Gregory J Toatley, Jr.
*Assistant Examiner*—Iyabo S Alli
(74) *Attorney, Agent, or Firm*—Foley & Lardner LLP

(57) ABSTRACT

To effectively reduce a measurement error in a parameter indicating a state of spectroscopic polarization generated by variations in retardation of a retarder due to a temperature change or other factors, while holding a variety of properties of a channeled spectroscopic polarimeter. By noting that reference phase functions $\phi_1(\sigma)$ and $\phi_2(\sigma)$ are obtained by solving an equation from each vibration component contained in a channeled spectrum $P(\sigma)$, the reference phase functions $\phi_1(\sigma)$ and $\phi_2(\sigma)$ are calibrated concurrently with measurement of spectrometric Stokes parameters $S_0(\sigma)$, $S_1(\sigma)$, $S_2(\sigma)$, and $S_3(\sigma)$.

17 Claims, 26 Drawing Sheets

SPECTROSCOPIC POLARIMETRY

BACKGROUND OF THE INVENTION

1. Field of the Invention

The present invention relates to a spectroscopic polarimetry in which, and a spectroscopic polarimeter with which, a state of spectral polarization of light under measurement is measured by the use of a channeled spectrum.

2. Description of Related Art

Light has properties of a "transverse wave". Based upon the premise of three mutually orthogonal axes (x, y, z), when a propagation direction of light is assumed to be the z-axis direction, a vibration direction of the light is a direction along the x-y flat face. The vibration direction of the light within the x-y flat face has a bias. This bias of light is referred to as "polarization". A biased state of light is referred to as a "state of polarization (SOP)" in this specification. Typically, the SOP varies depending upon wavelengths (colors) of light.

When light in some state of polarization is incident on an object under measurement to acquire emitted light such as transparent or reflected light and the object under measurement has optical anisotropy, a change in SOP is observed between incident light and emitting light. Acquiring information on anisotropy of the object under measurement from the change in SOP is referred to as "polarimetry". It is to be noted that causes of such anisotropy may include anisotropy of a molecular structure, presence of stress (pressure), and presence of a local field and a magnetic field.

A measurement in which a change in SOP between the incident light and the emitted light is obtained with respect to each wavelength and information on anisotropy of an object under measurement is then acquired is especially referred to as "spectroscopic polarimetry". This spectroscopic polarimetry has an advantage of acquiring a great amount of information as compared to the case of measurement by the use of a single wavelength (single color). In the spectroscopic polarimetry, a device for measuring an SOP of emitted light (occasionally, incident light), namely a spectroscopic polarimeter, is a key device.

As fields of application of the spectroscopic polarimetry known are the field of spectrometric ellipsometry, the medical field, the optical communication field, and the like. In the field of spectrometric ellipsometry, for example, since thickness as well as a complex refractive index of a thin film can be measured in a nondestructive and non-contact manner, spectrometric ellipsometry has been applied to optical electronic devices, analyses/examination of semiconductors, and the like. In the medical field, an attempt has been made for early detection of glaucoma or a cancer cell since several kinds of cells have polarization properties. In the optical communication field, an attempt has been made to accurately evaluate polarization mode dispersion of communication devices, such as optical fibers, for the purpose of achieving high-capacity communication by the use of wavelength division multiplexing, or some other attempts have also been made.

Incidentally, assuming that light traveling in the z-axis direction exists, polarized light in a state where a vibration component in the x-axis direction is perfectly correlated (synchronized) with a vibration component in the y-axis direction is classified into three types: linearly polarized light, elliptically polarized light, and circularly polarized light. Parameters for expressing a state of elliptically polarized light are: $\epsilon$ for an ellipticity angle, $\theta$ for an azimuth angle, $\Delta$ for a phase difference, and $\psi$ for an amplitude ratio angle.

Further, parameters for effectively expressing a degree of polarization of light, the ellipticity angle, the azimuth angle and the like, Stokes Parameters are used. The Stokes Parameters are composed of four parameters having definitions as follows:

$S_0$: total intensity
$S_1$: difference between intensities of linear polarized components with angles of 0° and 90°.
$S_2$: difference between intensities of linear polarized components with angles ±45°.
$S_3$: difference between intensities of left and right circularly polarized light components.

In a third-dimensional space where the three mutually orthogonal axes are taken as $S_1$, $S_2$ and $S_3$, assuming a sphere with a radius $S_0$ and an original point of the axes taken as a center, an SOP of arbitrary light is expressed as one point in this third-dimensional space and a degree of polarization is expressed by the following expression:

$$\text{Degree of polarization} = (\text{distance from original point to}$$
$$\text{point } (S_1, S_2, S_3)/S_0$$
$$= (S_1^2 + S_2^2 + S_3^2)^{1/2}/S_0$$

It may be understood from the above that in the case of a perfectly polarized light (degree of polarization=1), one point expressing the SOP exists in the sphere with a radius $S_0$. Further, the ellipticity angle and the azimuth angle respectively correspond to halves of a latitude and a longitude of the one point expressing the SOP in the above third-dimensional space. As thus described, it is possible to express all information on the SOP if the four parameters $S_1$, $S_2$, $S_3$ and $S_0$ of the Stokes Parameters can be obtained.

As conventionally prevailing spectroscopic polarimetries, a rotating-retarder polarimetry and a polarization-modulation polarimetry are known.

In the rotating-retarder polarimetry, a retarder and an analyzer intervene in sequence in a channel for light under measurement toward a spectrometer. Here, the retarder is an optical element having two principal axes (fast axis and slow axis) in mutually orthogonal directions, and is also configured to change a phase difference between the two principal axes before and after passage of light. Further, the analyzer is an optical element having one principal axis and also is configured to allow transmission of only one linearly polarized light component corresponding to the direction of the principal axis.

In this rotating-retarder polarimetry, for obtaining wavelength distributions of the four Stokes Parameters independently, it is necessary to physically rotate a retarder itself and perform a spectrum measurement each for at least four kinds of directions. Namely, the Stokes Parameters of incident light are expressed as functions $S_0(\lambda)$, $S_1(\lambda)$, $S_2(\lambda)$, and $S_3(\lambda)$.

In the polarization-modulation polarimetry, two retarders (first retarder and second retarder) capable of electrically controlling a phase difference and one analyzer intervene in sequence in a channel for light under measurement toward a spectrometer. Among such retarders used are an electro-optic modulator, a liquid crystal and a photoelastic modulator. For example, a phase difference of 45° is set between the principal axes of the first retarder and the second retarder.

Also in this polarization-modulation polarimetry, for obtaining wavelength distributions of the four Stokes Parameters independently, it is necessary to vibrate, by electric control, a phase difference between the first retarder and the second retarder in a predetermined angle range to obtain a plurality of spectrums.

However, concerning the conventional general spectroscopic polarimetry typified by the rotating-retarder polarimetry and the polarization-modulation polarimetry, the following problems have been pointed out.

(1) First Problem

Since a mechanical or active polarization controlling element is required, there are problems including that: [1] a problem of vibration, heat generation and the like are unavoidable; [2] the degree of size reduction is limited due to necessity for a mechanical element and the like to have some capacity; [3] a driving device for consuming electric power is essential; and [4] maintenance is necessary and complex.

(2) Second Problem

Since it is necessary to repeatedly measure a plurality of spectrums while changing conditions of the polarization modulating (controlling) element, there are problems including that: [1] measurement takes relatively long; and [2] an object under measurement needs to be kept stable during measurement.

In order to solve the above problems with the conventional general spectroscopic polarimetry, the present inventors and the like developed, in advance, a "channeled spectroscopic polarimetry".

A configuration view of an experiment system for explaining the channeled spectroscopic polarimetry is shown in FIG. 20. As apparent from this figure, white light emitted from a xenon lamp 1 is transmitted through a polarizer 2 and a Babinet-Soleil compensator 3, to obtain a light wave having an SOP depending upon a frequency v. Spectral distributions $S_0(v)$, $S_1(v)$, $S_2(v)$ and $S_3(v)$ of the Stokes parameters of the light wave are obtained by a measurement system 4 surrounded with a wavy line.

Light under measurement is first transmitted through two retarders $R_1$ and $R_2$ having different thicknesses (d1, d2) and an analyzer A, and then incident on a spectrometer 5. Here, the slow axis of the retarder $R_2$ is inclined at an angle of 45° with respect to the slow axis of the retarder $R_1$, while a transmission axis of the analyzer A is arranged in parallel to the slow axis of the retarder $R_1$.

In each of the two retarders $R_1$ and $R_2$, a phase difference created between the orthogonal polarized light components depends upon a frequency. Hence, as shown in FIG. 21, a channeled spectrum including three carrier components is obtained from the spectrometer 5 which functions as an optical spectrum analyzer. An amplitude and a phase of each of the carrier components are modulated by the spectrum distribution of the Stokes Parameters of the light under measurement. It is therefore possible to obtain each of the Stokes Parameters by execution of a signal processing with a computer 6 by the use of Fourier transformation.

One example of results of an experiment is shown in FIG. 22. This is a result obtained in the case of inclining the Babinet-Soleil compensator 3 at an angle of 30° with respect to the slow axis of the retarder $R_1$. Three solid lines respectively show spectral distributions $S_1(v)/S_0(v)$, $S_2(v)/S_0(v)$, $S_3(v)/S_0(v)$ of the standardized Stokes parameters. It is thereby understood that an SOP depends upon a frequency.

As thus described, according to the channeled spectroscopic polarimetry, it is possible to obtain each spectrally-resolved Stokes Parameter by a frequency analysis (or wavenumber analysis) of properties of spectral intensity. It is reasonably necessary to obtain respective retardations of the two retarders $S_1$ and $S_2$ prior to the frequency analysis. Here, retardation means a phase difference created between a fast axis component and a slow axis component.

Other conventional channeled spectroscopic polarimetries are described in some other documents (cf. Patent Document 1 and Non-patent Document 1).

According to the foregoing channeled spectroscopic polarimetry, advantages can be obtained including that: [1] a mechanically movable element such as a rotating retarder is unnecessary; [2] an active element such as an electro-optic modulator is unnecessary; [3] four Stokes Parameters stop all at once with one spectrum so that a so-called snap shot measurement can be performed; and [4] the configuration is simple, and thus suitable for size reduction.

[Patent Document 1] U.S. Pat. No. 6,490,043

[Non-patent Document 1] "Measurement of spectral distribution of polarized light based on frequency region interference method", written by Takayuki Kato, Kazuhiko Oka, Tetsu Tanaka, Yoshihiro Ohtsuka, preliminary manuscript collection for 34th Academic Lecture Meeting of Hokkaido Branch of Japan Society of Applied Physics, (Hokkaido Branch of Japan Society of Applied Physics, Sapporo, 1998) p. 41

However, concerning the foregoing channeled spectroscopic polarimetry, a problem of generation of a relatively large measurement error has been pointed out for the following reasons.

(1) Variations (Fluctuations) in Retardation of retarders $R_1$, $R_2$

Retardation of the retarder varies sensitively due to a temperature or pressure change, resulting in that the phase of the channeled spectrum varies due to the temperature or pressure change, as shown in FIG. 23. Consequently, as shown in FIG. 24, the temperature or pressure change causes generation of an error in a measured value of the Stokes parameter obtained from the channeled spectrum.

(2) Variations (Fluctuations) in Wavelength Axis of Spectrometer

In a normal type spectrometer such as one that rotates a diffraction grating with a motor, backlash of the motor or the like causes displacement of a wavelength to be sampled by small degree (at random) in every measurement. When the wavelength to be sampled is displaced in the spectrometer as shown in FIG. 25, a state is generated which is equivalent to a case where retardation of a retarder varies, resulting in generation of an error in a measured value of the Stokes parameter obtained from the channeled spectrum.

Incidentally, for example in ellipsometry, accuracy required in a wavenumber-distribution of an ellipsometry parameter is considered to be an error in the order of not larger than 0.1°. When this accuracy is to be realized by stabilizing retardation of a retarder, it is necessary to keep variations in temperature of the retarder at or under 0.5° C.

However, it requires a large-sized temperature compensating device such as a heater or a cooler for the temperature stabilization, which unfavorably causes a loss of advantages (size reduction, non-inclusion of an active element, etc.) of the channeled spectroscopic polarimetry. Hence it is practically difficult to reduce a measurement error by stabilizing retardation of a retarder.

Further, reduction of backlash of the spectrometer to a satisfactory value requires extremely high process accuracy or assembly accuracy, thereby leading to an expensive spectrometer. Hence it is practically difficult to reduce a measurement error by stabilizing a wavelength axis of a spectrometer.

SUMMARY OF THE INVENTION

The present invention was made by noting the problems of the conventional channeled spectroscopic polarimetry. It is an object of the present invention to provide a channeled spectroscopic polarimetry and spectroscopic polarimeter which are capable of measurement with higher accuracy, while holding the advantages thereof including that: a mechanically movable element such as a rotating retarder is unnecessary; an active element such as an electro-optic modulator is unnecessary; four Stokes Parameters stop all at once with one spectrum so that a so-called snap shot measurement can be performed; and the configuration is simple, and thus suitable for size reduction.

Further objects and working effects of the present invention are readily understood by the skilled in the art by referring to the following description of the specification.

(1) A spectroscopic polarimetry of the present invention comprises: a step of preparing a polarimetric spectroscope, a step of obtaining a spectral intensity, and an arithmetic step.

A polarimetric spectroscope prepared in the step of preparing a polarimetric spectroscope is one where a first retarder, a second retarder and an analyzer, through which light under measurement passes in sequence, and a means of obtaining a spectral intensity of the light having passed through the analyzer are provided, the second retarder is arranged such that the direction of a principal axis of the second retarder disagrees with the direction of a principal axis of the first retarder, and the analyzer is arranged such that the direction of a transmission axis of the analyzer disagrees with the direction of the principal axis of the second retarder.

In the step of obtaining a spectral intensity, the light under measurement is launched into the polarimetric spectroscope to obtain a spectral intensity.

In the arithmetic step, by the use of the obtained spectral intensity, a set of phase attribute functions of a measurement system is obtained, and also a parameter is obtained which indicates a wavenumber-distribution of an SOP of the light under measurement. Here, the set of phase attribute functions is a set of functions defined by properties of the polarimetric spectroscope, and includes a function depending upon at least a first reference phase function ($\phi_1(\sigma)$) as retardation of the first retarder and a function depending upon at least a second reference phase function ($\phi_2(\sigma)$) as retardation of the second retarder, and by those functions themselves, or by addition of another function defined by the properties of the polarimetric spectroscope, the set of phase attribute functions becomes a set of functions sufficient to determine a parameter indicating a wavenumber-distribution of the SOP of the light under measurement.

The "spectral intensity" obtained by the polarimetric spectroscope in the present specification is also referred to as a channeled spectrum.

There may be a case where a spectrometer is used as the "means of obtaining a spectral intensity". Or in a case where a light source is prepared and light is emitted from this light source onto a sample so as to be light under measurement, the light source and a photo-receptor may be used in combination to scan a wavelength as the "means of obtaining a spectral intensity". The photo-receptor in this case may be any type so long as being capable of detecting a light-receiving amount, and the timing for detecting a light-receiving amount is corresponded to the wavelength of light.

"Obtaining a parameter indicating a wavenumber-distribution of an SOP" includes obtaining all or part of four spectrally-resolved Stokes parameters, namely, $S_0(\sigma)$ for expressing a total intensity, $S_1(\sigma)$ for expressing a difference between intensities of linear polarized components with angles of 0° and 90°, $S_2(\sigma)$ for expressing a difference between intensities of linear polarized components with angles ±45, and $S_3(\sigma)$ for expressing a difference between intensities of the left-hand and right-hand circularly polarized light components. While whether all the spectrally-resolved Stokes parameters are obtained or not is left to a person executing this step, all the spectrally-resolved Stokes parameters can be obtained in principle according to the present invention.

Further, "obtaining a parameter indicating a wavenumber-distribution of an SOP" includes the case of obtaining a parameter equivalent to the spectrally-resolved Stokes parameter. For example, a set of parameters of a light intensity, a degree of polarization, an ellipticity angle and an azimuth angle, or a set of parameters of a light intensity, a degree of polarization, a phase difference, and an amplitude ratio angle, is equivalent to the spectrally-resolved Stokes parameters. While all of these parameters can be obtained in principle according to the present invention, the above-mentioned obtainment of a parameter also includes a case where part of the parameters is obtained by selection of a person executing the step.

"Another function defined by the properties of the polarimetric spectroscope", can be corresponded to a reference amplitude function, a reference value for calibration of a reference phase function, data showing a relation between the first reference phase function and the second reference phase function, data showing a relation between the first reference phase function difference and the second reference phase function difference, and the like.

According to the spectroscopic polarimetry of the present invention, a mechanically movable part for controlling polarized light and an active element such as an electro-optical modulator, which are included in the channeled spectroscopic polarimetry, are unnecessary. While in principle inheriting the property of the spectroscopic polarimetry of being capable of obtaining all parameters indicating a wavenumber-distribution of an SOP (wavelength-distribution of parameters in an SOP) of light under measurement, it is possible to effectively reduce a measurement error in a parameter indicating a wavenumber-distribution of an SOP generated by variations in retardation of a retarder due to a temperature change or other factors.

(2) The analyzer may be arranged such that the direction of the transmission axis thereof forms an angle of 45° with respect to the direction of a fast axis of the second retarder.

(3) In one embodiment of the spectroscopic polarimetry of the present invention, the set of the phase attribute functions is composed of the first reference phase function and the second reference phase function. In the arithmetic step of this embodiment, data showing a relation between the first reference phase function and the second reference phase function is made available.

The arithmetic step according to this embodiment is a unit where, by the use of the obtained spectral intensity, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the data showing the relation between the first reference phase function and the second reference phase function and each of the obtained spectral intensity components, the first reference phase function and the second reference phase function are obtained, and also the parameter indicating the wavenumber-distribution of the SOP is obtained.

Here, "the data showing the relation between the first reference phase function and the second reference phase function" is data with which one of the two reference phase functions can be obtained when the other thereof is given, such as a ratio between the two reference phase functions with respect to each wavelength.

"Obtaining the reference phase function" includes the case of obtaining a parameter equivalent thereto. In particular, obtaining a complex function including information on the reference phase function corresponds to obtaining a parameter equivalent to the reference phase function.

In a case where the direction of the transmission axis of the analyzer forms an angle of 45° with respect to the direction of the fast axis of the second retarder, the fifth spectral intensity component does not appear. Therefore, when at least one of the second, fourth and fifth spectral intensity components is to be obtained in the arithmetic step, at least either the second spectral intensity component or the fourth spectral intensity component may be obtained. In this manner, there is an advantage of making the arithmetic operation simpler. Meanwhile, in the case of not limiting the angle between the direction of the transmission axis of the analyzer and the direction of the fast axis of the second retarder to an angle of 45°, there is an advantage of easing a limitation on an error in assembly of an optical system, to facilitate manufacturing of the optical system.

(4) In another embodiment of the spectroscopic polarimetry of the present invention, the set of phase attribute functions is composed of a difference ($\Delta\phi_1(\sigma)$) of the first reference phase function from a reference value for calibration of the first reference phase function, a difference ($\Delta\phi_2(\sigma)$) of the second reference phase function from a reference value for calibration of the second reference phase function. In the arithmetic step of this embodiment, and the reference value ($\phi_1^{(i)}(\sigma)$) for calibration of the first reference phase function, the reference value ($\phi_2^{(i)}(\sigma)$) for calibration of the second reference phase function, and data showing a relation between the first reference phase function difference and the second reference phase function difference are made available.

The arithmetic step according to this embodiment is a unit where, by the use of the obtained spectral intensity, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained spectral intensity components, the first reference phase function difference and the second reference phase function difference are obtained, and also the parameter indicating the wavenumber-distribution of the SOP is obtained.

Here, the "reference values for calibration" of the first and second reference phase functions may be measured initial values of the respective reference phase functions, or may be appropriately set values thereof not based upon actual measurement. However, the relation between the two reference values for calibration preferably conforms to the relation between the first reference phase function difference and the second reference phase function difference.

The "reference phase function difference" is defined as a difference between the "reference phase function" and the "reference value for calibration of the reference phase function". When the "reference value for calibration of the reference phase function" does not agree with an actual initial value, therefore, the "reference phase function difference" does not mean an actual difference in the reference phase function.

The "data showing the relation between the first reference phase function difference and the second reference phase function difference" is data with which one of the two reference phase function differences can be obtained when the other thereof is given, such as a ratio between the two reference phase function differences with respect to each wavelength.

"Obtaining the reference phase function difference" includes the case of obtaining a parameter equivalent thereto. In particular, obtaining a complex function including information on the reference phase function difference corresponds to obtaining a parameter equivalent to the reference phase function difference.

As for the case where the fifth spectral intensity component does not appear when the direction of the transmission axis of the analyzer forms an angle of 45° with respect to the direction of the fast axis of the second retarder, the foregoing case applies.

For comparison with this embodiment, first, the case of proceeding an arithmetic operation not by the use of the reference phase function difference but by the use of the reference phase function as in the embodiment of (3) above is considered. Putting aside appearance in an arithmetic operation, the second reference phase function, which is in principle determinable independently from an SOP of light under measurement, is first determined, and subsequently the first reference phase function is determined using the second reference phase function. At this time, the obtained second reference phase function is accompanied with phase ambiguity of an integral multiple of $2\pi$. Such accompanying phase ambiguity itself does not affect a calculation error in parameters showing the wavenumber-distribution of the SOP. However, since phase unwrapping performed in obtaining the first reference phase function from the second reference phase function causes generation of a calculation error in the first reference phase function, a calculation error in the parameters showing the wavenumber-distribution of the SOP may be generated. Phase unwrapping is a process of determining a value of the second reference phase function such that the value of the second reference phase function continuously changes beyond the range of $2\pi$ with respect to a wavenumber change. In the case of not using the second reference phase function difference, the first reference phase function is obtained through the use of the "data showing the relation between the first and second reference phase functions" to the second reference phase function after phase unwrapping. When the wavenumber intervals at the time of change in the value of the second reference phase function by $2\pi$ are not sufficiently large as compared to sampling intervals of the wavenumber, or when a noise is included in the measured value of the second reference phase function, the second reference phase function after phase unwrapping could be calculated by a wrong unit, $2\pi$. If the first reference phase function is obtained from the second reference phase function including the error by the unit of $2\pi$, since an error included in the first reference phase function is typically not calculated by the unit of $2\pi$, the error in the first reference phase function would become a large error in the case of calculating the parameters indicating the wavenumber-distribution of the SOP. As opposed to this, in the case of the embodiment of (4) above, since the second reference phase function difference changes modestly with respect to the wavenumber change, phase unwrapping on the second reference phase function difference is unnecessary or necessary only in a small frequency, thereby leading to elimination of, or extreme reduction in, the possibility for generation of an error in the first reference phase function difference due to phase unwrapping.

(5) In the embodiment of (4) above, the spectroscopic polarimetry may further comprise a step of launching light for calibration, with known parameters each showing the wavenumber-distribution of the SOP, into the polarimetric spectroscope to obtain a spectral intensity for calibration, so as to obtain the reference value ($\phi_1^{(i)}(\sigma)$) for calibration of the first reference phase function and the reference value ($\phi_2^{(i)}(\sigma)$) for calibration for the second reference phase function by the use of each of the parameters showing the wavenumber-distribution of the SOP of the light for calibration and the obtained spectral intensity for calibration, whereby these reference values for calibration are made available.

(6) Moreover, in the embodiment of (4) above, the spectroscopic polarimetry may further comprise a step of launching light for calibration, with known parameters each showing the wavenumber-distribution of the SOP, into the polarimetric spectroscope to obtain a spectral intensity for calibration, so as to obtain the reference value ($\phi_1^{(i)}(\sigma)$) for calibration of the first reference phase function and the reference value ($\phi_2^{(i)}(\sigma)$) for calibration for the second reference phase function, and the data showing the relation between the first reference phase function difference and the second reference phase function difference, by the use of each of the parameters showing the wavenumber-distribution of the SOP of the light for calibration and the obtained spectral intensity for calibration, whereby these values are made available.

(7) In the embodiment of (3) above, the spectroscopic polarimetry may further comprise a step of launching light for calibration, with known parameters each showing the wavenumber-distribution of the SOP, into the polarimetric spectroscope to obtain a spectral intensity for calibration, so as to obtain the data showing the relation between the first reference phase function and the second reference phase function by the use of each of the parameters showing the wavenumber-distribution of the SOP of the light for calibration and the obtained spectral intensity for calibration, whereby the data showing the relation between the first reference phase function and the second reference phase function is made available.

(8) In the embodiments of (5) and (6) above, it is possible to use linearly polarized light as the light for calibration.

(9) Also in the embodiment of (7) above, it is possible to use linearly polarized light as the light for calibration.

(10) In another embodiment of the spectroscopic polarimetry of the present invention, in the arithmetic step, a value of each element of a generalized inverse matrix of a matrix is made available such that a relation is formed where a first vector including information on the wavenumber-distribution of the spectral intensity is expressed by a product of the matrix and a second vector including information on the wavenumber-distribution of the SOP of the light under measurement and information on the set of the phase attribute function.

The arithmetic step of the present embedment is a unit where a value of each element of the first vector is specified by the use of the obtained spectral intensity, a value of each element of the second vector is obtained by calculation of a product of the generalized inverse matrix and the first vector, and by the use of the value of the element included in the second vector, the set of phase attribute functions is obtained, and also the parameter showing the wavenumber-distribution of the SOP of the light under measurement is obtained.

(11) In another embodiment subject to the embodiment of (10) above, the set of phase attribute functions is composed of a difference ($\Delta\phi_1(\sigma)$) of the first reference phase function from a reference value for calibration of the first reference phase function and a difference ($\Delta\phi_1(\sigma)$) of the second reference phase function from a reference value for calibration of the second reference phase function. In the arithmetic step of this embodiment, data showing a relation between the first reference phase function difference and the second reference phase function difference is made available. Further, the generalized inverse matrix of the matrix, obtained from the reference value ($\phi_1^{(i)}(\sigma)$) for calibration of the first reference phase function and the reference value ($\phi_2^{(i)}(\sigma)$) for calibration for the second reference phase function, is made available.

The arithmetic step in this embodiment is a unit where a value of each element of the first vector is specified by the use of the obtained spectral intensity, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the wavenumber-distribution of the SOP is obtained.

(12) A spectroscopic polarimeter of the present invention comprises a polarimetric spectroscope and an arithmetic unit.

The polarimetric spectroscope comprises a means of obtaining a first retarder, a second retarder and an analyzer, through which light under measurement passes in sequence, and a means of obtaining a spectral intensity of the light having passed through the analyzer. Here, the second retarder is arranged such that the direction of a principal axis of the second retarder disagrees with the direction of a principal axis of the first retarder. The analyzer is arranged such that the direction of a transmission axis of the analyzer disagrees with the direction of the principal axis of the second retarder.

In the arithmetic unit, by the use of the spectral intensity obtained by launching the light under measurement into the polarimetric spectroscope, a set of phase attribute functions of a measurement system is obtained, and also a parameter is obtained which indicates a wavenumber-distribution of an SOP of the light under measurement. Here, the set of phase attribute functions is a set of functions defined by properties of the polarimetric spectroscope, and includes a function depending upon at least a first reference phase function ($\phi_1(\sigma)$) as retardation of the first retarder and a function depending upon at least a second reference phase function ($\phi_2(\sigma)$) as retardation of the second retarder, and by those functions themselves, or by addition of another function defined by the properties of the polarimetric spectroscope, the set of phase attribute functions becomes a set of functions sufficient to determine a parameter indicating a wavenumber-distribution of the SOP of the light under measurement.

(13) The analyzer may be arranged such that the direction of the transmission axis thereof forms an angle of 45° with respect to the direction of a fast axis of the second retarder.

(14) In one embodiment of the spectroscopic polarimeter of the present invention, the set of the phase attribute functions is composed of the first reference phase function and the second reference phase function. In the arithmetic unit of this embodiment, data showing a relation between the first reference phase function and the second reference phase function is made available.

The arithmetic unit according to this embodiment is a unit where, by the use of the spectral intensity obtained by launching the light under measurement into the polarimetric spectroscope, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the data showing the relation between the first reference phase function and the second reference phase function and each of the obtained spectral intensity components, the first reference phase function and the second reference phase function are obtained, and also the parameter indicating the wavenumber-distribution of the SOP is obtained.

(15) In another embodiment of the spectroscopic polarimeter of the present invention, the set of phase attribute functions is composed of a difference ($\Delta\phi_1(\sigma)$) of the first reference phase function from a reference value for calibration of the first reference phase function, a difference ($\Delta\phi_2(\sigma)$) of the second reference phase function from a reference value for calibration of the second reference phase function. In the arithmetic unit of this embodiment, the reference value ($\phi_1^{(i)}(\sigma)$) for calibration of the first reference phase function, the reference value ($\phi_2^{(i)}(\sigma)$) for calibration of the second reference phase function, and data showing a relation between the first reference phase function difference and the second reference phase function difference are made available.

The arithmetic unit according to this embodiment is a unit where, by the use of the spectral intensity obtained by launching the light under measurement into the polarimetric spectroscope, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained spectral intensity components, the first reference phase function difference and the second reference phase function difference are obtained, and also the parameter indicating the wavenumber-distribution of the SOP is obtained.

(16) In another embodiment of the spectroscopic polarimeter of the present invention, in the arithmetic unit, a value of each element of a generalized inverse matrix of a matrix is made available such that a relation is formed where a first vector including information on the wavenumber-distribution of the spectral intensity is expressed by a product of the matrix and a second vector including information on the wavenumber-distribution of the SOP of the light under measurement and information on the set of the phase attribute function.

The arithmetic unit of the present embedment is a unit where a value of each element of the first vector is specified by the use of the spectral intensity obtained by launching the light under measurement into the polarimetric spectroscope, a value of each element of the second vector is obtained by calculation of a product of the generalized inverse matrix and the first vector, and by the use of the value of the element included in the second vector, the set of phase attribute functions is obtained, and also the parameter showing the wavenumber-distribution of the SOP of the light under measurement is obtained.

(17) In another embodiment subject to the embodiment of (16) above, the set of phase attribute functions is composed of a difference ($\Delta\phi_1(\sigma)$) of the first reference phase function from a reference value for calibration of the first reference phase function and a difference ($\Delta\phi_2(\sigma)$) of the second reference phase function from a reference value for calibration of the second reference phase function. In the arithmetic unit of this embodiment, data showing a relation between the first reference phase function difference and the second reference phase function difference is made available. Further, the generalized inverse matrix of the matrix, obtained from the reference value ($\phi_1^{(i)}(\sigma)$) for calibration of the first reference phase function and the reference value ($\phi_2^{(i)}(\sigma)$) for calibration for the second reference phase function, is made available.

The arithmetic unit in this embodiment is a unit where a value of each element of the first vector is specified by the use of the spectral intensity obtained by launching the light under measurement into the polarimetric spectroscope, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second-reference phase function difference are obtained, and also the parameter showing the wavenumber-distribution of the SOP is obtained.

According to the present invention, a mechanically movable part for controlling polarized light and an active element such as an electro-optical modulator, which are included in the channeled spectroscopic polarimetry, are unnecessary. While in principle inheriting the property of the spectroscopic polarimetry of being capable of obtaining all parameters indicating a wavenumber-distribution of an SOP (wavelength-distribution of parameters in an SOP) of light under measurement, it is possible to effectively reduce a measurement error in a parameter indicating a wavenumber-distribution of an SOP generated by variations in retardation of a retarder due to a temperature change or other factors.

BRIEF DESCRIPTION OF THE DRAWINGS

FIG. 20 shows a constitutional view of an experimental system of a channeled spectroscopic polarimetry proposed in advance by the present inventors and the like.

DESCRIPTION OF THE PREFERRED EMBODIMENTS

In the following, one preferred embodiment of the present invention is specifically described with reference to attached drawings (FIGS. 1 to 10).

Figure 1:
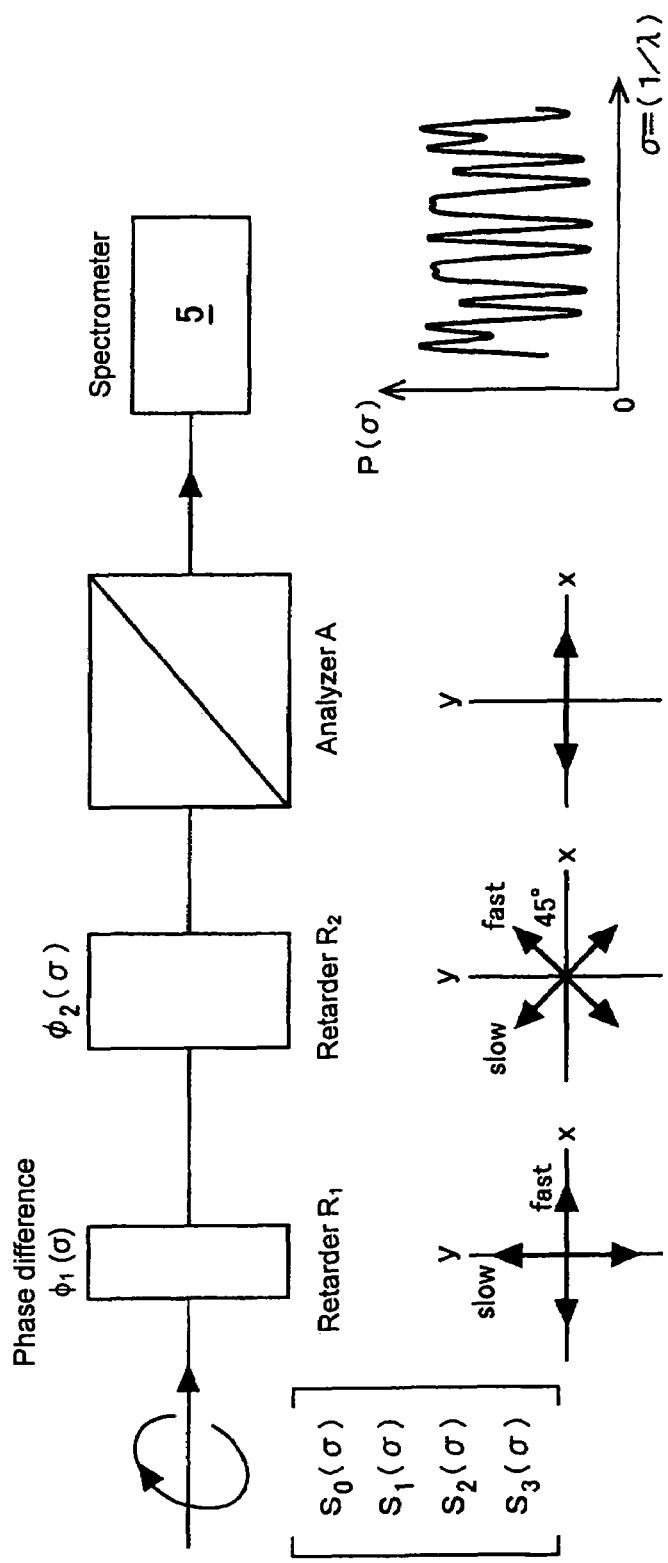
FIG. 1 shows an explanatory view of a principle of a channeled spectroscopic polarimetry as the premise of the present invention.

Chapter 1: Channeled Spectroscopic Polarimetry as Premise of Present Invention 1.1 Principle of Channeled Spectroscopic Polarimetry FIG. 1 shows a basic configuration of a channeled spectroscopic polarimeter for use in a channeled spectroscopic polarimetry. This spectroscopic polarimeter is comprised of two thick retarders $R_1$ and $R_2$, an analyzer A and a spectrometer 5. Here, fast axes of the retarder $R_1$ and the retarder $R_2$ are inclined at an angle of 45° from each other. Meanwhile, a transmission axis of the analyzer A agrees with the fast axis of the retarder $R_1$.

It is to be noted that crossing angles among these three elements may not necessarily be 45°. Measurement is possible even with a different crossing angle, although less efficient to some extent. In short, any crossing angle can be applied so long as principal axes of the adjacent elements are not superposed on each other. A description in this respect is given later. What is important is that each element is fixed and thus not required to be rotated or modulated as in a conventional method.

Light under measurement having a broad spectrum (light whose state of polarization (SOP) is measurable) is incident on a polarimeter from the left in the figure. A spectral distribution of an SOP of this light under measurement can be expressed by spectrometric Stokes parameters $S_0(\sigma)$, $S_1(\sigma)$, $S_2(\sigma)$, and $S_3(\sigma)$. Here, σ is a "wavenumber" defined by an inverse number of a wavelength λ. Further, coordinate axes x and y for determining the spectrometric Stokes parameters is taken so as to agree with the fast and late axes of the retarder $R_1$.

The light under measurement incident on the spectrometer passes in sequence through the retarders $R_1$ and $R_2$ and the analyzer A, and is incident on the polarimeter 5. The Stokes parameters depending upon the wavenumber σ are obtained from a spectrum acquired from the polarimeter 5 by the use of a later-described process.

Before description of the process for obtaining the spectrometric Stokes parameters, property of the retarders $R_1$ and $R_2$ are formulated as a preparation for the process. A retarder is an element having the property of changing a phase difference between mutually orthogonal linearly polarized light components before and after passage of light through the element. An amount of such a change in phase difference is referred to as retardation.

Retardation of a retarder $R_j$ (j=1,2) made of a double refraction catalyst changes with respect to the wavenumber σ as expressed in the following expression:

$$\phi_j(\sigma) = 2\pi d_j B(\sigma)\sigma = 2\pi L_j \sigma + \Phi_j(\sigma) \qquad (1.1)$$

where

[Mathematical Expression 1]

$$L_j = \frac{1}{2\pi} \frac{d\phi_j}{d\sigma}\bigg|_{\sigma_0} = d_j\left(B(\sigma_0) + \frac{dB}{d\sigma}\bigg|_{\sigma_0}\sigma_0\right) \qquad (1.2a)$$

$$\Phi_j(\sigma) = \{\phi_j(\sigma_0) - 2\pi L_j \sigma_0\} + \frac{1}{2}\frac{d^2\phi_j}{d\sigma^2}\bigg|_{\sigma_0}(\sigma - \sigma_0)^2 + \ldots \qquad (1.2b)$$

Here, of $d_j$ is a thickness of $R_j$, and $B(\sigma)$ is its double refraction. Further, $\sigma_0$ denotes a center wavenumber of light under measurement.

Assuming now that dispersion (change rate with respect to wavenumber) of $B(\sigma)$ is not so large, as seen from Expression (1.1), φ(σ) increases almost linearly with respect to the wavenumber σ. Such a property serves as a basis of demodulation of the spectrometric Stokes parameters in a later-described process.

1.2 Channeled Spectrum Acquired in Spectrometer

In the "channeled spectroscopic polarimeter" shown in FIG. 1, a spectrum (spectral intensity) acquired in the spectrometer 5 is expressed by the following expression.

[Mathematical Expression 2]

$$P(\sigma) = \frac{1}{2}m_0(\sigma)S_0(\sigma) + \frac{1}{4}m_-(\sigma)|S_{23}(\sigma)|\cos[\phi_2(\sigma) - \phi_1(\sigma) + \arg\{S_{23}(\sigma)\}] + \frac{1}{2}m_2(\sigma)S_1(\sigma)\cos[\phi_2(\sigma)] - \frac{1}{4}m_+(\sigma)|S_{23}(\sigma)|\cos[\phi_2(\sigma) + \phi_1(\sigma) - \arg\{S_{23}(\sigma)\}] \quad (1.3)$$

where the following expression is satisfied.

$$S_{23}(\sigma) + S_2(\sigma) + iS_3(\sigma) \quad (1.4)$$

Here, $m_0(\sigma)$, $m_-(\sigma)$, $m_2(\sigma)$, and $m_+(\sigma)$ each denote a ratio of amplitude extinction due to failure of the spectrometer to follow fine vibration of the component. Expression (1.1) is substituted into Expression (1.3) below for the sake of understanding the property of this expression.

[Mathematical Expression 3]

$$P(\sigma) = \frac{1}{2}m_0(\sigma)S_0(\sigma) + \frac{1}{4}m_-(\sigma)|S_{23}(\sigma)|\cos[2\pi L_-\sigma + \Phi_-(\sigma) + \arg\{S_{23}(\sigma)\}] + \frac{1}{2}m_2(\sigma)S_1(\sigma)\cos[2\pi L_2\sigma + \Phi_2(\sigma)] - \frac{1}{4}m_+(\sigma)|S_{23}(\sigma)|\cos[2\pi L_+\sigma + \Phi_+(\sigma) - \arg\{S_{23}(\sigma)\}] \quad (1.5)$$

where the following expressions are satisfied.

Figure 2:
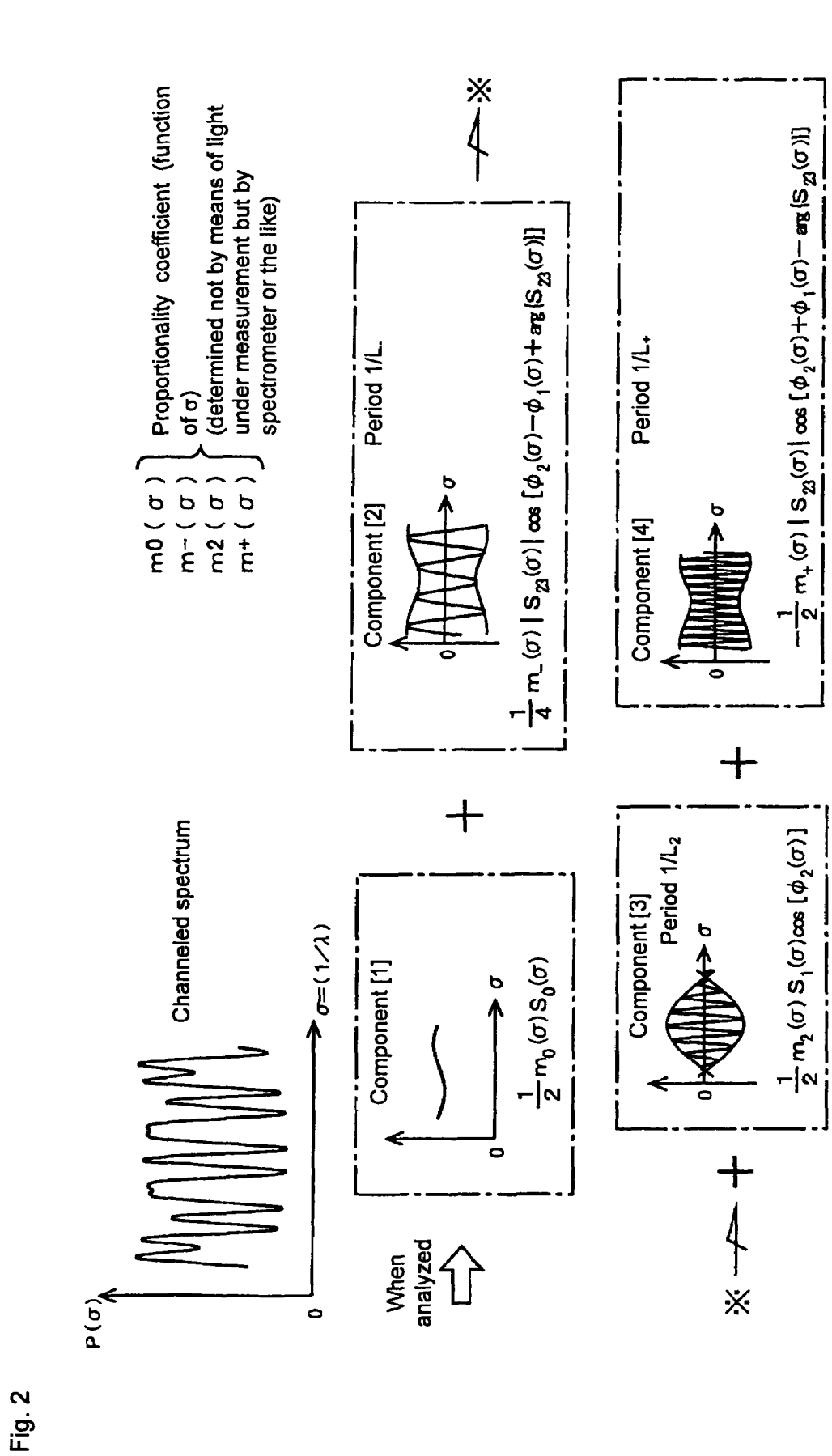
FIG. 2 shows an explanatory view of a relation between a channeled spectrum obtained from a spectrometer and its four components (No. 1)

As seen from Expression (1.5), the spectrum $P(\sigma)$ acquired from the spectrometer contains four components. One of them is a component gently varies with respect to the wavenumber $\sigma$, and the other three components are quasi-sinusoidal components that vibrate with respect to the wavenumber $\sigma$. These are schematically shown in FIG. 2.

Here, the central periods of each of the three vibration components are respectively $1/L_-$, $1/L_2$ and $1/L_+$. The spectrum containing components that periodically finely vibrate with respect to the wavenumber (wavelength) as in FIG. 2 is referred to as a channeled spectrum.

What needs to be concerned here is that these four components have information of any one of $S_0(\sigma)$, $S_1(\sigma)$ and $S_{23}$. When each component can be separated, it is possible to determine all the spectrometric Stokes parameters $S_0(\sigma)$, $S_1(\sigma)$, $S_2(\sigma)$ and $S_3$ from one spectrum $P(\sigma)$.

1.3 When Crossing Angle Between Elements is not 45°

Next described is a spectrum acquired in the spectrometer 5 when a crossing angle between the elements is not 45°.

Here also described as a supplemental explanation is a spectrum obtained when a crossing angle between each element in the optical system is not 45°.

It is assumed now that, in the optical system in FIG. 1, the angle formed between the fast axes of the retarders $R_1$ and $R_2$ is $\theta_{RR}$ and the angle formed between the fast axis of the retarder $R_2$ and the transmission axis of the analyzer A is $\theta_{RA}$. Although calculation has been limited to the case of $\theta_{RR}=45°$ and $\theta_{RA}=-45°$ so far, the case where those angles are more common ones is shown here.

An expression for the obtained channeled spectrum $P(\sigma)$ is given as follows.

[Mathematical Expression 4]

$$P(\sigma) = \frac{1}{2}m_0(\sigma)[S_0(\sigma) + \underline{\cos 2\theta_{RA}\cos 2\theta_{RR}S_1(\sigma)}] - \frac{1}{2}(\sin 2\theta_{RA}\sin^2\theta_{RR})m_-(\sigma)|S_{23}(\sigma)|\cos[\phi_2(\sigma) - \phi_1(\sigma) + \arg\{S_{23}(\sigma)\}] - \frac{1}{2}(\sin 2\theta_{RA}\sin 2\theta_{RR})m_2(\sigma)S_1(\sigma)\cos[\phi_2(\sigma)] + \frac{1}{2}(\sin 2\theta_{RA}\cos^2\theta_{RR})m_+(\sigma)|S_{23}(\sigma)|\cos[\phi_2(\sigma) + \phi_1(\sigma) - \arg\{S_{23}(\sigma)\}] + \frac{1}{2}\underline{(\cos 2\theta_{RA}\sin 2\theta_{RR})m_1(\sigma)|S_{23}(\sigma)|\cos[\phi_1(\sigma) - \arg\{S_{23}(\sigma)\}]} \quad (1.7)$$

$$L_- = L_2 - L_1 \quad (1.6a)$$

$$L_+ = L_2 + L_1 \quad (1.6b)$$

$$\Phi_-(\sigma) = \Phi_2(\sigma) - \Phi_1(\sigma) \quad (1.6c)$$

$$\Phi_+(\sigma) = \Phi_2(\sigma) + \Phi_1(\sigma) \quad (1.6d)$$

Figure 3:
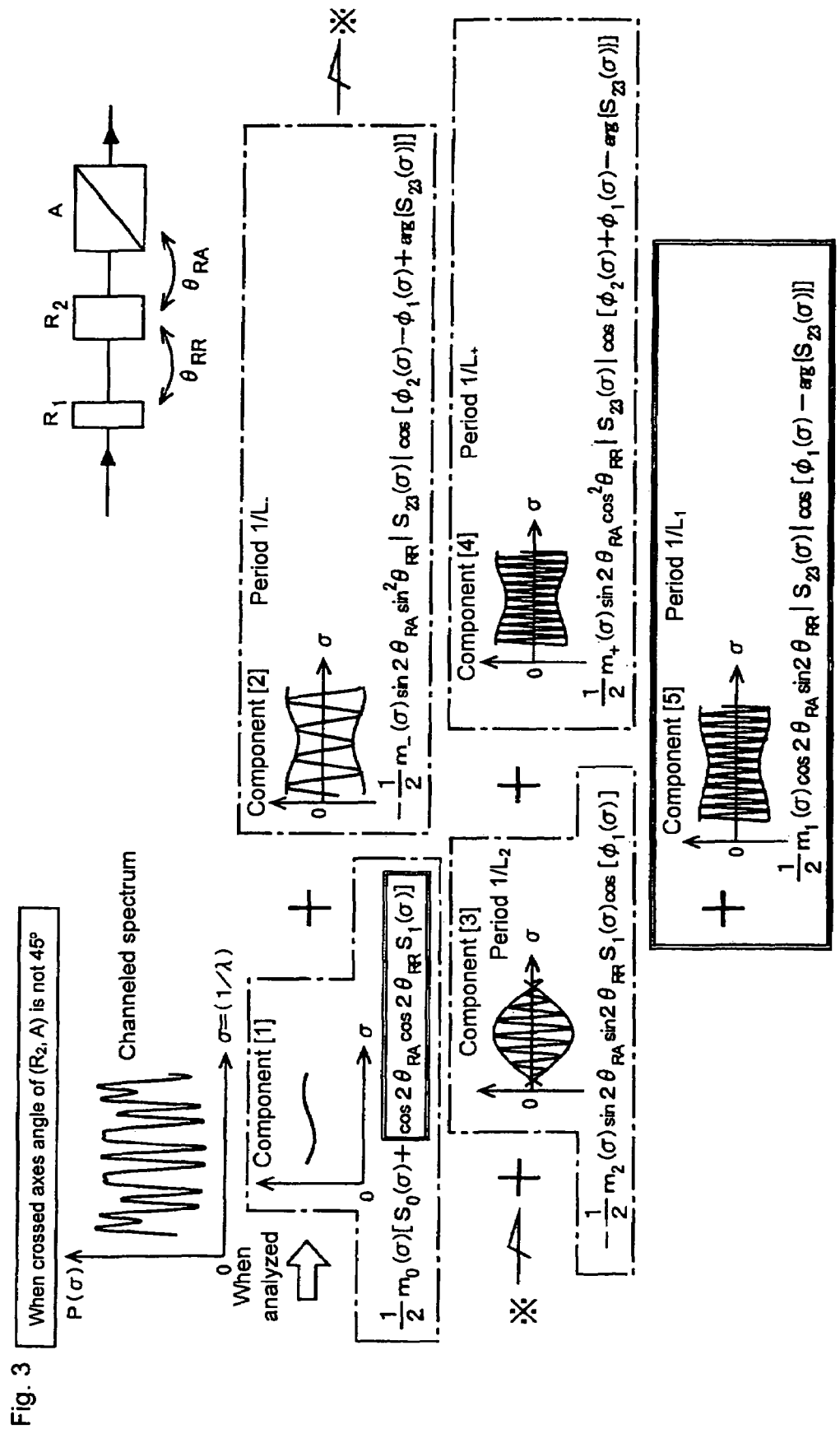
FIG. 3 shows an explanatory view of a relation between a channeled spectrum obtained from the spectrometer and its five components (No. 2)

These are schematically shown in FIG. 3.

When this expression is compared to the spectrum in the previous expression (1.3), namely when the angles $\theta_{RR}$ and $\theta_{RA}$ are respectively limited to 45° and −45°, the following differences area found in addition to a mere difference in constant multiple of a coefficient. It is to be noted that the different part is indicated with an underline in Expression (1.7).

The component that gently varies with respect to the wavenumber $\sigma$ depends not only upon $S_0(\sigma)$ but additionally upon $S_1(\sigma)$.

A component that quansi-sinusoidally vibrates according to the phase $\phi_1(\sigma)$, namely a component that vibrates at a central period $1/L_1$, is added. It should be noted that this component has information of $S_{23}(\sigma)$ (as in the cases of the two respective components that vibrate according to $\phi_2(\sigma)-\phi_1(\sigma)$ and $\phi_2(\sigma)+\phi_1(\sigma)$). It means that this term can be treated in the same manner as the other two terms including $S_{23}(\sigma)$.

Here, conditions for nonappearance of the above two components are considered.

The former term appears in a limited case "when both $\theta_{RR} \neq \pm 45°$ and $\theta_{RA} \neq \pm 45°$ are satisfied". In the meantime, the latter term appears "when $\theta_{RA} \neq \pm 45°$ (regardless of whether $\theta_{RR}$ agrees with $45°$ or not)". From these, a fact can be mentioned as follows.

When the fast axis of the retarder $R_2$ and the transmission axis of the analyzer A cross each other at an angle of $45°$ (i.e. $\theta_{RA} = \pm 45°$), the channeled spectrum is given by Expression (1.3) except for the difference in constant multiple of a coefficient of each term. Here, whether the angle $\theta_{RR}$ formed between the fast axes of the retarders $R_1$ and $R_2$ agrees with $\pm 45°$ or not is irrelevant.

In other words, the channeled spectrum can take the form of Expression (1.3) under a condition that the fast axis of the retarder $R_1$ and the transmission axis of the analyzer A cross each other at an angle of $\pm 45°$. On the other hand, whether the angle formed between the fast axes of the retarders $R_1$ and $R_2$ agrees with $\pm 45°$ or not is irrelevant.

1.4 Process for Demodulating Spectrometric Stokes Parameter

Figure 4:
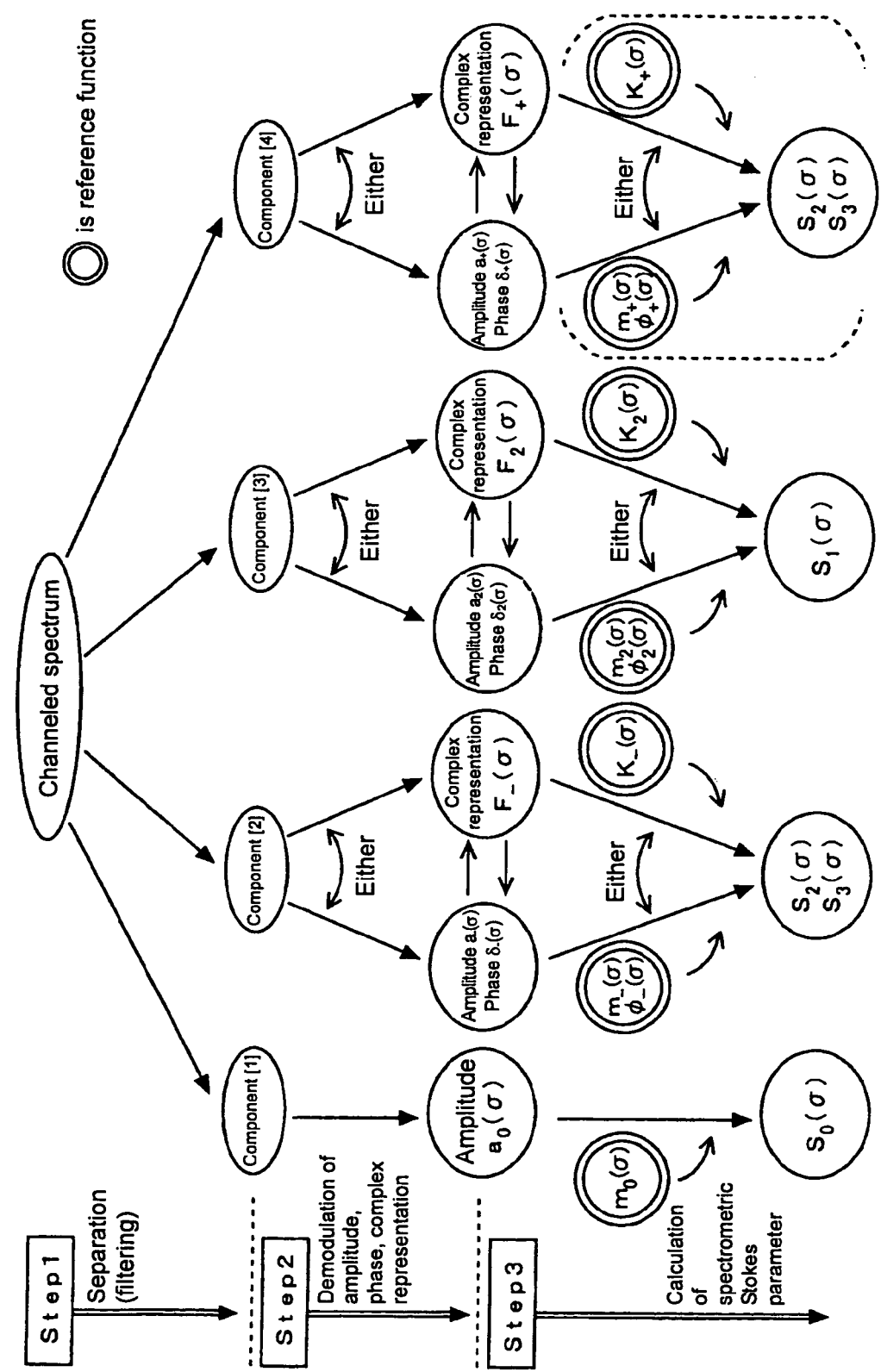
FIG. 4 shows an explanatory view of a process (flows of signal processing) for demodulating a spectrometric Stokes parameter.

A specific process for demodulating a spectrometric Stokes parameter is described below with reference to FIG. 4. A brief description of the flow of the process is as follows.

Step 1: Each term is separated from Spectrum $P(\sigma)$.

Step 2: An amplitude and a phase of each component are obtained. (Or equivalent quantities, e.g. a real part and an imaginary part in complex representation are obtained).

Step 3:

[Mathematical Expression 5]

$$\bullet \text{ reference amplitude function } \begin{Bmatrix} m_0(\sigma) \\ m_-(\sigma) \\ m_2(\sigma) \\ m_+(\sigma) \end{Bmatrix}$$

$$\bullet \text{ reference phase function } \begin{Bmatrix} \phi_1(\sigma) \\ \phi_2(\sigma) \end{Bmatrix}$$

The above reference functions included in an amplitude and a phase of each vibration component are removed to obtain spectrometric Stokes parameters $S_0(\sigma)$, $S_1(\sigma)$, $S_2(\sigma)$, and $S_3(\sigma)$. (These reference functions depend not upon light under measurement but only upon parameters of a polarimeter).

Each of the steps is described as follows.

[Step 1]

As described in the previous section, the spectrum $P(\sigma)$ contains four components. An operation for taking out each component by a signal process is performed. What is applied to this operation is that each component vibrates at a different period (frequency). With the use of (any one of) a variety of frequency filtering techniques being broadly used in fields of communication engineering, signal analysis and the like, it is possible to separate each component.

[Mathematical Expression 6]

- Component [1] (low frequency component) (1.8a)

$$\frac{1}{2} m_0(\sigma) S_0(\sigma)$$

- Component [2] (central period $1/L_-$) (1.8b)

$$\frac{1}{4} m_-(\sigma) |S_{23}(\sigma)| \cos[\phi_2(\sigma) - \phi_1(\sigma) + \arg\{S_{23}(\sigma)\}]$$

- Component [3] (central period $1/L_2$) (1.8c)

$$\frac{1}{2} m_2(\sigma) S_1(\sigma) \cos[\phi_2(\sigma)]$$

- Component [4] (central period $1/L_+$) (1.8d)

$$-\frac{1}{4} m_+(\sigma) |S_{23}(\sigma)| \cos[\phi_2(\sigma) + \phi_1(\sigma) - \arg\{S_{23}(\sigma)\}]$$

Component [1] is a spectral intensity component which nonperiodically vibrates with wavenumber. Component [2] is a spectral intensity component which vibrates with wavenumber at a frequency depending upon a difference between the first reference phase function $\phi_1(\sigma)$ and the second reference phase function $\phi_2(\sigma)$. Component [3] is a spectral intensity component which vibrates with wavenumber at a frequency depending upon a second reference phase function $\phi_2(\sigma)$ and not depending upon the first reference phase function $\phi_1(\sigma)$. Component [4] is a spectral intensity component which vibrates with wavenumber at a frequency depending upon a sum of the first reference phase function $\phi_1(\sigma)$ and the second reference phase function $\phi_2(\sigma)$. When the fast axis of the retarder $R_2$ and the transmission axis of the analyzer A is not $45°$, a spectral intensity component [5] appears which vibrates with wavenumber at a frequency depending upon the first reference phase function $\phi_1(\sigma)$ and not depending upon the second reference phase function $\phi_2(\sigma)$.

[Step 2]

Figure 5:
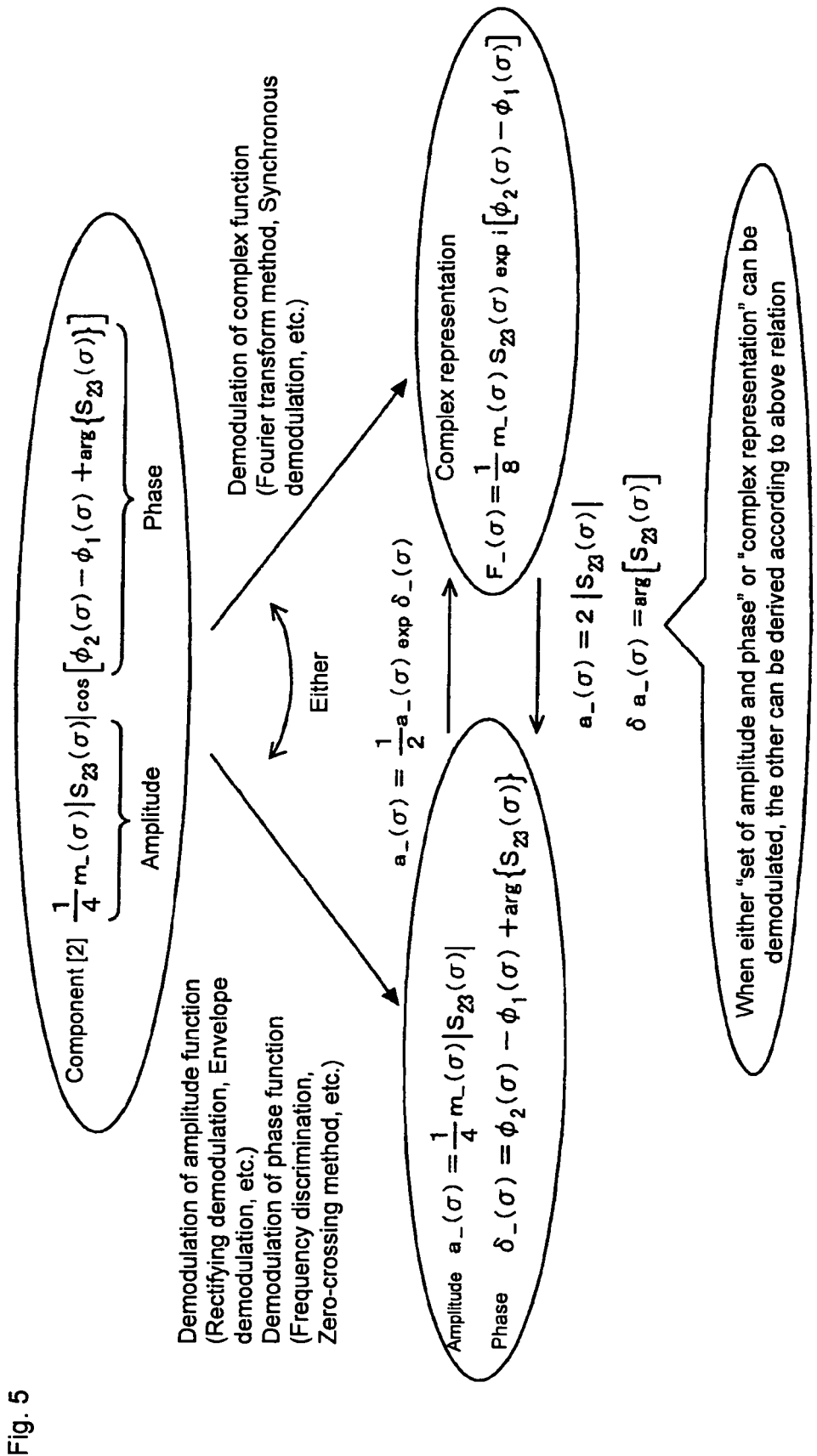
FIG. 5 shows an explanatory view of one example of Step 2.

As for each component separated in Step 1, a "set of an amplitude and a phase" and a "complex representation" are obtained, as shown in FIG. 5. This can be readily realized by using in an operation a variety of demodulation methods which are common in fields of communication engineering, signal analysis and the like, as in Step 1. Those methods include:

Amplitude demodulation: rectifying demodulation, envelope demodulation, etc.

Phase demodulation: frequency discrimination, zero-crossing method, etc.

Complex representation demodulation: Fourier transform method (later described), synchronous demodulation, etc.

Here, definitions and basic properties of the "amplitude", "phase" and "complex representation" of a vibration component are summarized below. As seen from Expressions (1.8a) to (1.8d), each of the separated components except for Component [1] takes the form of:

$$a(\sigma) \cos \delta(\sigma) \quad (1.9)$$

$a(\sigma)$ and $\delta(\sigma)$ here are respectively referred to as the "amplitude" and "phase" of the vibration component. It is to be noted that, if assuming that the phase $a_0(\sigma)=0$ (i.e. $\cos \delta_0(\sigma)=1$) also in Component [1], the amplitude of Component [1] can also be defined.

Further, F(σ) having the following relation with the amplitude and the phase is called a complex representation.

[Mathematical Expression 7]

$$F(\sigma) = \frac{1}{2}a(\sigma)\exp[i\delta(\sigma)] \quad (1.10a)$$

$$= \left[\frac{1}{2}a(\sigma)\cos\delta(\sigma)\right] + i\left[\frac{1}{2}a(\sigma)\sin\delta(\sigma)\right] \quad (1.10b)$$

The real part of F(σ) is formed by dividing the amplitude of the vibration component into halves, and the imaginary part thereof is displaced from the real part at the angle of 90°. It should be noted that in Component [1], the amplitude is not divided into halves since δ(σ)=0, i.e. no imaginary part exists.

What needs to be concerned here is that when either the "set of the amplitude and phase" or the "complex representation" is demodulated, the other one can be immediately calculated by the use of the following relational expression.

[Mathematical Expression 8]

"amplitude $a(\sigma)$, phase $\delta(\sigma)$" ⇒ "complex representation $$F(\sigma) = \frac{1}{2}a(\sigma)e^{i\delta(\sigma)} \quad (1.11)$$

"complex representation ⇒ "amplitude $a(\sigma)$, phase $\delta(\sigma)$"
$F(\sigma)$"

$$a(\sigma) = 2|F(\sigma)| \quad (1.12a)$$

$$\delta(\sigma) = \arg[F(\sigma)] \quad (1.12b)$$

Namely, demodulation of one of the set of the amplitude and phase and the complex representation enables immediate calculation of the other as necessary.

When the "amplitude" and "phase" of each component are demodulated, the following results are obtained.

[Mathematical Expression 9]

• Component [1] (low frequency component):

[amplitude] $a_0(\sigma) = \frac{1}{2}m_0(\sigma)S_0(\sigma)$ \quad (1.13a)

[phase] $\delta_0(\sigma) = 0$

• Component [2] (central period $1/L_-$):

[amplitude] $a_-(\sigma) = \frac{1}{4}m_-(\sigma)|S_{23}(\sigma)|$ \quad (1.13b)

[phase] $\delta_-(\sigma) = \phi_2(\sigma) - \phi_1(\sigma) + \arg\{S_{23}(\sigma)\}$

• Component [3] (central period $1/L_2$): \quad (1.13c)

[amplitude] $a_2(\sigma) = \frac{1}{2}m_2(\sigma)S_1(\sigma)$

[phase] $\delta_2(\sigma) = \phi_2(\sigma)$

-continued

• Component [4] (central period $1/L_+$): \quad (1.13d)

[amplitude] $a_+(\sigma) = \frac{1}{4}m_+(\sigma)|S_{23}(\sigma)|$

[phase] $\delta_+(\sigma) = \phi_2(\sigma) + \phi_1(\sigma) - \arg\{S_{23}(\sigma)\} + \pi$ On the other hand, when the "complex representation" of each component is demodulated, the following results are obtained.

[Mathematical Expression 10]

Component [1] (low frequency component): \quad (1.14a)

$$\begin{bmatrix}\text{complex}\\\text{representation}\end{bmatrix} F_0(\sigma) = \frac{1}{2}m_0(\sigma)S_0(\sigma)$$

Component [2] (central period $1/L_-$): \quad (1.14b)

$$\begin{bmatrix}\text{complex}\\\text{representation}\end{bmatrix} F_-(\sigma) = \frac{1}{8}m_-$$

$$(\sigma)S_{23}(\sigma)\exp i\begin{bmatrix}\phi_2(\sigma)-\\\phi_1(\sigma)\end{bmatrix}$$

Component [3] (central period $1/L_2$): \quad (1.14c)

$$\begin{bmatrix}\text{complex}\\\text{representation}\end{bmatrix} F_2(\sigma) = \frac{1}{4}m_2(\sigma)S_1(\sigma)\exp i\phi_2(\sigma)$$

Component [4] (central period $1/L+$): \quad (1.14d)

$$\begin{bmatrix}\text{complex}\\\text{representation}\end{bmatrix} F_+(\sigma) = -\frac{1}{8}m_+(\sigma)S_{23}*$$

$$(\sigma)\exp i\begin{bmatrix}\phi_2(\sigma)-\\\phi_1(\sigma)\end{bmatrix}$$

Here, * denotes a complex conjugation. It is to be noted that, for the sake of what is described below, the expressions of the complex representations are rewritten as follows.

[Mathematical Expression 10]

Component [1] (low frequency component): \quad (1.15a)

$$\begin{bmatrix}\text{complex}\\\text{representation}\end{bmatrix} F_0(\sigma) = K_0(\sigma)S_0(\sigma)$$

Component [2] (central period $1/L_-$): \quad (1.15b)

$$\begin{bmatrix}\text{complex}\\\text{representation}\end{bmatrix} F_-(\sigma) = K_-(\sigma)S_{23}(\sigma)$$

Component [3] (central period $1/L_2$): \quad (1.15c)

$$\begin{bmatrix}\text{complex}\\\text{representation}\end{bmatrix} F_2(\sigma) = K_2(\sigma)S_1(\sigma)$$

Component [4] (central period $1/L_+$): \quad (1.15d)

$$\begin{bmatrix}\text{complex}\\\text{representation}\end{bmatrix} F_+(\sigma) = K_+(\sigma)S_{23}*(\sigma)$$

where $$K_0(\sigma) = \frac{1}{2}m_0(\sigma) \quad (1.16a)$$

$$K_-(\sigma) = \frac{1}{8}m_-(\sigma)\exp i\,[\phi_2(\sigma)-\phi_1(\sigma)] \quad (1.16b)$$

-continued $$K_2(\sigma) = \frac{1}{4}m_2(\sigma)\exp i\phi_2(\sigma) \quad (1.16c)$$

$$K_+(\sigma) = -\frac{1}{8}m_+(\sigma)\exp i\,[\phi_2(\sigma)+\phi_1(\sigma)] \quad (1.16d)$$

[Step 3]

Finally, from the "amplitude" and the "phase" or the "complex representation" obtained in Step 2, the spectrometric Stokes parameters $S_0(\sigma)$, $S_1(\sigma)$, $S_2(\sigma)$, and $S_3(\sigma)$ as functions of the wavenumber σ are determined.

The "amplitude" and the "phase" obtained in Step 2 include, other than the spectrometric Stokes parameters to be obtained, parameters shown below.

[Mathematical Expression 12]

$$\text{Parameter (function) determined based only upon property of polarimeter} \begin{Bmatrix} m_0(\sigma) \\ m_-(\sigma) \\ m_2(\sigma) \\ m_+(\sigma) \end{Bmatrix}$$

and $$\begin{Bmatrix} \phi_-(\sigma) = \phi_2(\sigma) - \phi_1(\sigma) \\ \phi_2(\sigma) \\ \phi_+(\sigma) = \phi_2(\sigma) + \phi_1(\sigma) \end{Bmatrix}$$

The former are included in the amplitude while the latter are included in the phase. These provide references in determining spectrometric Stokes parameters from the amplitude and the phase of each vibration component. Thus, each of these functions is hereinafter referred to as a "reference amplitude function" or a "reference phase function". Since these parameters do not depend upon light under measurement, each of the parameters is subjected to addition or subtraction, to be determined as follows.

$S_0(\sigma)$ can be determined from [Component [1]].

$S_2(\sigma)$ and $S_3(\sigma)$ can be determined from (either) [Component [2]] or [Component [4]].

$S_1(\sigma)$ can be determined from [Component [3]].

Meanwhile, in the case of the "complex representation", parameters (functions) determined only by the property of the polarimeter itself are $K_0(\sigma)$, $K_-(\sigma)$, $K_2(\sigma)$, and $K_+(\sigma)$ which are defined by Expressions (1.16a) to (1.16d). These are, so to speak, "reference complex functions".

As revealed from Expressions (1.15a) to (1.15d), if the above reference complex functions have been obtained, by subtraction of the complex representation of each vibration component demodulated in Step 2, the parameters can be determined as follows.

$S_0(\sigma)$ can be determined from [Component [1]]

$S_2(\sigma)$ and $S_3(\sigma)$ can be determined from (either) [Component [2]] or [Component [4]].

$S_1(\sigma)$ can be determined from [Component [3]].

When the angle formed between the retarder $R_2$ and the analyzer A is not 45°, the fifth term that appears can be used in place of [component [2]] and [component [4]]. Namely, the description on lines 2-3 above can be rewritten to:

$S_2(\sigma)$ and $S_3(\sigma)$ can be determined from any one of [component [2]], [component [4]] and [component [5]].

Next, as one of signal processing methods for demodulating spectrometric Stokes parameters, a "Fourier transform method" is described with reference to FIG. 6. The use of this method allows efficient concurrent performance of Steps 1 and 2, leading to immediate determination of all complex representations of each vibration component.

In this method, first, the spectrum P(σ) measured with the spectrometer in the channeled spectroscopic polarimeter is subjected to inverse Fourier transformation, to obtain the following correlation function of light incident on the spectrometer.

[Mathematical Expression 13]

$$C(h) = A_0(h) + A_-(h-L_-) + A_-*(-h-L_-) + \quad (1.17)$$
$$A_2(h-L_2) + A_2*(-h-L_2) + A_+(h-L_+) + $$
$$A_+*(-h-L_+)$$

where $$A_0(h) = F^{-1}\left[\frac{1}{2}m_0(\sigma)S_0(\sigma)\right] \quad (1.18a)$$

$$A_-(h) = F^{-1}\left[\frac{1}{8}m_-(\sigma)S_{23}(\sigma)\exp i\Phi_-(\sigma)\right] \quad (1.18b)$$

$$A_2(h) = F^{-1}\left[\frac{1}{4}m_2(\sigma)S_1(\sigma)\exp i\Phi_2(\sigma)\right] \quad (1.18c)$$

$$A_+(h) = F^{-1}\left[-\frac{1}{8}m_+(\sigma)S_{23}*(\sigma)\exp i\Phi_+(\sigma)\right] \quad (1.18d)$$

Figure 6:
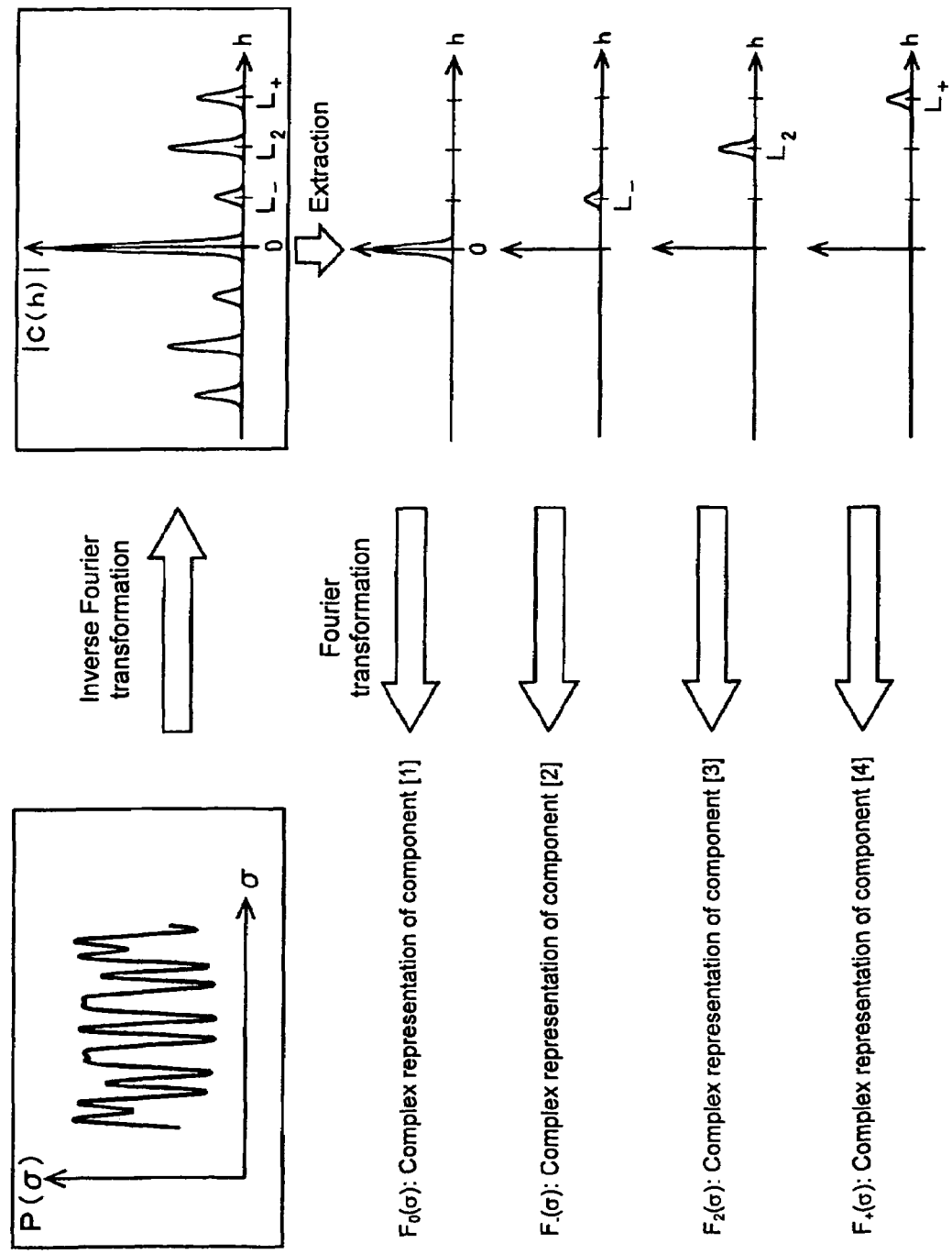
FIG. 6 shows an explanatory view of Fourier transformation.

This correlation function C(h) contains seven central components with inverse numbers of a period of each component (0, $\pm L_-$, $\pm L_2$, $\pm L_+$) at the nucleus as shown in the upper right part of FIG. 6.

Here, appropriate selection of these inverse numbers of the period enables mutual selection of each component contained in C(h), on the h-axis. When four components with h=0, $L_-$, $L_2$, and $L_+$ at the nucleus are taken out and then subjected to the Fourier transformation, the following expressions are satisfied.

[Mathematical Expression 14]

$$F[A_0(h)] = \frac{1}{2}m_0(\sigma)S_0(\sigma) = F_0(\sigma) \quad (1.19a)$$

$$F[A_-(h-L_-)] = \frac{1}{8}m_-(\sigma)S_{23}(\sigma)\exp i\begin{bmatrix} \phi_2(\sigma) - \\ \phi_1(\sigma) \end{bmatrix} \quad (1.19b)$$
$$= F_-(\sigma)$$

$$F[A_2(h-L_2)] = \frac{1}{4}m_2(\sigma)S_1(\sigma)\exp i\phi_2(\sigma) = F_2(\sigma) \quad (1.19c)$$

$$F[A_+(h-L_+)] = -\frac{1}{8}m_+(\sigma)S_{23}*(\sigma)\exp i\begin{bmatrix} \phi_2(\sigma) + \\ \phi_1(\sigma) \end{bmatrix} \quad (1.19d)$$
$$= F_+(\sigma)$$

As seen from the expressions above, what are obtained in the above operation are just the complex representations of the components [1] to [4] to be obtained in foregoing Step 2. Namely, in the above operations, Steps 1 and 2 are concurrently realized. Hence, when Step 3 is performed using the results of Steps 1 and 2, all spectrometric Stokes parameters are obtained all at once.

1.5 Pre-calibration: Calibration of Reference Amplitude Function, Reference Phase Function, Reference Complex Function "Prior to Measurement"

As described in the previous section, when an SOP (spectrometric Stokes parameters) is determined from a channeled spectrum, it is necessary to determine in advance in Step 3 parameters to be obtained based only on a property of a polarimeter itself, namely:

"reference amplitude function" $m_0(\sigma)$, $m_-(\sigma)$, $m_2(\sigma)$, $m_+(\sigma)$, and "reference phase function" $\sigma_2(\sigma)$ and $\sigma_2(\sigma)$, or "reference complex function" $K_0(\sigma)$, $K_-(\sigma)$, $K_2(\sigma)$, $K_+(\sigma)$ The former ("reference amplitude function" and "reference phase function") and the latter ("reference complex function") are required in the respective cases of obtaining spectrometric Stokes parameters from the "amplifier and phase" and the "complex representation" of each vibration component. Since these are functions not depending upon light under measurement, it is desirable to calibrate the functions at least prior to measurement.

Figure 7:
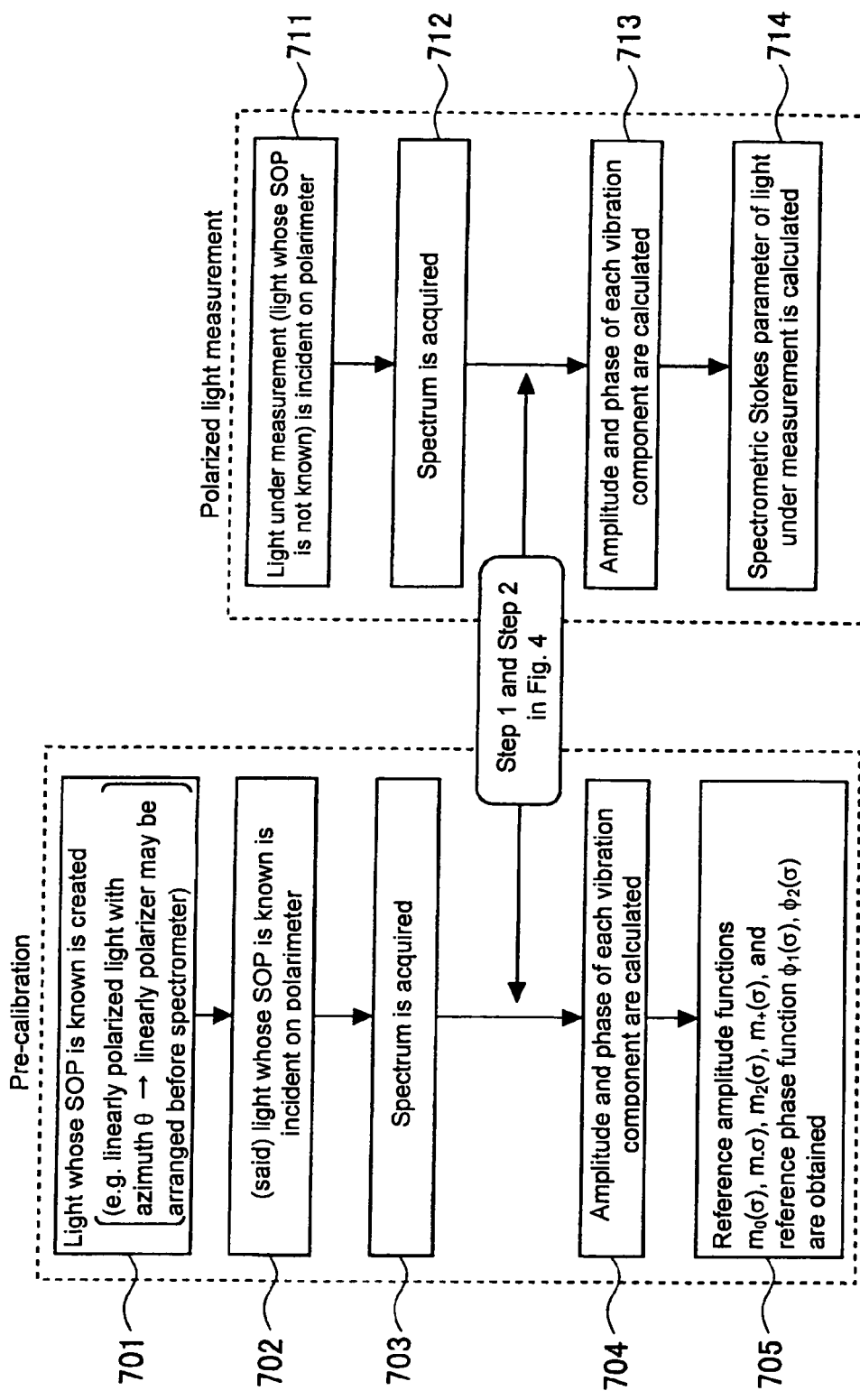
FIG. 7 shows a flowchart of pre-calibration and polarized light measurement.
Figure 8:
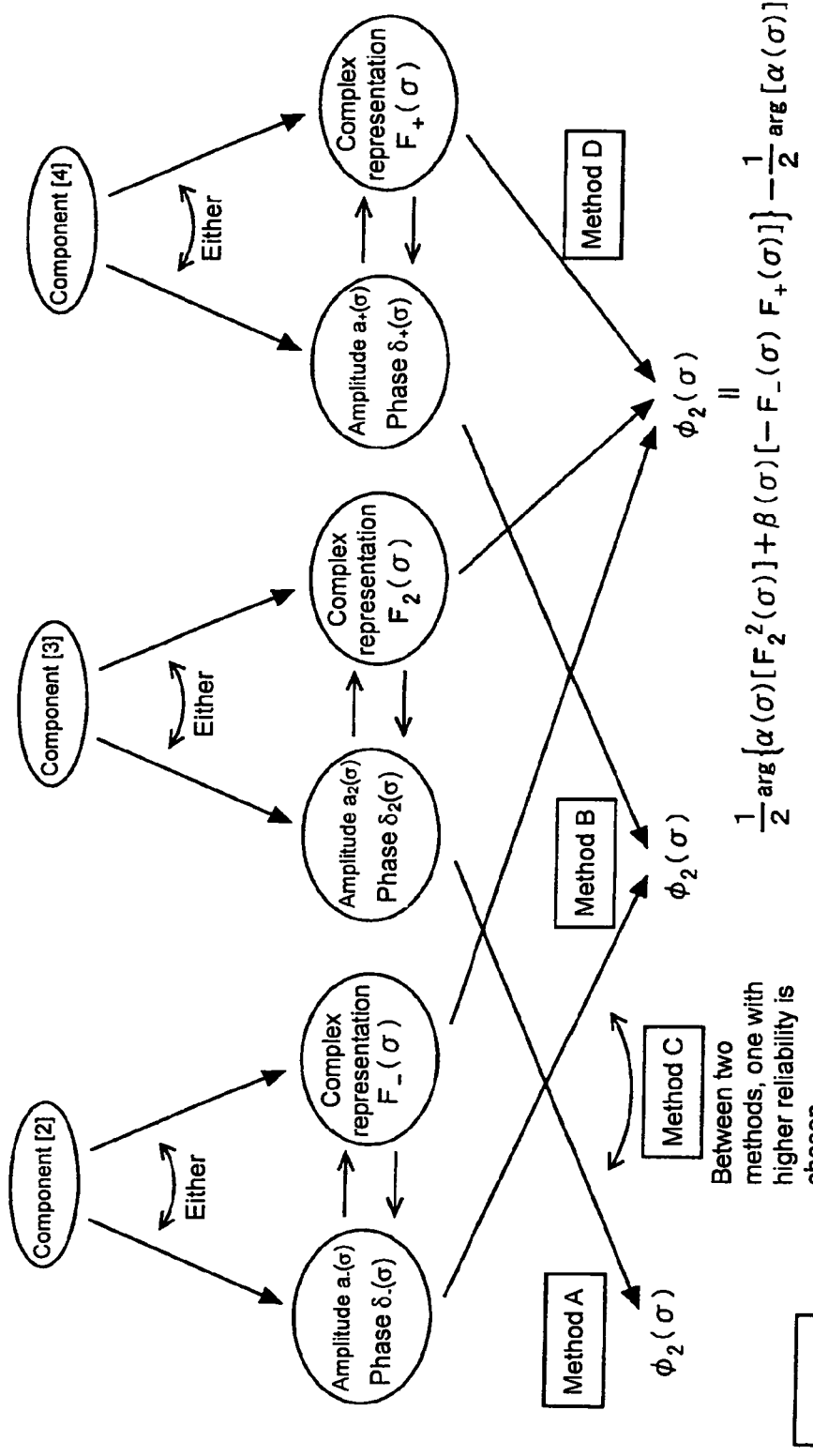
FIG. 8 shows an explanatory view of flows of signals for calibration during measurement.
Figure 9:
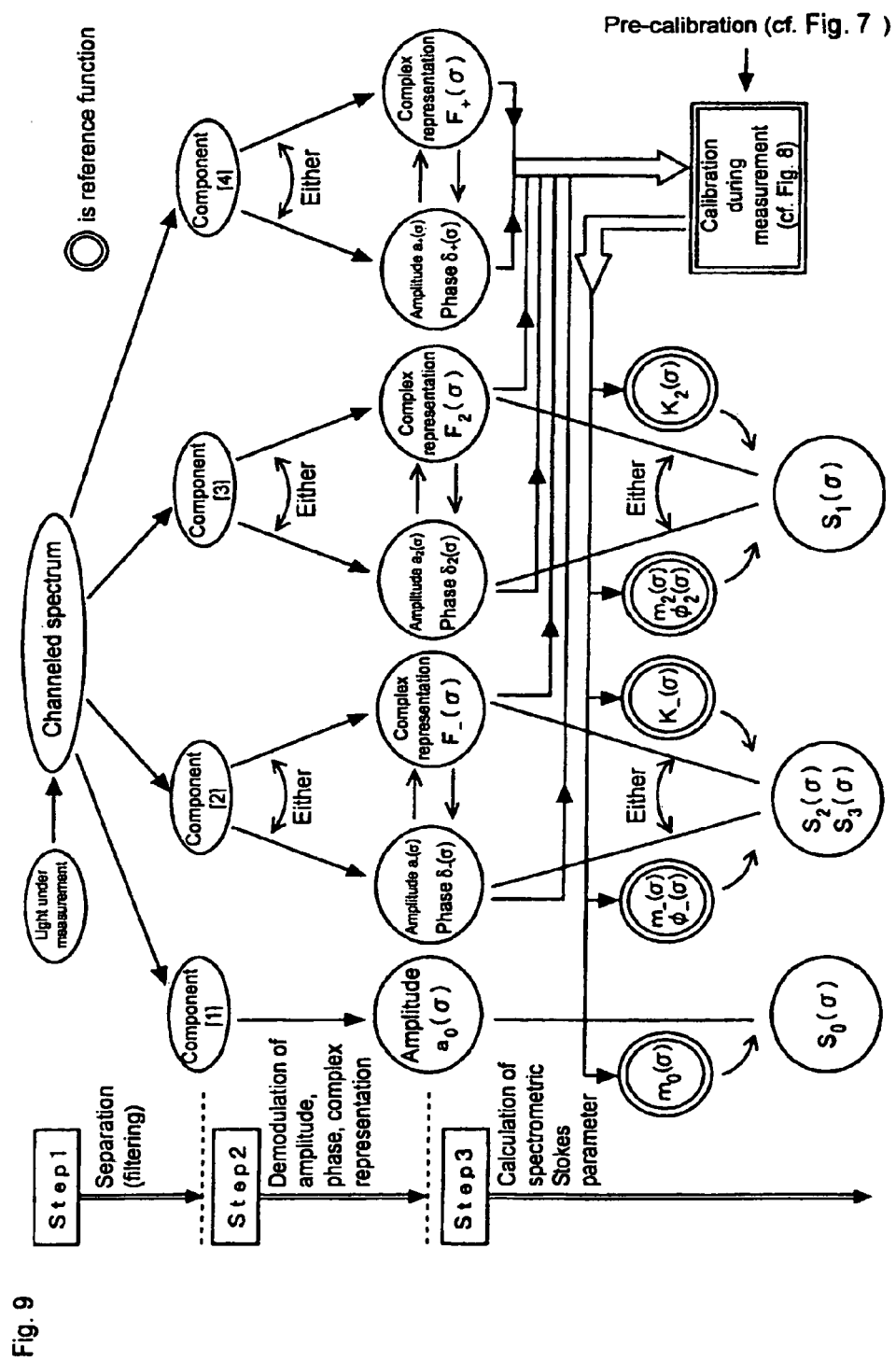
FIG. 9 shows an explanatory view of flows of signals in the combination of the "calibration during measurement" and the "measurement of a spectrometric Stokes parameter".

In this section, a process for calibrating these reference functions "prior to measurement, i.e. in advance" is described. Namely, as shown in FIG. 7, pre-calibration (Steps 701 to 705) needs to be performed prior to polarization measurement (Steps 711 to 714). There are two typical methods as follows.

[Method 1]: a method for calibrating reference phase functions and reference amplitude functions based upon a property of each element for use in the optical system.

[Method 2]: a method for calibrating reference phase functions and reference amplitude functions by the use of light having a known SOP.

1.5.1 [Method 1]

Method for Calibrating Reference Phase Function and Reference Amplitude Function Based Upon Property of Each Element for Use in Optical System Properties of a reference phase function and a reference amplitude function are essentially determined based upon elements for use in a channeled spectroscopic polarimeter. Therefore, optical properties of individual elements are repeatedly examined by experiment or calculation to perform calibration of parameters.

1.5.2 [Method 2]

Method for Calibrating Reference Phase Function and Reference Amplitude Function by Use of Light Having a Known SOP The reference phase function and the reference amplitude function are in amount determined based not upon "SOP of light under measurement", but only upon the property of the "channeled spectroscopic polarimeter". Accordingly, the "light having a known SOP" (light whose measurement result is known)" is inputted into the polarimeter, and using the result of the input, it is possible to calculate backward the reference phase function and the reference amplitude function.

It is to be noted that the "channeled spectroscopic polarimeter" has the following advantages.

The "light whose SOP is known" may be "only one kind" of light.

"Linearly polarized light" can be used as the "only one kind of light".

In a currently used polarimeter for obtaining spectrometric Stokes parameters, it has been normally required in calibration that at least four kinds of light with different states of polarization be prepared and further that at least one kind of light be not linearly polarized light. As opposed to this, in the channeled spectroscopic polarimeter, only one kind of known polarized light is required, and it may further be linearly polarized light. The linearly polarized light is convenient because, unlike light in other SOPs, the linearly polarized light can facilitate creation of precisely controlled polarized light by means of high-extinction polarizer made of crystal.

Below, the process for calibration is shown. As described at the beginning of this section, the following should be noted.

When the SOP is obtained from the "amplitude and phase" of each vibration component, the "reference amplitude function" and the "reference phase function" are required.

When the SOP is obtained from the "complex representation" of each vibration component, the "reference complex function" is required.

In the following, the respective processes for calibration in the above two cases are described. Although these processes are essentially equivalent and different only in calculation method, they are separately put down for the sake of convenience.

A. Calibration Process for Separately Obtaining Reference Amplitude Function and Reference Phase Function In this calibration, first, "light having some known SOP" is prepared, and then incident on a channeled spectroscopic polarimeter. Spectrometric Stokes parameters of the known light are referred to as $S_0^{(0)}(\sigma)$, $S_1^{(0)}(\sigma)$, $S_2^{(0)}(\sigma)$, and $S_3^{(0)}(\sigma)$. When the light is subjected to the above-mentioned demodulation means, the amplitude and the phase obtained in Step 2 are expressed as follows according to Expressions (1.13a) to (1.13d).

[Mathematical Expression 15]

Component [1] (low frequency component): (1.20a)

[amplitude] $a_0^{(0)}(\sigma) = \frac{1}{2}m_0(\sigma)S_0^{(0)}(\sigma)$

[phase] $\delta_0^{(0)}(\sigma) = 0$

Component [2] (central period $1/L_-$): (1.20b)

[amplitude] $a_-^{(0)}(\sigma) = \frac{1}{4}m_-(\sigma)|S_{23}^{(0)}(\sigma)|$

[phase] $\delta_-^{(0)}(\sigma) = \phi_2(\sigma) - \phi_1(\sigma) + \arg\{S_{23}^{(0)}(\sigma)\}$ Component [3] (central period $1/L_2$): (1.20c)

[amplitude] $a_2^{(0)}(\sigma) = \frac{1}{2}m_2(\sigma)S_1^{(0)}(\sigma)$

[phase] $\delta_2^{(0)}(\sigma) = \phi_2(\sigma)$

Component [4] (central period $1/L_+$): (1.20d)

[amplitude] $a_+^{(0)}(\sigma) = \frac{1}{4}m_+(\sigma)|S_{23}^{(0)}(\sigma)|$

[phase] $\delta_+^{(0)}(\sigma) = \phi_2(\sigma) + \phi_1(\sigma) - \arg\{S_{23}^{(0)}(\sigma)\} + \pi$ where, $S_{23}^{(0)}(\sigma) = S_2^{(0)}(\sigma) + iS_3^{(0)}(\sigma)$ (1.21)

It is to be noted that this is mere replacement of $S_0(\sigma)$ to $S_3(\sigma)$ with $S_0^{(0)}(\sigma)$ to $S_3^{(0)}(\sigma)$.

The phase and the amplitude of each vibration component are determined only by the spectrometric Stokes parameters, the reference phase functions and the reference amplitude functions. Here, since the spectrometric Stokes parameters are known in a "case where light whose SOP is known is incident", the remaining reference amplitude functions $m_0(\sigma)$, $m_-(\sigma)$, $m_2(\sigma)$, $m_+(\sigma)$, and reference amplitude functions $\phi_1(\sigma)$ and $\phi_2(\sigma)$ are determined from the demodulated amplitude and phase. Specifically, these functions are given according to the following expressions:

[Mathematical Expression 16]

$$m_0(\sigma) = \frac{2a_0^{(0)}(\sigma)}{S_0^{(0)}(\sigma)} \quad (1.22a)$$

$$m_-(\sigma) = \frac{4a_-^{(0)}(\sigma)}{|S_{23}^{(0)}(\sigma)|} \quad (1.22b)$$

$$m_2(\sigma) = \frac{2a_2^{(0)}(\sigma)}{|S_1^{(0)}(\sigma)|} \quad (1.22c)$$

$$m_+(\sigma) = \frac{4a_+^{(0)}(\sigma)}{|S_{23}^{(0)}(\sigma)|} \quad (1.22d)$$

$$\phi_-(\sigma) = \phi_2(\sigma) - \phi_1(\sigma) = \delta_-^{(0)}(\sigma) - \arg\{S_{23}^{(0)}(\sigma)\} \quad (1.22e)$$

$$\phi_2(\sigma) = \delta_2^{(0)}(\sigma) \quad (1.22f)$$

$$\phi_+(\sigma) = \phi_2(\sigma) + \phi_1(\sigma) = \delta_+^{(0)}(\sigma) + \arg\{S_{23}^{(0)}(\sigma)\} - \pi \quad (1.22g)$$

Once these reference functions are obtained (can be calibrated), spectrometric Stokes parameters of light having an unknown SOP can be obtained.

It should be noted that it is seen from the above that the condition for the light having a known SOP is only that not all of $I_0^{(0)}(\sigma)$, $S_1^{(0)}(\sigma)$ and $S_{23}^{(0)}(\sigma)$ are zero. In particular, as for the last $S_{23}^{(0)}(\sigma)$, it is meant that the condition is satisfied even when one of $S_2^{(0)}(\sigma)$ and $S_3^{(0)}(\sigma)$ is zero if the other is not zero. Here, $S_3^{(0)}(\sigma)=0$ means linearly polarized light. Namely, calibration is possible by the use of linearly polarized light alone. Specifically, when linearly polarized light with an angle θ is used as the known light, the spectrometric Stokes parameters are expressed as follows.

$$S_0^{(0)}(\sigma) = I^{(0)}(\sigma) \quad (1.23a)$$

$$S_1^{(0)}(\sigma) = I^{(0)}(\sigma)\cos 2\theta \quad (1.23b)$$

$$S_2^{(0)}(\sigma) = I^{(0)}(\sigma)\sin 2\theta \quad (1.23c)$$

$$S_3^{(0)}(\sigma) = 0 \quad (1.23d)$$

Here, $S_0^{(0)}(\sigma)$ is a spectrum of incident light. In this case, the above expressions (1.22a) to (1.22g) are expressed as follows.

[Mathematical Expression 17]

$$m_0(\sigma) = \frac{2a_0^{(0)}(\sigma)}{I^{(0)}(\sigma)} \quad (1.24a)$$

$$m_-(\sigma) = \frac{4a_-^{(0)}(\sigma)}{I^{(0)}(\sigma)\sin 2\theta} \quad (1.24b)$$

$$m_2(\sigma) = \frac{2a_2^{(0)}(\sigma)}{I^{(0)}(\sigma)\cos 2\theta} \quad (1.24c)$$

$$m_+(\sigma) = \frac{4a_+^{(0)}(\sigma)}{I^{(0)}(\sigma)\sin 2\theta} \quad (1.24d)$$

$$\phi_-(\sigma) = \phi_2(\sigma) - \phi_1(\sigma) = \delta_-^{(0)}(\sigma) \quad (1.24e)$$

-continued $$\phi_2(\sigma) = \delta_2^{(0)}(\sigma) \quad (1.24f)$$

$$\phi_+(\sigma) = \phi_2(\sigma) + \phi_1(\sigma) = \delta_+^{(0)}(\sigma) - \pi \quad (1.24g)$$

It is revealed from the above that the reference amplitude function and the reference phase function can be obtained if only the direction θ and the spectrum $I^{(0)}(\sigma)$ of a light source are known in advance. Further, even with $I^{(0)}(\sigma)$ unknown, if only the direction θ is known, it can still be sufficient for use in obtaining part of (essential) polarized light parameters.

B. Calibration Process for Obtaining Both Altogether (by Regarding Both as Reference Complex Function) at Once The above-mentioned method was a method for calculating the "amplitude" and the "phase" of each vibration component separately. However, it may be more convenient (efficient) in some cases to calculate them as the "complex representation" of each vibration component. One example of such calculation may be the case of directly obtaining the "complex representation" (Expressions (1.15a) to (1.15d)), as in the Fourier transform method shown in FIG. 6 above. In such a case, calibration is efficiently performed when the "complex representation" is calculated as it is without separation into the "amplitude" and "phase".

In the following, mathematical expressions for the above-mentioned case are shown. What needs to be concerned here is that the physical natures of the cases of using "amplitude and phase" and the "complex representation" are completely the same. It is just that in the latter case, a calculation is made using complex numbers, and thus more efficient.

Similarly to the previous section, a case is considered where light having known spectrometric Stokes parameters $S_0^{(0)}(\sigma)$, $S_1^{(0)}(\sigma)$, $S_2^{(0)}(\sigma)$, and $S_3^{(0)}(\sigma)$ is incident on a channeled spectroscopic polarimeter. A complex representation of each vibration component is obtained according to Expressions (1.15a) to (1.15d) as follows.

$$F_0^{(0)}(\sigma) = K_0(\sigma)S_0^{(0)}(\sigma) \quad (1.25a)$$

$$F_-^{(0)}(\sigma) = K_-(\sigma)S_{23}^{(0)}(\sigma) \quad (1.25b)$$

$$F_2^{(0)}(\sigma) = K_2(\sigma)S_1^{(0)}(\sigma) \quad (1.25c)$$

$$F_+^{(0)}(\sigma) = K_+(\sigma)S_{23}^{(0)*}(\sigma) \quad (1.25d)$$

Here, the complex functions $K_0(\sigma)$, $K_-(\sigma)$, $K_2(\sigma)$, and $K_+(\sigma)$ are in amount (reference complex function) determined based not upon light under measurement, but only upon the reference amplitude function and the reference phase function, as seen from Expressions (1.16a) to (1.16d). Accordingly, these can be calculated backward as follows.

[Mathematical Expression 18]

$$K_0(\sigma) = \frac{F_0^{(0)}(\sigma)}{S_0^{(0)}(\sigma)} \quad (1.26a)$$

$$K_-(\sigma) = \frac{F_-^{(0)}(\sigma)}{S_{23}^{(0)}(\sigma)} \quad (1.26b)$$

$$K_2(\sigma) = \frac{F_2^{(0)}(\sigma)}{S_1^{(0)}(\sigma)} \quad (1.26c)$$

$$K_+(\sigma) = \frac{F_+^{(0)}(\sigma)}{S_{23}^{(0)*}(\sigma)} \quad (1.26d)$$

Similar to the case of calculating the amplitude and the phase separately, once the above reference complex function is obtained (can be calibrated), spectrometric Stokes parameters of light having an unknown SOP can be obtained.

It is to be noted that, just for reference, a mathematical expressions in the case of using linearly polarized light with the direction θ are shown below.

[Mathematical Expression 19]

$$K_0(\sigma) = \frac{F^{(0)}(\sigma)}{I^{(0)}(\sigma)} \qquad (1.27a)$$

$$K_-(\sigma) = \frac{F_-^{(0)}(\sigma)}{I^{(0)}(\sigma)\sin 2\theta} \qquad (1.27b)$$

$$K_2(\sigma) = \frac{F_2^{(0)}(\sigma)}{I^{(0)}(\sigma)\cos 2\theta} \qquad (1.27c)$$

$$K_+(\sigma) = \frac{F_+^{(0)}(\sigma)}{I^{(0)}(\sigma)\sin 2\theta} \qquad (1.27d)$$

Chapter 2: Problems of Channeled Spectroscopic Polarimeter

As described in Step 3 in Section 1.4, for demodulation of spectrometric Stokes parameters $S_0(\sigma)$, $S_1(\sigma)$, $S_2(\sigma)$, and $S_3(\sigma)$ from a measured channeled spectrum $P(\sigma)$, it is necessary to obtain (calibrate) the following functions in advance (cf. FIG. 7).

[Mathematical Expression 20]

$$\text{Reference amplitude function} \begin{Bmatrix} m_0(\sigma) \\ m_-(\sigma) \\ m_2(\sigma) \\ m_+(\sigma) \end{Bmatrix}$$

$$\text{Reference phase function} \begin{Bmatrix} \phi_1(\sigma) \\ \phi_2(\sigma) \end{Bmatrix}$$

or $$\text{Reference complex function} \begin{Bmatrix} K_0(\sigma) \\ K_-(\sigma) \\ K_2(\sigma) \\ K_+(\sigma) \end{Bmatrix}$$

However, the reference phase functions $\phi_1(\sigma)$ and $\phi_2(\sigma)$ have the property of varying for a variety of reasons. When these functions vary, there occurs a problem in that a large error occurs in measured values of the spectrometric Stokes parameters.

2.1 Cause of Variations in Reference Phase Function

2.1.1 Temperature Change

Figure 23:
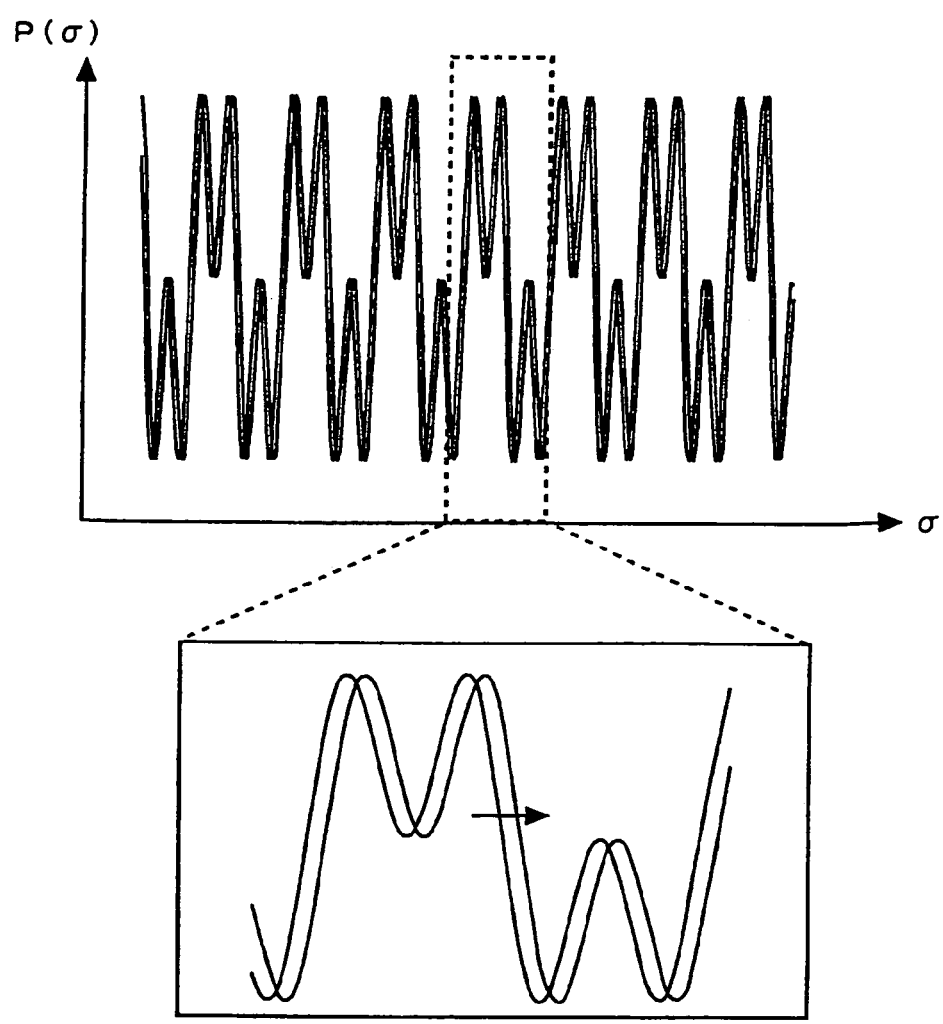
FIG. 23 shows a graph for explaining a phase displacement of the channeled spectrum due to a temperature change.
Figure 24:
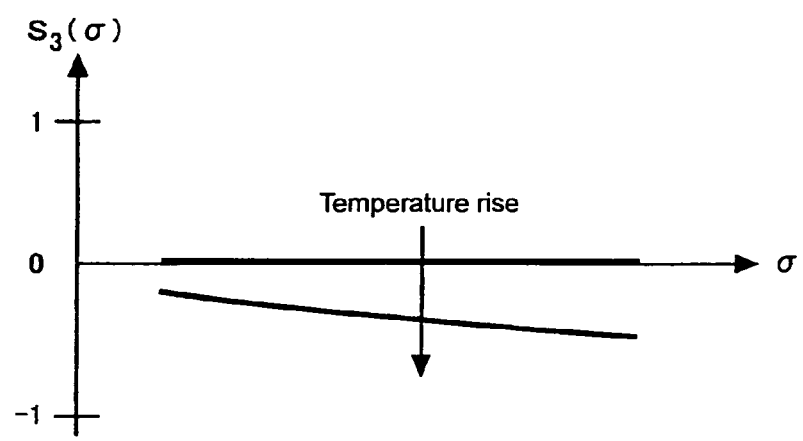
FIG. 24 shows a graph for explaining variations in Stokes parameter due to a temperature change.

The reference phase functions $\phi_1(\sigma)$ and $\phi_2(\sigma)$ are amounts (retardation) determined by the retarders $R_1$ and $R_2$ in the spectroscopic polarimeter. This retardation has the property of changing sensitively with respect to a temperature. Hence the phase of the channeled spectrum is displaced due to the temperature change (cf. FIG. 23). This results in occurrence of an error in a measured value due to a temperature rise (cf. FIG. 24). Moreover, a similar change occurs with respect to pressure change.

2.1.2 Variations in Wavelength Axis of Spectrometer

Figure 25:
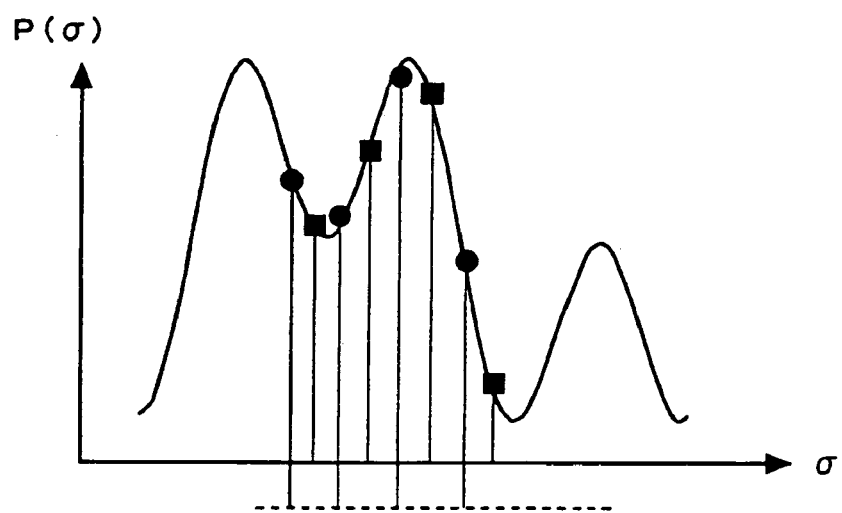
FIG. 25 shows a graph for explaining phase displacement due to variations in a wavelength axis of a spectrometer.

When a wavelength to be sampled with the spectrometer is displaced, a problem that is "equivalent" to fluctuations in the reference phase function occurs. When the wavelength to be sampled is displaced during measurement, a similar effect to an effect in lateral displacement of the spectrum is produced. This is an equivalent phase displacement (cf. FIG. 25). In particular, in an ordinary spectrometer (type of rotating a diffraction grating with a motor), a wavelength to be sampled is displaced by small degree (at random) in every measurement, due to backlash of a motor or the like.

2.1.3 Solution Easily Found

For preventing variations in the reference phase function of each vibration component, stabilizing a cause of the fluctuations is considered. However, this is very hard to realize. For example, when noting the temperature variation, the accuracy required for wavenumber-distribution of an ellipsometric parameter in spectrometric ellipsometry is in the order of not lager than 0.1°, and for satisfying this, it is necessary to keep the temperature variation within the order of 0.5° C. This requires large equipment for temperature stabilization, unfavorably leading to a loss of a variety of advantages (size reduction, non-inclusion of an active element, etc.) of the channeled spectroscopic polarimetry.

Chapter 3: Configuration of Embodiment of Present Invention

The reference phase functions $\phi_1(\sigma)$ and $\phi_2(\sigma)$ (depending not upon light under measurement but only upon parameters of the polarimeter) included in the channeled spectrum vary by a variety of factors, which becomes a major contributor to an error. In consideration of this respect, in the present embodiment, the channeled spectroscopic polarimeter is provided with an action capable of calibrating the reference phase functions $\phi_1(\sigma)$ and $\phi_2(\sigma)$ of each vibration component during measurement (concurrently with measurement) (cf. FIGS. 8 to 10).

3.1 Method for Calibration "During Measurement" (No. 1)

The calibration method described in Section 1.5 was a method for calibration "prior to measurement". As opposed to this, in the following section, a method for calibration "during measurement" is shown. This is an embodiment of the "principal part of the invention".

3.1.1 Basic Idea

The amplitude and the phase obtained in Step 2 in Chapter 1 during measurement (when light in an unknown SOP is incident on the channeled spectroscopic polarimeter) is shown again below.

[Mathematical Expression 21]

•Component [1](low frequency component):

[amplitude] $a_0(\sigma) = \frac{1}{2}m_0(\sigma)S_0(\sigma)$ (3.1a)

[phase] $\delta_0(\sigma) = 0$

•Component [2](central period $1/L_-$):

[amplitude] $a_-(\sigma) = \frac{1}{4}m_-(\sigma)|S_{23}(\sigma)|$ (3.1b)

[phase] $\delta_-(\sigma) = \phi_2(\sigma) - \phi_1(\sigma) + arg\{S_{23}(\sigma)\}$ -continued

• Component [3](central period $1/L_2$):

[amplitude] $a_2(\sigma) = \frac{1}{2}m_2(\sigma)S_1(\sigma)$ (3.1c)

[phase] $\delta_2(\sigma) = \phi_2(\sigma)$

• Component [4](central period $1/L_+$):

[amplitude] $a_+(\sigma) = \frac{1}{4}m_+(\sigma)|S_{23}(\sigma)|$ (3.2d)

[phase] $\delta_+(\sigma) = \phi_2(\sigma) + \phi_1(\sigma) - \arg\{S_{23}(\sigma)\} + \pi$ Here, all needed for obtaining the four spectrometric Stokes parameters are found to be:
"amplitude" of Component [1]→$S_0(\sigma)$
"amplitude" and "phase" of one of Component [2] and Component [4]→$S_2(\sigma)$ and $S_3(\sigma)$
"amplitude" of Component [3]→$S_1(\sigma)$ It is found that the remaining ones as follows are not used for demodulation of the spectrometric Stokes parameters.
"phase" of Component [3]
"amplitude" and "phase" of the remaining one of Components [2] and [4]

The present inventors and the like found it possible to obtain not only the four spectrometric Stokes parameter but also the "reference phase functions ($\phi_1(\sigma)$, $\phi_2(\sigma)$, etc.)" all at once through the use of the remaining component. This method means that calibration can be concurrently performed in the midst of measurement without particular input of known polarized light.

3.1.2 Preparation

In order to use the "calibration method during measurement", the following prior preparation is necessary.

The reference amplitude functions $m_0(\sigma)$, $m_-(\sigma)$, $m_2(\sigma)$, and $m_+(\sigma)$ are subjected to pre-calibration (cf. FIG. 7)

Since the following method is effective only on the reference phase function, any one of the methods descried in Section 1.5 is to be performed as for the reference amplitude function. It is to be noted that the fluctuations in the reference amplitude function during measurement typically have considerably small magnitude, and are ignorable in many cases. Namely, in contrast to the reference phase function, there is generally almost no need for re-calibration of the reference amplitude function during measurement.

As for the reference phase function, the pre-calibration is not necessarily required. However, a ratio between $\phi_1(\sigma)$ and $\phi_2(\sigma)$ needs to be obtained in advance. More generally speaking, data showing the relation between $\phi_1(\sigma)$ and $\phi_2(\sigma)$ needs to be obtained and made available in advance so that one of $\phi_1(\sigma)$ and $\phi_2(\sigma)$ can be obtained from the other by the use of the data.

Example 1: when the retarders $R_1$ and $R_2$ are made of the same medium, the ratio between $\phi_1(\sigma)$ and $\phi_2(\sigma)$ is determined from a ratio between thicknesses of the two retarders.

Example 2: By further pre-calibration of the reference phase function, the ratio between $\phi_1(\sigma)$ and $\phi_2(\sigma)$ is determined (this ratio may be considered not to change during measurement).

Note here that, in cases including a case where the ratio between the retarders $R_1$ and $R_2$ changes (e.g. temperatures of the two retarders are different) during measurement, a method described below cannot be used.

3.1.3 Actual Calibration Method

Based upon the above-mentioned idea, a method for actual calibration is described below.

A. Method for Obtaining Reference Phase Function $\phi_2(\sigma)$ from Vibration Component [3]

By noting only Vibration Component [3], the amplitude and the phase thereof are shown again as follows.

[Mathematical Expression 22]

$$\begin{cases} \text{[amplitude]} \, a_2(\sigma) = \frac{1}{2}m_2(\sigma)S_1(\sigma) \\ \text{[phase]} \, \delta_2(\sigma) = \phi_2(\sigma) \end{cases} \quad (3.2)$$

What needs to be noted here is that the phase $\delta_2(\sigma)$ of this component is one ($\phi_2(\sigma)$) of the reference phase functions (itself). Namely, when the phase $\delta_2(\sigma)$ of Component [3] is measured, one ($\phi_2(\sigma)$) of the reference phase functions is immediately determined according to the following expression.

$\phi_2(\sigma) = \delta_2(\sigma)$ (3.3)

This relational expression is constantly satisfied regardless of an SOP of light under measurement, meaning that one of the reference phase functions can be immediately obtained from a measured value, even from a channeled spectrum by any kind of light under measurement. This is a calibration method that can be performed utterly concurrently during measurement, and in the case of "using known polarized light", there is no need for performing calibration "prior to measurement or after discontinuation of measurement" as in (Section 1.5). However, it should be noted that, at this time, the condition of observing Component [3] at a sufficient SN ratio needs to be satisfied (cf. later-described C)

It is to be noted that, when the "complex representation" is obtained in place of the "set of the amplitude and phase" in Step 2 of the "process for demodulating spectrometric Stokes parameters in Section 1.4, a calculation method, rewritten from the above and described below, may be applied.

From Expression (1.12b), $\delta_2(\sigma)$ has the following relation with the complex representation $F_2(\sigma)$ of Component [3].

$\delta_2(\sigma) = \arg[F_2(\sigma)]$ (3.4)

Therefore, the reference phase function $\phi_2(\sigma)$ can be obtained from the complex representation of Component [3] according to the following expression.

$\phi_2(\sigma) = \arg[F_2(\sigma)]$ (3.5)

It should be noted that what is needed at the time of complex representation is not the reference phase function $\phi_2(\sigma)$ but the reference complex function $K_2(\sigma)$. Since there is a relation between these two functions as expressed by Expression (1.16c), once $\phi_2(\sigma)$ is determined, $K_2(\sigma)$ can also be determined (this will be later described in details in F).

B. Method for Obtaining Reference Phase Function $\phi_2(\sigma)$ from a Plurality of Vibration Components (Set of [2] and [4], etc.)

The respective phases of Vibration Components [2] and [4] are again shown as follows.

Phase of Component [2]:

$\delta_-(\sigma) = \phi_2(\sigma) - \phi_1(\sigma) + \arg\{S_{23}(\sigma)\}$ (3.6a)

Phase of Component [4]:

$\delta_+(\sigma) = \phi_2(\sigma) + \phi_1(\sigma) - \arg\{S_{23}(\sigma)\}\pi$ (3.6b)

When the one phase is added to the other, $\phi_1(\sigma)$ and $\arg\{S_{23}(\sigma)\}$ are canceled out, and only the terms depending upon $\phi_2(\sigma)$ are left. It is found therefrom that the following expression can be satisfied.

[Mathematical Expression 23]

$$\phi_2(\sigma) = \frac{1}{2}\{\delta_-(\sigma) + \delta_+(\sigma)\} - \frac{\pi}{2} \quad (3.7)$$

The right side of the above expression means that one ($\phi_2(\sigma)$) of the reference phase functions can be obtained by taking an average of the phases of Vibration Components [2] and [4]. Similarly to Method A, this relational expression can also be satisfied regardless of an SOP of light under measurement, meaning that one of the reference phase functions can be immediately obtained from a measured value, even from a channeled spectrum by any kind of light under measurement.

Namely, similarly to Method A, this is a "calibration method that can be performed utterly concurrently during measurement", and in the case of "using known polarized light", there is no need for performing calibration "prior to measurement or after discontinuation of measurement" as in (Section 1.5). However, it should be noted that the condition of observing Components [2] and [4] at a sufficient SN ratio needs to be satisfied (cf. later-described C)

Here, similarly to the case of Method A, a calculation method is described for a case where the "complex representation" is obtained in place of the "set of the amplitude and phase" in Step 2 of Section 1.4.

From Expression (1.12b), $\delta_-(\sigma)$ and $\delta_+(\sigma)$ have the following relation with the complex representations $F_-(\sigma)$ and $F_+(\sigma)$ of Components [2] and [4].

$$\delta_-(\sigma) = \arg[F_-(\sigma)] \quad (3.8a)$$

$$\delta_+(\sigma) = \arg[F_+(\sigma)] \quad (3.8b)$$

Therefore, the reference phase function $\phi_2(\sigma)$ can be obtained from the complex representations of the two components as follows.

[Mathematical Expression 24]

$$\phi_2(\sigma) = \frac{1}{2}\{\arg\,[F_-(\sigma)] + \arg\,[F_+(\sigma)]\} - \frac{\pi}{2} \quad (3.9)$$

Or, the following expression obtained by rewriting the above expression using a simple formula of the complex function may be applied.

[Mathematical Expression 25]

$$\phi_2(\sigma) = \frac{1}{2}\arg\,[-F_-(\sigma)F_+(\sigma)] \quad (3.10)$$

In the optically system (channeled spectroscopic polarimeter) in FIG. 1, an obtained spectrum contains another component having a different period as described in FIG. 3 and the like except for the case where the angle formed between the retarder $R_2$ and the analyzer A is not 45°.

As seen from Expression (1.7), the phase of this component is "$\delta_1(\sigma) = \phi_1(\sigma) - \arg\,\{S_{23}(\sigma)\}$", and similar to the phase terms of above Vibration Components [2] and [4]. Hence, even when Component [2] or [4] is combined (or replaced) with the another component, it is possible to calibrate $\phi_2(\sigma)$ as in Method 1.

C. Combination of A and B

The two methods (Method A and Method B) described above are methods in which one ($\phi_2(\sigma)$) of the reference phase functions can be calibrated utterly concurrently during measurement. However, the used vibration components are different between the two methods. What should be concerned here is that the amplitude of Vibration Component [3] used in Method A is proportional to $S_1(\sigma)$, while the amplitudes of Vibration Components [2] and [4] used in Method B are proportional to the following.

$$|S_{23}(\sigma)| = \sqrt{S_2^2(\sigma) + S_3^2(\sigma)} \quad \text{[Mathematical Expression 26]}$$

Since an SOP of light under measurement is unknown, there is no guarantee that the spectrometric Stokes parameters are constantly sufficiently large for phase measurement for each component. For example, when light with small $S_1(\sigma)$ is projected as the light under measurement, determination of $\phi_2(\sigma)$ by Method A using the phase of this component might result in occurrence of a large error. For solving this problem, adaptive combination of Methods A and B is desired. Specifically, a value of $\phi_1(\sigma)$ with more certainty can be obtained by selecting, or weighting up and balancing, results of the two methods.

It should be noted that light under measurement whose $S_1(\sigma)$ and $S_{23}(\sigma)$ are "both" very small is practically nonexistent. This is because, when both are small, a spectral intensity of a complete polarized light:

$$\sqrt{S_1^2(\sigma) + S_2^2(\sigma) + S_3^2(\sigma)} \quad \text{[Mathematical Expression 27]}$$

is small, namely light is in a state infinitely close to non-polarized light. In such a case, there is no point of obtaining an SOP itself. Accordingly, the combination of the above Methods A and B enables calibration of $\phi_2(\sigma)$ of light under measurement in any SOP concurrently with measurement.

D. Combination of A and B (No. 2)

One idea for efficiently combining A and B is shown below. This is a method in which direct calculation is possible without particular separation by case. It should be noted that, in this part (Method D), three complex representation functions $F_-(\sigma)$, $F_2(\sigma)$ and $F_-(\sigma)$ of Components [2] to [4] are used for calculation. When a calculation is to be made from the "set of the amplitude and phase", the set may once be changed to the "complex representation" according to Expression (1.11), and then the following calculation process may be performed.

As a preparation for explaining this method, first, the following two expressions are derived and the natures thereof are described. By transforming Expression (3.5), the following expression can be obtained.

$$2\phi_2(\sigma) = \arg[F_2^2(\sigma)] \quad (3.11)$$

Meanwhile, by doubling both sides of Expression (3.10), the following expression can be obtained.

$$2\phi_2(\sigma) = \arg[-F_-(\sigma)F_+(\sigma)] \quad (3.12)$$

It is found from the comparison between the above two expressions that the complex function in the brackets on the right side of each of the expressions has the same argument $2\phi_2(\sigma)$. Further, when the absolute value of the complex function in the brackets is calculated in each of the expressions, the results are found to be as follows:

[Mathematical Expression 28]

$$|F_2^2(\sigma)| = \frac{1}{16}m_2^2(\sigma)S_1^2(\sigma) \quad (3.13a)$$

$$|-F_-(\sigma)F_+(\sigma)| = \frac{1}{64}m_-(\sigma)m_+(\sigma)\{S_2^2(\sigma)+S_3^2(\sigma)\} \quad (3.13b)$$

This expression means that the absolute value of the former (obtained from Component [3]) is proportional to $S_1^2(\sigma)$, while the absolute value of the latter (obtained from Components [2] and [4]) is proportional to $S_2^2(\sigma)+S_3^2(\sigma)$. As described above, these two complex functions do not concurrently become smaller. Thereby, appropriate "weighting functions $\alpha(\sigma)$ and $\beta(\sigma)$ having the same argument" were respectively multiplied by the above two complex functions, and then the obtained two terms were added together.

[Mathematical Expression 29]

$$\alpha(\sigma)[F_2^2(\sigma)]\beta(\sigma)[-F_-(\sigma)F_+(\sigma)] \quad (3.14)$$

It is revealed that the absolute value of the sum of the two terms (practically) do not become smaller. When either one of $S_1^2(\sigma)$ and $S_2^2(\sigma)+S_3^2(\sigma)$ becomes smaller, one of the above two terms accordingly becomes smaller, but the other remains for certain. Even when the SOP of light under measurement changes as a result, the absolute value of this expression does not become extremely smaller. Further, the argument of this expression is constantly equivalent to $2\phi_2(\sigma)+\arg\alpha(\sigma)$. Through the use of these natures, it is possible to obtain $\phi_2(\sigma)$ according to the following expression without a decrease in S/N ratio.

[Mathematical Expression 30]

$$\phi_2(\sigma) = \quad (3.15)$$
$$\frac{1}{2}\arg\{\alpha(\sigma)\,[F_2^2(\sigma)] + \beta(\sigma)\,[-F_-(\sigma)F_+(\sigma)]\} - \frac{1}{2}\arg\,[\alpha(\sigma)]$$

Two ways to select specific $\alpha(\sigma)$ and $\beta(\sigma)$ are shown below.

$$\alpha(\sigma)=\beta(\sigma)=1 \quad [D-1]$$

The simplest way to select the weighting functions is making the two functions the same constant (1). In this case, an expression for obtaining the reference phase function $\phi_2(\sigma)$ is shown below.

[Mathematical Expression 31]

$$\phi_2(\sigma) = \frac{1}{2}\arg\{[F_2^2(\sigma)] + [-F_-(\sigma)F_+(\sigma)]\} \quad (3.16)$$

[Mathematical Expression 32]

$$[D-2]\ \alpha(\sigma) = \frac{16}{m_2^2(\sigma)} \cdot \beta(\sigma) = \frac{64}{m_-(\sigma)m_+(\sigma)}$$

Another example is a method for selecting $\alpha(\sigma)$ and $\beta(\sigma)$ using reference amplitude functions having been subjected to pre-calibration, as shown in the above expression. Here, an expression for deriving the reference phase function $\phi_2(\sigma)$ from the complex representation of the demodulated vibration component is shown as below.

[Mathematical Expression 33]

$$\phi_2(\sigma) = \frac{1}{2}\arg\left\{\left[16\frac{F_2^2(\sigma)}{m_2^2(\sigma)}\right] + \left[-64\frac{F_-(\sigma)F_+(\sigma)}{m_-(\sigma)m_+(\sigma)}\right]\right\} \quad (3.17)$$

With the expression made in this form,

[Mathematical Expression 34]

The absolute value in{} is: (3.18)

$$\left|\left[16\frac{F_2^2(\sigma)}{m_2^2(\sigma)}\right] + \left[-64\frac{F_-(\sigma)\ F_+(\sigma)}{m_-(\sigma)\ m_+(\sigma)}\right]\right| = S_1^2(\sigma) + S_2^2(\sigma) + S_3^2(\sigma)$$

This absolute value is a square
of intensity of complete polarized light
component of light under measurement $$\sqrt{S_1^2(\sigma) + S_2^2(\sigma) + S_3^2(\sigma)}$$

In particular, this constantly agrees with the square (($S_0^2(\sigma)$)) of intensity of the light under measurement (regardless of the SOP). Namely, $\phi_2(\sigma)$ can be constantly stably obtained using Expression (3.17) so long as the light under measurement has sufficient light intensity.

E. Calculation of $\phi_1(\sigma)$

Since fluctuations in $\phi_1(\sigma)$ are considered to be similar to those in $\phi_2(\sigma)$, it is possible to obtain $\phi_1(\sigma)$ by proportional calculation (e.g. by using a thickness ratio) from a measured value of $\phi_2(\sigma)$.

F. Calculation of Reference Complex Function

In the demodulation in Step 2 of the "process for demodulating spectrometric Stokes parameters" in Section 1.4, when (not the "set of the amplitude and phase" but) the "complex representation" is obtained, what are needed ultimately in the operation of Step 3 for obtaining the spectrometric Stokes parameters are not the reference phase functions $\phi_1(\sigma)$ and $\phi_2(\sigma)$ but the reference complex functions $K_0(\sigma)$, $K_-(\sigma)$, $K_2(\sigma)$, and $K_+(\sigma)$. However, these can also be immediately obtained through the use of the relations of Expressions (1.16a) to (1.16d) if the reference phase functions $\phi_1(\sigma)$ and $\phi_2(\sigma)$ have been obtained by the processes up to above Process E.

The spectroscopic polarimetry described in this section can be summarized as follows. In any case, it is assumed that data showing a relation between $\phi_1(\sigma)$ and $\phi_2(\sigma)$ has been made available.

The spectroscopic polarimetry of this section is a method in which, by the use of a spectral intensity obtained by launching light under measurement into the optical system (polarimetric spectroscope) of the channeled spectroscopic polarimeter, Components [1] and [3] of the spectral intensity are obtained, and at least one of Components [2], [4] and [5] of the spectral intensity is obtained, and by the use of the data showing the relation between $\phi_1(\sigma)$ and $\phi_2(\sigma)$ and each of the obtained spectral intensity components, $\phi_1(\sigma)$ and $\phi_2(\sigma)$ are obtained, and also a parameter indicating wavenumber-distribution of the SOP is obtained.

More specifically, the spectroscopic polarimetry of Method A of this section is a method to be performed as follows. By the use of the spectral intensity obtained by launching the light under measurement into the polarimetric spectroscope, Components [1] and [3] of the spectral intensity are obtained, and at least one of Components [2], [4] and [5] of the spectral intensity is obtained. $\phi_2(\sigma)$ is obtained from obtained Component [3], and $\phi_1(\sigma)$ is obtained from the data showing the relation between $\phi_1(\sigma)$ and $\phi_2(\sigma)$ and obtained $\phi_2(\sigma)$. By the use of each obtained spectral intensity component, and obtained $\phi_1(\sigma)$ and $\phi_2(\sigma)$, a parameter indicating wavenumber-distribution of the SOP is obtained. Method A is a preferred embodiment when the spectrometric Stokes parameter $S_1(\sigma)$ of the light under measurement is not zero or close to zero.

The spectroscopic polarimetry of Method B of this section is a method to be performed as follows. By the use of the spectral intensity obtained by launching the light under measurement into the polarimetric spectroscope, Components [1] and [3] of the spectral intensity are obtained, and at least two of Components [2], [4] and [5] of the spectral intensity are obtained. $\phi_2(\sigma)$ is obtained from at least two of Components [2], [4] and [5], and $\phi_1(\sigma)$ is obtained from the data showing the relation between $\phi_1(\sigma)$ and $\phi_2(\sigma)$ and obtained $\phi_2(\sigma)$. By the use of each obtained spectral intensity component, and obtained $\phi_1(\sigma)$ and $\phi_2(\sigma)$, a parameter indicating wavenumber-distribution of the SOP is obtained. Method B is a preferred embodiment in a case other than the case where the spectrometric Stokes parameters $S_2(\sigma)$ and $S_3(\sigma)$ of the light under measurement are neither zero nor close to zero.

The spectroscopic polarimetry of Methods C and D of this section are methods to be performed as follows. By the use of the spectral intensity obtained by launching the light under measurement into the polarimetric spectroscope, Components [1] and [3] of the spectral intensity are obtained, and at least two of Components [2], [4] and [5] of the spectral intensity are obtained. $\phi_2(\sigma)$ is obtained by selecting either a first process for obtaining $\phi_2(\sigma)$ from obtained Component [3] or a second process for obtaining $\phi_2(\sigma)$ from at least two of Components [2], [4] and [5], or by combining the first process and the second process, and $\phi_1(\sigma)$ is obtained from the data showing the relation between $\phi_1(\sigma)$ and $\phi_2(\sigma)$ and obtained $\phi_2(\sigma)$. By the use of each obtained spectral intensity component, and obtained $\phi_1(\sigma)$ and $\phi_2(\sigma)$, a parameter indicating wavenumber-distribution of the SOP is obtained. Methods C and D are embodiments capable of measurement by appropriate selection of either the first or second process or by appropriate combination of the first and second processes, so long as all of the spectrometric Stokes parameters $S_1(\sigma)$, $S_2(\sigma)$ and $S_3(\sigma)$ of the light under measurement are not concurrently zero or close to zero.

In the spectroscopic polarimetry of this section, since Component [5] of the spectral intensity does not appear when the analyzer A is arranged such that the direction of the transmission axis thereof forms an angle of 45° with respect to the direction of the fast axis of the second retarder $R_2$, at least either or both of Components [2] and [4] may be obtained in a part where at least one or two of Components [2], [4] and [5] are to be obtained.

3.2 Method for Calibration "during Measurement" (No. 2)

3.2.1 Basic Idea

In the same idea as described in the previous section 3.1, "only a difference" of the reference phase functions can be obtained. Although the terms "pre-calibration" and "initial value" are used below for the sake of convenience, the timing for calibration is not necessarily prior to measurement of the light under measurement. Therefore, the initial value of the reference phase function is typically grasped as a reference value for calibration of the reference phase function. Further, an appropriate value which is not a measured value is usable as the reference value for calibration of the reference phase function.

In the previous method (in the previous section 3.1), the "reference amplitude function" was obtained in the pre-calibration, and it was not particularly necessary to obtain the "reference phase function". However, as appeared from Section 3.2, those two functions can be calibrated almost concurrently. It is thus possible to obtain in advance an "initial value of the reference phase function in pre-calibration" so as to only track a difference thereof during measurement.

Advantages in this case are as follows.

Slightly additional phase displacement part which might be generated due to properties of the spectrometer or the signal processing system can be removed.

Burdensome phase unwrapping is not necessary.

Since a phase difference itself is small, a dynamic range in calculation can be made small. Further, as a result of this, a calculation error can be relatively made small in many cases.

Accordingly, "obtaining only the difference in the reference phase function" has its own meaning.

Figure 10:
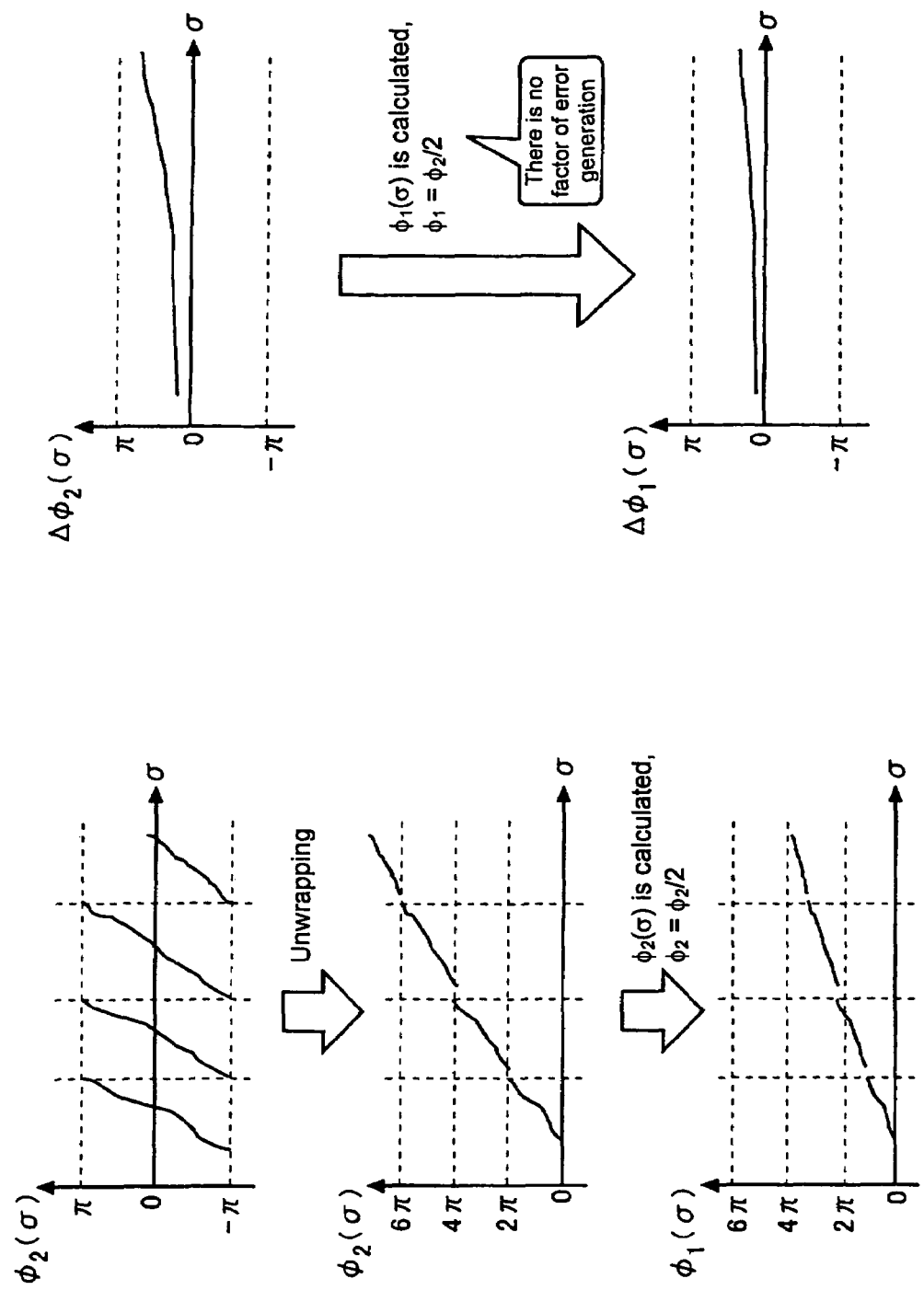
FIG. 10 shows a comparative explanatory view of methods (No. 1, 2) for calibrating a reference phase function during measurement.

The following is described as supplement for the foregoing explanation. As shown in FIG. 10, the two methods have different factors of an error in calculation of $\phi_1(\sigma)$ from $\phi_2(\sigma)$. Namely, as shown in FIG. 10(a), it is necessary to perform phase unwrapping for obtaining $\phi_1(\sigma)$ from $\phi_2(\sigma)$. This phase unwrapping is a major factor of the error. Especially when period frequency is high as compared with sampling, noise is included in the period, or the like, wrong phase unwrapping might be performed. With wrong phase wrapping performed, an error becomes an integer multiple of $2\pi$, leading to calculation of a wrong phase. Further, this error affects a broad wavenumber region. The error is essentially caused by that a solution of an arg operator (or an arc tan operator) for obtaining an argument has phase ambiguity by the integer multiple of $2\pi$. As opposed to this, as shown in FIG. 10(b), it is not necessary in obtaining $\Delta\phi_1(\sigma)$ from $\Delta\phi_2(\sigma)$ to perform phase unwrapping since the difference $\Delta\phi_2(\sigma)$ from the initial value of the reference phase function is small. This allows the measurement error to be relatively small.

3.2.2 Preparation

The use of the "calibration method during measurement" is based upon the premise of pre-calibration of both the "reference amplitude function" and the "reference phase function" prior to measurement. It is to be noted that, as for the phase, an obtained value of the phase is not necessarily required to have high accuracy since a variance difference, i.e. an error, can be corrected later.

3.2.3 Actual Calibration Method

The basic idea on the calibration method is completely the same as in Section 3.1. There thus exist calculation methods corresponding to all A to E described in Section 3.1.3. Hence, in this section, the idea is described only when different from that of the previous section, and the following description concentrates on listing of mathematical expressions.

First, a couple of symbols are defined. The reference phase functions obtained by the pre-calibration are defined as $\phi_1^{(i)}(\sigma)$ and $\phi_2^{(i)}(\sigma)$. Reference complex functions corresponding to these reference phase functions are expressed as follows according to Expressions (1.16a) to (1.16b).

[Mathematical Expression 35]

$$K_0^{(i)}(\sigma) = \frac{1}{2}m_0(\sigma) \quad (3.19a)$$

$$K_-^{(i)}(\sigma) = \frac{1}{8}m_-(\sigma)\exp i\,[\phi_2^{(i)}(\sigma) - \phi_1^{(i)}(\sigma)] \quad (3.19b)$$

$$K_2^{(i)}(\sigma) = \frac{1}{4}m_2(\sigma)\exp i\,\phi_2^{(i)}(\sigma) \quad (3.19c)$$

$$K_+^{(i)}(\sigma) = -\frac{1}{8}m_+(\sigma)\exp i\,[\phi_2^{(i)}(\sigma) + \phi_1^{(i)}(\sigma)] \quad (3.19d)$$

Assuming that the reference phase functions changed during measurement as follows.

$$\phi_1(\sigma) = \phi_1^{(i)}(\sigma) + \Delta\phi_1(\sigma) \quad (3.20a)$$

$$\phi_2(\sigma) = \phi_2^{(i)}(\sigma) + \Delta\phi_2(\sigma) \quad (3.20b)$$

Below described are methods for obtaining the differences $\Delta\phi_1(\sigma)$ and $\Delta\phi_2(\sigma)$ of the reference phase functions or changes in the reference complex functions corresponding to those differences.

A. Method for Obtaining Reference Phase Function $\phi_2$ from Vibration Component [3]

As described in Method A in the previous section, the phase of Component [3] is expressed as follows.

$$\delta_2(\sigma) = \phi_2(\sigma) = \phi_2^{(i)}(\sigma) + \Delta\phi_2(\sigma) \quad (3.21)$$

Here, the difference in $\phi_2(\sigma)$ can be obtained as:

$$\Delta\phi_2(\sigma) = \delta_2(\sigma) - \phi_2^{(i)}(\sigma) \quad (3.22)$$

Namely, this means that, once the phase $\delta_2$ of Component [3] is measured, one ($\Delta\phi_2(\sigma)$) of the differences in the reference phase functions can be immediately determined.

It is to be noted that in Step 2, when not the "set of amplitude and phase" but the "complex representation" is obtained, it is obtained according to the following expressions.

[Mathematical Expression 36]

$$\delta_2(\sigma) = \arg\,[F_2(\sigma)] \quad (3.23a)$$

$$\phi_2^{(i)}(\sigma) = \arg\,[K_2^{(i)}(\sigma)] \quad (3.23b)$$

from $$\Delta\phi_2(\sigma) = \arg\,[F_2(\sigma)] - \arg\,[K_2^{(i)}(\sigma)] \quad (3.24)$$

or $$\Delta\phi_2(\sigma) = \arg\left[\frac{F_2(\sigma)}{K_2^{(i)}(\sigma)}\right] \quad (3.25)$$

B. Method for Obtaining Reference Phase Function $\phi_2(\sigma)$ from a Plurality of Vibration Components (Set of [2] and [4], etc.)

In the method for obtaining the difference in $\phi_2(\sigma)$ from the phase of each of Vibration Component [2] and [4], the difference is obtained according to the following expression.

[Mathematical Expression 37]

$$\Delta\phi_2(\sigma) = \left[\frac{1}{2}\{\delta_-(\sigma) + \delta_+(\sigma)\} - \frac{\pi}{2}\right] - \phi_2^{(i)}(\sigma) \quad (3.26)$$

When not the "set of amplitude and phase" but the "complex representation" is to be obtained, the difference is obtained according to the following expressions.

[Mathematical Expression 38]

$$\Delta\phi_2(\sigma) = \frac{1}{2}\left\{\begin{array}{l}\arg\,[F_-(\sigma)] + \arg\,[F_+(\sigma)] - \\ \arg\,[K_-^{(i)}(\sigma)] - \arg\,[K_+^{(i)}(\sigma)]\end{array}\right\} \quad (3.27)$$

Or, the following expressions obtained by rewriting the above expression using a simple formula of the complex function may be applied.

[Mathematical Expression 39]

$$\Delta\phi_2(\sigma) = \frac{1}{2}\left\{\arg\left[\frac{F_-(\sigma)}{K_-^{(i)}(\sigma)}\right] + \arg\left[\frac{F_+(\sigma)}{K_+^{(i)}(\sigma)}\right]\right\}\text{ or} \quad (3.28)$$

$$\Delta\phi_2(\sigma) = \frac{1}{2}\arg\left[\frac{F_-(\sigma)}{K_-^{(i)}(\sigma)}\frac{F_+(\sigma)}{K_+^{(i)}(\sigma)}\right] \quad (3.29)$$

In addition, as noted at the end of Section 3.1.3, the same idea as above shown can be applied to the case of using another term.

C. Combination of A and B

As in the case described in the previous section, adaptive combination of Methods A and B is also effective in the case of obtaining only the "difference" in the reference phase functions. It should be noted that a description of the combination is completely the same as that in the previous section and it is thus omitted.

D. Combination of A and B (No. 2)

One of desired mathematical expressions in the case of obtaining only the difference is as follows.

[Mathematical Expression 40]

$$\alpha(\sigma) = \left[\frac{1}{K_2^{(i)}(\sigma)}\right]^2 \quad (3.30a)$$

$$\beta(\sigma) = -\frac{1}{K_-^{(i)}(\sigma)K_+^{(i)}(\sigma)} \quad (3.30b)$$

Since $\arg[\alpha(\sigma)] = \arg[\beta(\sigma)] = 2\phi_2(\sigma)$ in the above expressions, the difference can be obtained as follows.

[Mathematical Expression 41]

$$\Delta\phi_2(\sigma) = \frac{1}{2}\arg\left\{\left[\frac{F_2(\sigma)}{K_2^{(i)}(\sigma)}\right]^2 + \frac{F_-(\sigma)}{K_-^{(i)}(\sigma)}\frac{F_+(\sigma)}{K_+^{(i)}(\sigma)}\right\} \quad (3.31)$$

This absolute value is a square of intensity of complete polarized light component of light under measurement $$\sqrt{S_1^2(\sigma) + S_2^2(\sigma) + S_3^2(\sigma)}$$

In particular, this is constantly the square ($S_0^2(\sigma)$) of intensity of the light under measurement. (regardless of the SOP). Namely, $\Delta\phi_2(\sigma)$ can be constantly stably obtained using the above expression so long as the light under measurement has sufficient light intensity.

E. Calculation of $\Delta\phi_1(\sigma)$

Fluctuations in $\Delta\phi_1(\sigma)$ are considered to be similar to those in $\Delta\phi_2(\sigma)$. It is thus possible to use the ratio of $\phi_1(\sigma)$ and $\phi_2(\sigma)$, obtained using for example a thickness ratio, as a ratio of $\Delta\phi_1(\sigma)$ and $\Delta\phi_2(\sigma)$. More generally speaking, data showing the relation between $\Delta\phi_1(\sigma)$ and $\Delta\phi_2(\sigma)$ needs to be obtained and made available in advance so that one of $\Delta\phi_1(\sigma)$ and $\Delta\phi_2(\sigma)$ can be obtained from the other by the use of the data. Using the ratio between $\Delta\phi_1(\sigma)$ and $\Delta\phi_2(\sigma)$, $\Delta\phi_1(\sigma)$ can be obtained from a measured value of $\Delta\phi_2(\sigma)$ by proportional calculation.

F. Calculation of Reference Complex Function

In the demodulation of each vibration component in Step 2, when not the "set of the amplitude and phase" but the "complex representation" is obtained, what are needed ultimately in obtaining the spectrometric Stokes parameters (operation of Step 3) are not the reference phase functions $\phi_1(\sigma)$ and $\phi_2(\sigma)$ but the reference complex functions $K_0(\sigma)$, $K_-(\sigma)$, $K_2(\sigma)$, and $K_+(\sigma)$.

If the reference phase function differences $\Delta\phi_1(\sigma)$ and $\Delta\phi_2(\sigma)$ have been obtained by the processes up to above Process E, the reference complex functions can be immediately obtained as follows.

[Mathematical Expression 42]

$$K_0(\sigma) = K_0^{(i)}(\sigma) \quad (3.32a)$$

$$K_-(\sigma) = K_-^{(i)}(\sigma) e^{i[\Delta\phi_2(\sigma) - \Delta\phi_1(\sigma)]} \quad (3.32b)$$

$$K_2(\sigma) = K_2^{(i)}(\sigma) e^{i\Delta\phi_2(\sigma)} \quad (3.32c)$$

$$K_+(\sigma) = K_+^{(i)}(\sigma) e^{i[\Delta\phi_2(\sigma) + \Delta\phi_1(\sigma)]} \quad (3.32d)$$

The spectroscopic polarimetry described in this section can be summarized as follows. In any case, it is assumed that a reference value for calibration of the first reference phase function $\phi_1^{(i)}(\sigma)$, a reference value for calibration of the second reference phase function $\phi_2^{(i)}(\sigma)$, and data showing the relation between $\Delta\phi_1(\sigma)$ and $\Delta\phi_2(\sigma)$ are made available.

The spectroscopic polarimetry of this section is a method to be performed as follows. By the use of the spectral intensity obtained by launching the light under measurement into the polarimetric spectroscope, Components [1] and [3] of the spectral intensity are obtained, and at least one of Components [2], [4] and [5] of the spectral intensity is obtained, and by the use of $\phi_1^{(i)}(\sigma)$, $\phi_2^{(i)}(\sigma)$, the data showing the relation between $\Delta\phi_1(\sigma)$ and $\Delta\phi_2(\sigma)$, and each of the obtained spectral intensity components, $\Delta\phi_1(\sigma)$ and $\Delta\phi_2(\sigma)$ are obtained, and also a parameter indicating wavenumber-distribution of the SOP is obtained.

More specifically, the spectroscopic polarimetry of Method A of this section is a method to be performed as follows. By the use of the spectral intensity obtained by launching the light under measurement into the polarimetric spectroscope, Components [1] and [3] of the spectral intensity are obtained, and at least one of Components [2], [4] and [5] of the spectral intensity is obtained. $\Delta\phi_2(\sigma)$ is obtained from obtained $\Delta\phi_2(\sigma)$. By the use of each obtained spectral intensity component, and obtained $\Delta\phi_1(\sigma)$ and $\Delta\phi_2(\sigma)$, a parameter indicating wavenumber-distribution of the SOP is obtained.

The spectroscopic polarimetry of Method B of this section is a method to be performed as follows. By the use of the spectral intensity obtained by launching the light under measurement into the polarimetric spectroscope, Components [1] and [3] of the spectral intensity are obtained, and at least two of Components [2], [4] and [5] of the spectral intensity are obtained. $\Delta\phi_2(\sigma)$ is obtained from at least two of Components [2], [4] and [5], and $\Delta\phi_1(\sigma)$ is obtained from obtained $\Delta\phi_2(\sigma)$. By the use of each obtained spectral intensity component, and obtained $\Delta\phi_1(\sigma)$ and $\Delta\phi_2(\sigma)$, a parameter indicating wavenumber-distribution of the SOP is obtained.

The spectroscopic polarimetry of Methods C and D of this section are methods to be performed as follows. By the use of the spectral intensity obtained by launching the light under measurement into the polarimetric spectroscope, Components [1] and [3] of the spectral intensity are obtained, and at least two of Components [2], [4] and [5] of the spectral intensity are obtained. $\Delta\phi_2(\sigma)$ is obtained by selecting either a first process for obtaining $\Delta\phi_2(\sigma)$ from obtained Component [3] or a second process for obtaining $\Delta\phi_2(\sigma)$ from at least two of Components [2], [4] and [5], or by combining the first process and the second process, and $\Delta\phi_1(\sigma)$ is obtained from obtained $\Delta\phi_2(\sigma)$. By the use of each obtained spectral intensity component, and obtained $\Delta\phi_1(\sigma)$ and $\Delta\phi_2(\sigma)$, a parameter indicating wavenumber-distribution of the SOP is obtained.

In the spectroscopic polarimetry of this section, since Component [5] of the spectral intensity does not appear when the analyzer A is arranged such that the direction of the transmission axis thereof forms an angle of 45° with respect to the direction of the fast axis of the second retarder $R_2$, at least either or both of Components [2] and [4] may be obtained in a part where at least one or two of Components [2], [4] and [5] are to be obtained.

Chapter 4: Common Demonstration of Possibility for Calibration During Measurement As described in the previous chapter, it is possible in the channeled spectroscopic polarimetry to calibrate (or correct) a reference phase function or a reference phase function difference "during measurement (concurrently with measurement)". However, the description given in the previous chapter was based upon the premise of applying a signal processing method using frequency filtering, namely, separating a quasi-sinusoidal component that vibrates at a frequency different from a channeled spectrum. However, this frequency filtering is in practice not an essential step for realization of "calibration during measurement". The inventors and the like found it possible to perform calibration of the reference phase function during measurement even by a different demodulation method, namely, a different signal processing method.

In order to demonstrate this, first in this chapter, the reason why calibration is possible during measurement in the channeled spectroscopic polarimetry is described without limiting to the "specific process of the signal processing method". Further, in the next chapter, a "method for applying a generalized inverse matrix" is shown as a specific example of a "calibration method during measurement without the use of frequency filtering".

Figure 26:
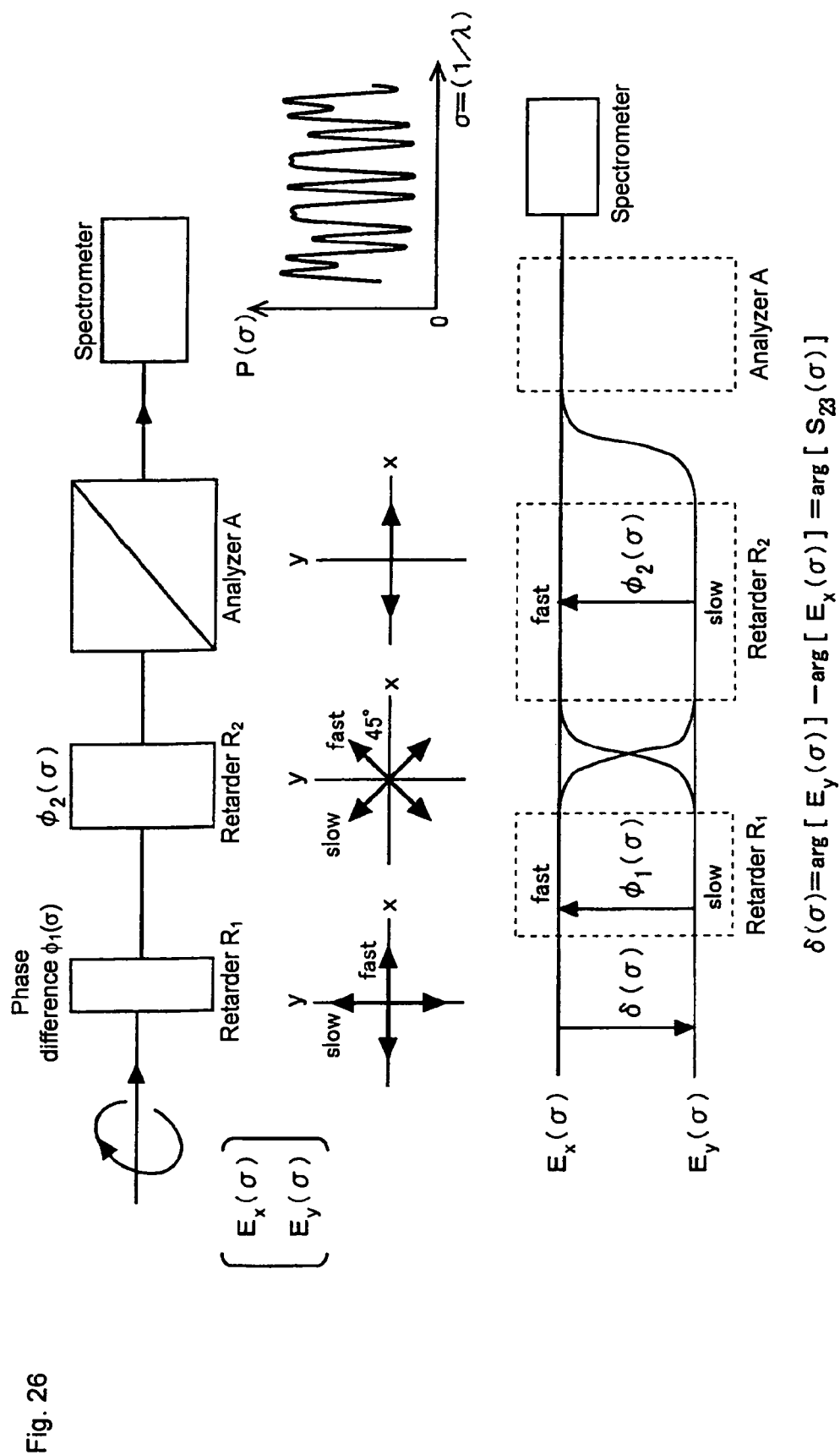
FIG. 26 shows a view for explaining a relation between a channeled spectrum and a reference phase function.

4.1 Relation Between Channeled Spectrum and Reference Phase Functions $\phi_1(\sigma)$, $\phi_2(\sigma)$ First of all, the relation between the channeled spectrum and the reference phase function is described using the idea of interference. In the lower part of FIG. 26, two upper and lower lines traveling in parallel are channels of the two linearly polarized light components which are orthogonal to each other. However, the respective directions of the linearly polarized lights in the retarders $R_1$ and $R_2$ are assumed to be arranged along the main axis of the respective elements. Light entered from the left into the retarder $R_1$ is separated into x and y polarized light components ($E_x(\sigma)$ and $E_y(\sigma)$), and the separated components propagate respectively along a fast axis and a slow axis of $R_1$. Here, $E_x(\sigma)$ and $E_y(\sigma)$ are electric field components arranged with σ at the center in the wavenumber range of the width of resolution $\Delta\sigma$ of the spectrometer. The direction of the main axis of the two linearly polarized light components emitted from $R_1$ are rotated at 45° prior to incidence on $R_2$, and at that time, part of the polarized light component is exchanged. The light is redistributed to components along a fast axis and a slow axis of $R_2$, and transmits through $R_2$. The two components emitted from $R_2$ are superposed on each other in the analyzer A, and then incident on the spectrometer. As immediately apparent by tracing the channels in this figure, there exist four channels from the incidence end to the spectrometer as shown below.

$E_x(\sigma)$→fast axis of $R_1$→fast axis of $R_2$→Spectrometer
$E_x(\sigma)$→fast axis of $R_1$→slow axis of $R_2$→Spectrometer
$E_y(\sigma)$→slow axis of $R_1$→fast axis of $R_2$→Spectrometer
$E_y(\sigma)$→slow axis of $R_1$→slow axis of $R_2$→Spectrometer In the spectrometer, these four components are superposed on one another to mutually interfere. A phase of an interference term is determined from a phase difference between arbitral two components taken out from the four components. All possible combined sets of components are listed below.

0
$\phi_2(\sigma)$
$\{\phi_1(\sigma)-\delta(\sigma)\}$
$\phi_2(\sigma)-\{\phi_1(\sigma)-\delta(\sigma)\}$
$\phi_2(\sigma)+\{\phi_1(\sigma)-\delta(\sigma)\}$ However, $\delta(\sigma)$ is a phase difference between the x and y polarized light components of light under measurement, namely, $$\delta(\sigma)=\arg[E_y(\sigma)]-\arg[E_x(\sigma)]=\arg[S_{23}(\sigma)] \quad (4.1)$$

A generated channeled spectrum consequently contains vibration components corresponding to five kinds of phase differences shown above. (However, as described in Section 1.2, when the crossing angle between $R_2$ and A is 45°, the terms depending upon $\{\phi_1(\sigma)-\delta(\sigma)\}$ are canceled out, and thus do not occur in the channeled spectrum.) Here, in the combinations of phase differences that appear in the channeled spectrum, the way $\phi_1(\sigma)$ and $\phi_2(\sigma)$ appear is examined. $\phi_1(\sigma)$ constantly appears as a difference from the phase difference $\delta(\sigma)=\arg[E_{23}(\sigma)]$ between the x and y polarized light components of light under measurement, namely $\{\phi_1(\sigma)-\delta(\sigma)\}$. On the other hand, $\phi_2(\sigma)$ appears independently, or as the sum with or difference from $\{\phi_1(\sigma)-\delta(\sigma)\}$. Thereby, the following is found.

As for $\phi_1(\sigma)$, when the SOP of light under measurement is unknown, it is not possible to obtain the value directly from the channeled spectrum alone. This is because the value can be obtained only as $\{\phi_1(\sigma)-\delta(\sigma)\}$, and $\phi_1(\sigma)$ cannot be specified when the phase difference $\delta(\sigma)$ between the x and y polarized light components of the light under measurement is unknown.

On the other hand, as for $\phi_2(\sigma)$, there is no limitation as in the case of $\phi_1(\sigma)$. There is a term independently containing $\phi_2(\sigma)$. Other terms contain $\phi_2(\sigma)$ as a sum with or a difference from $\{\phi_1(\sigma)-\delta(\sigma)\}$, and therefore an average between the two may be taken. Namely, $\phi_2(\sigma)$ contained in the channeled spectrum can be constantly fixed even when the SOP, especially the phase difference $\delta(\sigma)$ between the x and y polarized light components, of the light under measurement takes any value. Namely, this means that calibration concurrently with measurement is possible as for $\phi_2(\sigma)$.

It is to be noted that, once $\phi_2(\sigma)$ is obtained, $\phi_1(\sigma)$ may also be indirectly obtained in many cases. This is because there are often cases where $\phi_1(\sigma)$ and $\phi_2(\sigma)$ are under the same disturbance, and also the relation between $\phi_1(\sigma)$ and $\phi_2(\sigma)$ is known in advance. The specific relation therebetween is the ratio of the two described in Section 3.1. 2, or the like. Namely, Once $\phi_2(\sigma)$ is fixed from the channeled spectrum, $\phi_1(\sigma)$ can be fixed according to a relation between $\phi_1(\sigma)$ and $\phi_2(\sigma)$ known in advance.

The basic principle obtained above is summarized as follows.

With appropriate signal processing performed, it is possible to demodulate the channeled spectrum $\phi_2(\sigma)$ regardless of the SOP of the light under measurement, namely without the use of information provided in advance on the SOP of the light under measurement.

Through the use of the relation between $\phi_1(\sigma)$ and $\phi_2(\sigma)$, it is possible to also demodulate $\phi_1(\sigma)$, though indirectly, independently of the SOP of the light under measurement.

It is to be noted that, what needs to be concerned here is apparently that $\phi_2(\sigma)$ is not necessarily obtained in advance of $\phi_1(\sigma)$, depending upon a formula making manner. When the relation between $\phi_1(\sigma)$ and $\phi_2(\sigma)$ is given in advance and a formula is made including such a relation, it may be represented (at least in a mathematical expression,) that $\phi_1(\sigma)$ is obtained concurrently with $\phi_2(\sigma)$ or in advance of $\phi_2(\sigma)$.

4.2 Phase Attribute Function of Measurement System

In the previous section, it was demonstrated that the reference phase function $\phi_2(\sigma)$ can be obtained independently of the SOP of the light under measurement. Here, this principle does not mean that $\phi_2(\sigma)$ itself needs to be directly obtained. The ways to obtain $\phi_2(\sigma)$ may for example include obtaining the difference $\Delta\phi_2(\sigma)$ from the initial value $\phi_2^{(i)}(\sigma)$ when it is known. Or an amount including the reference phase function $\phi_2(\sigma)$ and the like, e.g. $K_2(\sigma)$, cos $\phi_2(\sigma)$, cos $\Delta\phi_2(\sigma)$, etc. can be obtained during measurement. Further, when the relation between $\phi_1(\sigma)$ and $\phi_2(\sigma)$ is known in advance, an expression including $\phi_1(\sigma)$, the difference thereof and the like, e.g. $K_-(\sigma)$, $K_+(\sigma)$, cos $[\phi_2(\sigma)-\phi_1(\sigma)]$, cos $[\Delta\phi_2(\sigma)-\Delta\phi_1(\sigma)]$, etc. can all be calibrated during measurement, and using these, it is possible to concurrently measure the spectrometric Stokes parameters, or polarized light parameters similar to the spectrometric Stokes parameters.

Hereinafter, a function as thus described which is directly or indirectly related to the reference phase functions $\phi_1(\sigma)$ and $\phi_2(\sigma)$ and the differences thereof, and is determined only with parameters of the channeled spectroscopic polarimetric measurement system is referred to as a phase attribute function of the measurement system. While some of phase attribute functions are necessary in demodulating the wavenumber-distribution of the SOP of the light under measurement from the channeled spectrum, a function, such as the reference amplitude function, which does not depend upon the reference phase function, may also be necessary. A set of functions, which is determined based only upon parameters of the channeled spectroscopic polarimetry measurement system and is sufficient for demodulation of the wavenumber-distribution of the SOP, is generically named as a set of attribute functions of a measurement system. With the use of this term, it can be said that the present invention "provides a method for calibrating, concurrently with measurement of polarized light, a set of phase attribute functions out of attribute functions sufficient for demodulation of a wavenumber-distribution of an SOP."

With consideration of the above descriptions, "explicit" frequency filtering is found not necessarily essential for obtaining the phase attribute function of the measurement system from the channeled spectrum. Although the operation for separating some components contained in the channeled spectral is certainly included in the signal processing, the separation is not necessarily required to be performed with "a period of a quasi-sinusoidal component" on the reference. All needed is separation sufficient for extracting $\phi_2(\sigma)$ and an amount relative to the difference of $\phi_2(\sigma)$.

Chapter 5: Calibration Method during Measurement Through Use of Generalized Inverse Matrix A method for using a generalized inverse matrix is shown in this chapter as one of specific examples of methods for calibration of a phase attribute function during measurement and demodulation of spectrometric Stokes parameters without the use of frequency filtering, namely without separation of a quasi-sinusoidal vibration component from the channeled spectrum.

5.1 Matrix Representation

It is assumed that reference phase functions to be obtained by some pre-calibration are $\phi_1^{(i)}(\sigma)$ and $\phi_2^{(i)}(\sigma)$, and that the reference phase functions are changed as follows during measurement.

$$\phi_1(\sigma) = \phi_1^{(i)}(\sigma) \Delta\phi_1(\sigma) \quad (5.1a)$$

$$\phi_2(\sigma) = \phi_2^{(i)}(\sigma) \phi_2(\sigma) \quad (5.1b)$$

Below described is a method for obtaining the differences $\Delta\phi_1(\sigma)$, $\Delta\phi_2(\sigma)$ of the reference phase functions, or a change in reference complex functions corresponding to these. When the above expressions are substituted into Expression (1.3), the following expression is given.

[Mathematical Expression 43]

$$P(\sigma) = \frac{1}{2} m_0(\sigma) S_0(\sigma) + \frac{1}{4} m_-(\sigma) |S_{23}(\sigma)| \cos \quad (5.2)$$
$$\left[ \phi_2^{(i)}(\sigma) + \Delta\phi_2(\sigma) - \phi_1^{(i)}(\sigma) - \Delta\phi_1(\sigma) + \arg\{S_{23}(\sigma)\} \right] + \frac{1}{2} m_2(\sigma) S_1(\sigma)$$
$$\cos [\phi_2^{(i)}(\sigma) + \Delta\phi_2(\sigma)] - \frac{1}{4} m_+(\sigma) |S_{23}(\sigma)| \cos$$
$$[\phi_2^{(i)}(\sigma) + \Delta\phi_2(\sigma) + \phi_1^{(i)}(\sigma) + \Delta\phi_1(\sigma) - \arg\{S_{23}(\sigma)\}]$$

Here, when the second and fourth terms (underlined) of this expression are put together and transformed, the following expression is given.

-continued
$$P(\sigma) = p_0(\sigma) + \cos[\phi_2^{(i)}(\sigma)] p_c(\sigma) + \sin[\phi_2^{(i)}(\sigma)] p_s(\sigma) + \quad (5.3)$$
$$\sin[\phi_2^{(i)}(\sigma)] \sin[\phi_1^{(i)}(\sigma)] q_{ss}(\sigma) + \cos[\phi_2^{(i)}(\sigma)] \cos$$
$$[\phi_1^{(i)}(\sigma)] q_{cc}(\sigma) + \sin[\phi_2^{(i)}(\sigma)] \cos[\phi_1^{(i)}(\sigma)] q_{sc}(\sigma) +$$
$$\cos[\phi_2^{(i)}(\sigma)] \sin[\phi_1^{(i)}(\sigma)] q_{cs}(\sigma)$$

However,
[Mathematical Expression 44]

$$p_0(\sigma) = \frac{1}{2} m_0(\sigma) S_0(\sigma) \quad (5.4a)$$

$$p_c(\sigma) = \frac{1}{2} m_2(\sigma) S_1(\sigma) \cos[\Delta\phi_2(\sigma)] \quad (5.4b)$$

$$p_s(\sigma) = -\frac{1}{2} m_2(\sigma) S_1(\sigma) \sin[\Delta\phi_2(\sigma)] \quad (5.4c)$$

$$q_{ss}(\sigma) = \frac{1}{4} m_-(\sigma) \{S_2(\sigma) \cos[\Delta\phi_2(\sigma) - \Delta\phi_1(\sigma)] - S_3(\sigma) \quad (5.4d)$$
$$\sin[\Delta\phi_2(\sigma) - \Delta\phi_1(\sigma)]\} + \frac{1}{4} m_+(\sigma) \{S_2(\sigma) \cos$$
$$[\Delta\phi_2(\sigma) + \Delta\phi_1(\sigma)] + S_3(\sigma) \sin[\Delta\phi_2(\sigma) +$$
$$\Delta\phi_1(\sigma)]\}$$

$$q_{cc}(\sigma) = \frac{1}{4} m_-(\sigma) \{S_2(\sigma) \cos[\Delta\phi_2(\sigma) - \Delta\phi_1(\sigma)] - S_3(\sigma) \quad (5.4e)$$
$$\sin[\Delta\phi_2(\sigma) - \Delta\phi_1(\sigma)]\} - \frac{1}{4} m_+(\sigma) \{S_2(\sigma) \cos$$
$$[\Delta\phi_2(\sigma) + \Delta\phi_1(\sigma)] + S_3(\sigma) \sin[\Delta\phi_2(\sigma) +$$
$$\Delta\phi_1(\sigma)]\}$$

$$q_{sc}(\sigma) = -\frac{1}{4} m_-(\sigma) \{S_2(\sigma) \sin[\Delta\phi_2(\sigma) - \Delta\phi_1(\sigma)] + S_3(\sigma) \quad (5.4f)$$
$$\cos[\Delta\phi_2(\sigma) - \Delta\phi_1(\sigma)]\} + \frac{1}{4} m_+(\sigma) \{S_2(\sigma) \sin$$
$$[\Delta\phi_2(\sigma) + \Delta\phi_1(\sigma)] - S_3(\sigma) \cos[\Delta\phi_2(\sigma) +$$
$$\Delta\phi_1(\sigma)]\}$$

$$q_{cs}(\sigma) = \frac{1}{4} m_-(\sigma) \{S_2(\sigma) \sin[\Delta\phi_2(\sigma) - \Delta\phi_1(\sigma)] + S_3(\sigma) \quad (5.4g)$$
$$\cos[\Delta\phi_2(\sigma) - \Delta\phi_1(\sigma)]\} + \frac{1}{4} m_+(\sigma) \{S_2(\sigma) \sin$$
$$[\Delta\phi_2(\sigma) + \Delta\phi_1(\sigma)] - S_3(\sigma) \cos[\Delta\phi_2(\sigma) +$$
$$\Delta\phi_1(\sigma)]\}$$

Incidentally, in the actual measurement, the wavenumber axis is digitized since digitized measured values are used. Assuming that a digitized mark is denoted as N and a digitized wavenumber is denoted as $\sigma_l$ (l=1 ... N), Expression (5.3) can be written as follows.

[Mathematical Expression 45]

$$P(\sigma_l) = 1 \cdot p_0(\sigma_l) + \{\cos[\phi_2^{(i)}(\sigma_l)]\} \cdot p_c(\sigma_l) + \quad (5.5)$$
$$\{\sin[\phi_2^{(i)}(\sigma_l)]\} \cdot p_s(\sigma_l) +$$
$$\{\sin[\phi_2^{(i)}(\sigma_l)] \sin[\phi_1^{(i)}(\sigma_l)]\} \cdot q_{ss}(\sigma_l) +$$
$$\{\cos[\phi_2^{(i)}(\sigma_l)] \cos[\phi_1^{(i)}(\sigma_l)]\} \cdot q_{cc}(\sigma_l) +$$
$$\{\sin[\phi_2^{(i)}(\sigma_l)] \cos[\phi_1^{(i)}(\sigma_l)]\} \cdot q_{sc}(\sigma_l) +$$
$$\{\cos[\phi_2^{(i)}(\sigma_l)] \sin[\phi_1^{(i)}(\sigma_l)]\} \cdot q_{cs}(\sigma_l)$$

This expression means that the channeled spectrum $P(\sigma_l)$ is a linear sum of a group of parameters $p_0(\sigma_l)$, $p_c(\sigma_l)$, $p_s(\sigma_l)$ $q_{ss}(\sigma_1)$, $q_{cc}(\sigma_1)$, $q_{sc}(\sigma_1)$, and $q_{cs}(\sigma_1)$, which includes the spectrometric Stokes parameters and the reference phase function differences. Therefore, this can be written in matrix form. Examples of the way for such writing are listed below.

$$P = RQ \quad (5.6)$$

where elements of a column vector P (line N), Q (line 7N) in (l=1 ... N) are:

$$P_l = P_l(\sigma_1) \quad (5.7a)$$

$$Q_{(7l-6)} = p_0(\sigma_1) \quad (5.7b)$$

$$Q_{(7l-5)} = p_c(\sigma_1) \quad (5.7c)$$

$$Q_{(7l-4)} = p_s(\sigma_1) \quad (5.7d)$$

$$Q_{(7l-3)} = q_{ss}(\sigma_1) \quad (5.7e)$$

$$Q_{(7l-2)} = q_{cc}(\sigma_1) \quad (5.7f)$$

$$Q_{(7l-1)} = q_{sc}(\sigma_1) \quad (5.7g)$$

$$Q_{(7l)} = q_{cs}(\sigma_1) \quad (5.7h)$$

On the other hand, elements of a matrix R (line N, column 7N) in (l=1 ... N) are:

$$R_{l,(7l-6)} = 1 \quad (5.8a)$$

$$R_{l,(7l-5)} = \cos[\phi_2^{(i)}(\sigma_1)] \quad (5.8b)$$

$$R_{l,(7l-4)} = \sin[\phi_2^{(i)}(\sigma)] \quad (5.8c)$$

$$R_{l,(7l-3)} = \sin[\phi_2^{(i)}(\sigma_1)]\sin[\phi_1^{(i)}(\sigma_1)] \quad (5.8d)$$

$$R_{l,(7l-2)} = \cos[\phi_2^{(i)}(\sigma_1)]\cos[\phi_1^{(i)}(\sigma_1)] \quad (5.8e)$$

$$R_{l,(7l-1)} = \sin[\phi_2^{(i)}(\sigma_1)]\cos[\phi_1^{(i)}(\sigma_1)] \quad (5.8f)$$

$$R_{l,(7l)} = \cos[\phi_2^{(i)}(\sigma_1)]\sin[\phi_1^{(i)}(\sigma_1)] \quad (5.8g)$$

Only the above elements have values and the remaining elements are zero. It is to be noted that in this selection manner, all elements are real numbers.

Other than the above example, there may exist an almost unlimited number of ways to represent properties of the channeled spectroscopic polarimeter in matrix form. Any representation may be acceptable so long as satisfying the following conditions.

Condition 1: A column vector on the left side (P in the above example) lists information on wavenumber-distribution of a channeled spectrum.

Condition 2: A column vector on the right side (Q in the above example) lists information including spectrometric Stokes parameters of light under measurement and phase attribute functions of a measurement system.

Condition 3: A matrix on the right side (R in the above example) is a liner sum that completely relates the column vectors on the left and right sides to each other, and all elements thereof are fixed before demodulation. (A provisional calibration value or the like may be used.) It should be noted that an element of Q made relative to one of elements of P is not related to other elements of P in the above example. However this is not essential. If anything, depending upon a configuration of an optical system, an approximating manner in a theoretical expression, or the like, there may be cases where the above-mentioned relation between elements of Q and P does not apply, namely, a channeled spectrum with a certain wavenumber is related to a spectrometric Stokes parameter with another wavenumber (in that turn), or the like.

5.2 Inverse Transformation by Generalized Inverse Matrix

As revealed from the above description, Expression (5.6) expresses a linear simultaneous equation, since Column Vector P on the left side is determined by measurement of the channeled spectrum whereas the matrix R on the right side is fixed prior to measurement. Solving this linear simultaneous equation leads to determination of Column Vector Q (unknown) on the right side. However, the number of elements of Q is typically considerably large as compared to the number of elements of P. (In the above example, the elements of Q are seven times larger in number than the elements of P.) Hence, the matrix R does not have an inverse matrix.

As a method for solving a linear simultaneous equation written in matrix form in such a case, a method for using a generalized inverse matrix may be employed. A matrix X that satisfies the following four conditions is referred to as a generalized inverse matrix of R and denoted as $R^+$.

$$RXR = R \quad (5.9a)$$

$$XRX = X \quad (5.9b)$$

$$(RX)^* = RX \quad (5.9c)$$

$$(XR)^* = XR \quad (5.9d)$$

However, a superscript asterisk * added to the matrix denotes a conjugate transpose matrix. It should be noted that X as shown above certainly exists with respect to any R, and is further determined uniquely to R. In addition, a variety of methods have been proposed as concrete methods for calculating $R^+$ from R. (Reference: "Matrix numerical value calculation", written by Hayato Togawa, Ohmsha, Ltd., 1971, p 46)

The use of this generalized inverse matrix $R^+$ allows determination of each unknown element of Column Vector Q included in the right side of Expression (5.6), according to the following expression.

$$Q = R^+ P \quad (5.10)$$

That is, this means that the group of parameters $p_0(\sigma_1)$, $p_c(\sigma_1)$, $p_s(\sigma_1)$, $q_{ss}(\sigma_1)$, $q_{cc}(\sigma_1)$, $q_{sc}(\sigma_1)$, and $q_{cs}(\sigma_1)$ (where l=1 ... N), which includes the spectrometric Stokes parameters and the reference phase function differences, is obtained.

It is to be noted that, even in the case of using another matrix representation as described at the end of the previous section, the use of an appropriate generalized inverse matrix enables fixing of "a list of information including spectrometric Stokes parameters of the light under measurement and phase attribute functions of the measurement system."

Each element obtained by this generalized inverse matrix is not in one-to-one correspondence with each quasi-sinusoidal vibration component contained in the channeled spectrum. For example, as apparent from the above-mentioned derivation process, each of $q_{ss}(\sigma_1)$, $q_{cc}(\sigma_1)$, $q_{sc}(\sigma_1)$, and $q_{cs}(\sigma_1)$ is relative to both of two quasi-sinusoidal components related to $\phi_2(\sigma) - \phi_1(\sigma)$ and $\phi_2(\sigma) + \phi_1(\sigma)$.

That is to say, separation of elements by this generalized inverse matrix calculation is not in one-to-one correspondence with separation of quasi-sinusoidal period components by frequency filtering which is made by the Fourier transform method or the like.

5.3 Demodulation of Phase Attribute Function

Next, a phase attribute function is obtained from an element of Column Vector Q.

As described as the general idea in the previous chapter, the phase attribute function can be obtained as follows.

- $\phi_2(\sigma)$ (or a function determined based thereupon) is obtained from information included in the channeled spectrum regardless of the SOP of the light under measurement.
- $\phi_1(\sigma)$ as well as $\phi_2(\sigma)$, and further a function relative to both, are obtained by the use of the relation between $\phi_1(\sigma)$ and $\phi_2(\sigma)$ (information provided in advance) regardless of the SOP of the light under measurement.

By the use of an element of Column Vector Q obtained using a generalized inverse matrix, an equation is further set up and solved so that $\phi_1(\sigma)$, $\phi_2(\sigma)$ and functions equivalent to those, namely phase attribute functions, can be obtained. Moreover, solving the results in a simultaneous manner, it is possible to determine the SOP of the light under measurement.

Concrete examples of a calculating expression in a case where each element of Column Vector Q is given by Expressions (5.7b) to (5.7h) are shown below. Those are only representation of results, but are corresponded, when possible, to the methods described in Chapter 3.

A. Method for Obtaining $\Delta\phi_2(\sigma)$, Effective in Case of $S_1(\sigma) \neq 0$

Among the elements of Column Vector Q, $p_c(\sigma)$ and $p_s(\sigma)$ are obtained as follows.

[Mathematical Expression 46]

$$p_c(\sigma) = \frac{1}{2}m_2(\sigma)S_1(\sigma)\cos[\Delta\phi_2(\sigma)] \quad (5.11a)$$

$$p_s(\sigma) = -\frac{1}{2}m_2(\sigma)S_1(\sigma)\sin[\Delta\phi_2(\sigma)] \quad (5.11b)$$

From the above, $\Delta\phi_2(\sigma)$ can be calculated as follows.

$$\Delta\phi_2(\sigma) = -\tan^{-1}\frac{p_s(\sigma)}{p_c(\sigma)} \quad (5.12)$$

Here, the denominator and the numerator of the arctangent in the above expression are both proportional to $S_1(\sigma)$ of the light under measurement. It is thus possible to obtain $\Delta\phi_2(\sigma)$ according to the above expression so long as $S_1(\sigma)$ is not zero.

B. Method for Obtaining $\Delta\phi_2(\sigma)$, Effective in Case where Either $S_2(\sigma) \neq 0$ or $S_3(\sigma) \neq 0$ is Satisfied

Among the elements of Column Vector Q, the following relations are derived even from those not used in above A.

[Mathematical Expression 47]

$$\frac{1}{4}m_-(\sigma)m_+(\sigma)[S_2^2(\sigma) + S_3^2(\sigma)]\cos[2\Delta\phi_2(\sigma)] = \quad (5.13a)$$
$$q_{ss}^2(\sigma) - q_{cc}^2(\sigma) + q_{sc}^2(\sigma) - q_{cs}^2(\sigma)$$

$$\frac{1}{4}m_-(\sigma)m_+(\sigma)[S_2^2(\sigma) + S_3^2(\sigma)]\sin[2\Delta\phi_2(\sigma)] = \quad (5.13b)$$
$$2[q_{cc}(\sigma)q_{sc}(\sigma) + q_{ss}(\sigma)q_{cs}(\sigma)]$$

From the above, another expression for calculating $\Delta\phi_2(\sigma)$ is found as follows.

$$\Delta\phi_2(\sigma) = \frac{1}{2}\tan^{-1}\frac{2[q_{cc}(\sigma)q_{sc}(\sigma) + q_{ss}(\sigma)q_{cs}(\sigma)]}{q_{ss}^2(\sigma) - q_{cc}^2(\sigma) + q_{sc}^2(\sigma) - q_{cs}^2(\sigma)} \quad (5.14)$$

The denominator and the numerator of the arctangent in the above expression are both proportional to $S_2^2(\sigma) + S_3^2(\sigma)$ of the light under measurement. It is thus possible to obtain $\Delta\phi_2(\sigma)$ according to the above expression so long as $S_2(\sigma)$ and $S_3(\sigma)$ do not concurrently become zero.

C. Combination of A and B

Similarly to the case (case of using the frequency filtering) described in Chapter 3, adaptive combination of Methods A and B is effective. It should be noted that, since a process to be performed for the combination is completely the same as previously done, a description thereof is omitted.

D. Method for Obtaining $\Delta\phi_2(\sigma)$, Effective so Long as $S_1$, $S_2$, $S_3$ do not Concurrently Become Zero

Among the elements of Column Vector Q, the following expressions are derived from a further different combination.

[Mathematical Expression 48]

$$\frac{1}{4}\{m_2^2(\sigma)[S_1^2(\sigma)] + m_-(\sigma)m_+(\sigma)[S_2^2(\sigma) + S_3^2(\sigma)]\}\cos[2\Delta\phi_2(\sigma)] = \quad (5.15a)$$
$$p_c^2(\sigma) - p_s^2(\sigma) + q_{ss}^2(\sigma) - q_{cc}^2(\sigma) + q_{sc}^2(\sigma) - q_{cs}^2(\sigma)$$

$$\frac{1}{4}\{m_2^2(\sigma)[S_1^2(\sigma)] + m_-(\sigma)m_+(\sigma)[S_2^2(\sigma) + S_3^2(\sigma)]\}\sin[2\Delta\phi_2(\sigma)] = \quad (5.15b)$$
$$2[-p_c(\sigma)p_s(\sigma) + q_{cc}(\sigma)q_{sc}(\sigma) + q_{ss}(\sigma) - q_{cs}(\sigma)]$$

From the above, an expression is derived as follows as a third expression for calculating $\Delta\phi_2(\sigma)$.

$$\Delta\phi_2(\sigma) = \quad (5.16)$$
$$\frac{1}{2}\tan^{-1}\frac{2[-p_c(\sigma)p_s(\sigma) + q_{cc}(\sigma)q_{sc}(\sigma) + q_{ss}(\sigma)q_{cs}(\sigma)]}{p_c^2(\sigma) - p_s^2(\sigma) + q_{ss}^2(\sigma) - q_{cc}^2(\sigma) + q_{sc}^2(\sigma) - q_{cs}^2(\sigma)}$$

The denominator and the numerator of the arctangent in the above expression are both proportional to $m_2^2(\sigma)S_1^2 + m_-(\sigma)m_+(\sigma)[S_2^2(\sigma) + S_3^2(\sigma)]$. It is thus possible to obtain $\Delta\phi_2(\sigma)$ according to the above expression so long as $S_1(\sigma)$, $S_2(\sigma)$ and $S_3(\sigma)$ do not concurrently become zero.

It should be noted that "$S_1(\sigma) = S_2(\sigma) = S_3(\sigma) = 0$" is satisfied when the light under measurement is unpolarized light. In this case, calibration of the phase attribute function itself is not required because only the polarization degree (i.e. 0) is significant information.

E. Calculation of $\Delta\phi_1(\sigma)$

Since fluctuations in $\Delta\phi_1(\sigma)$ are considered to be similar to those in $\Delta\phi_2(\sigma)$, it is possible to obtain $\Delta\phi_1(\sigma)$ by proportional calculation (e.g. by using a thickness ratio) from a measured value of $\Delta\phi_2(\sigma)$.

F. Demodulation of Spectrometric Stokes Parameters

Using obtained $\Delta\phi_1(\sigma)$ and $\Delta\phi_2(\sigma)$, the spectrometric Stokes parameters $S_0(\sigma)$, $S_1(\sigma)$, $S_2(\sigma)$, and $S_3(\sigma)$ are determined from $p_0(\sigma)$, $p_c(\sigma)$, $p_s(\sigma)$, $q_{ss}(\sigma)$, $q_{cc}(\sigma)$, $q_{sc}(\sigma)$, and $q_{cs}(\sigma)$. For example, the following expressions may be used.

[Mathematical Expression 49]

$$S_0(\sigma) = \frac{2}{m_0(\sigma)}p_0(\sigma) \quad (5.17a)$$

-continued $$S_1(\sigma) = \frac{2}{m_2(\sigma)}[p_c(\sigma)\cos\Delta\phi_2(\sigma) - p_s(\sigma)\sin\Delta\phi_2(\sigma)] \quad (5.17b)$$

$$S_2(\sigma) = \frac{2}{m_-(\sigma)}\{[q_{ss}(\sigma) + q_{cc}(\sigma)]\cos[\Delta\phi_2(\sigma) - \Delta\phi_1(\sigma)] - \quad (5.17c)$$
$$[q_{sc}(\sigma) - q_{cs}(\sigma)]\sin[\Delta\phi_2(\sigma) - \Delta\phi_1(\sigma)]\}$$

$$S_3(\sigma) = \frac{2}{m_-(\sigma)}\{-[q_{ss}(\sigma) + q_{cc}(\sigma)]\sin[\Delta\phi_2(\sigma) - \Delta\phi_1(\sigma)] - \quad (5.17d)$$
$$[q_{sc}(\sigma) - q_{cs}(\sigma)]cos`[\Delta\phi_2(\sigma) - \Delta\phi_1(\sigma)]\}$$

EXAMPLE 1

Figure 11:
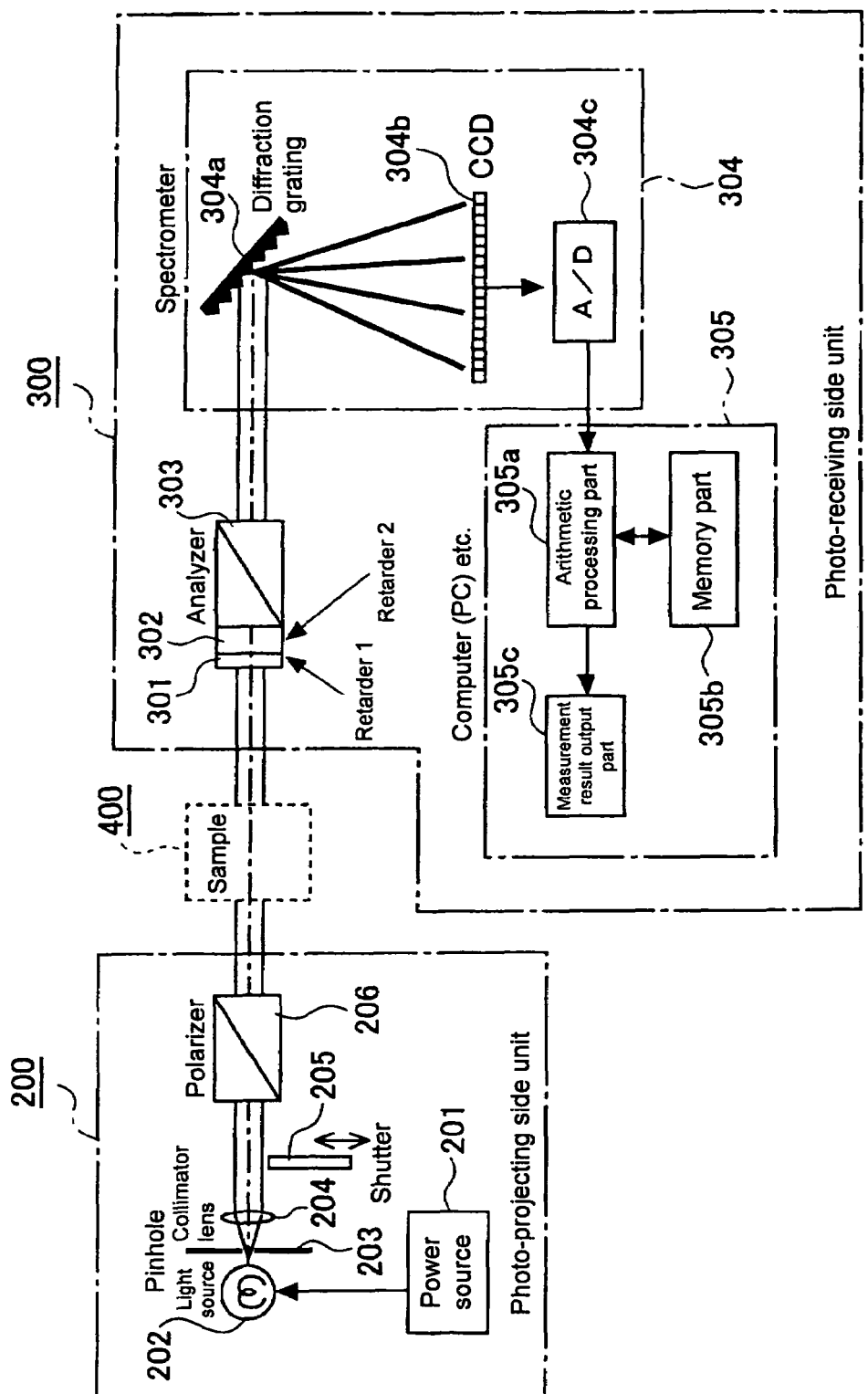
FIG. 11 shows a constitutional view of one example of a spectroscopic polarimeter.

In the following, a preferred example of the present invention is specifically described with reference to FIGS. 11 to 19. FIG. 11 shows a constitutional view of one example of a spectroscopic polarimeter. As shown in this figure, this device comprises a photo-projecting side unit 200 and a photo-receiving side unit 300. It is to be noted that numeral 400 denotes a sample.

The photo-projecting side unit 200 comprises: a power source 201; a light source 202 that is turned on by power feeding from the power source 201; a pinhole plate 203 arranged on the front face side of the light source 202 in the light-projecting direction; a collimator lens 204 for collimating light transmitting through the pinhole of the pinhole plate 203; a shutter 205 which is arranged on the front face side of the collimator lens 204 and opens and closes to transmit or block the transmitted light; and a polarizer 206 on which the light having transmitted through the shutter is incident.

The light after passage of a polarizer 206 is projected from the photo-projecting side unit 200 onto the sample 400. The light transmitted through or reflected on the sample 400 is incident on the photo-receiving side unit 300.

On an incident light channel in the photo-receiving side unit 300, a first retarder 301, a second retarder 302, an analyzer 303 and a spectrometer 304 intervene in sequence. Here, the first retarder 301 is arranged such that light under measurement (incident light) is incident vertically onto a fast axis and a slow axis of the first retarder 301. The second retarder 302 is arranged such that the light under measurement emitted from the first retarder 301 is incident vertically onto a fast axis and a slow axis of the second retarder 302, and that the direction of the fast axis of the second retarder 302 forms an angle of 45° with respect to the direction of the fast axis of the first retarder. The analyzer 303 is arranged such that the direction of a transmission axis of the analyzer 303 forms an angle of 45° with respect to the direction of a main axis of the second retarder 302.

The spectrometer 304 comprises: a diffraction grating 304a for spatially dispersing the light under measurement; a CCD 304b on the photo-receiving face of which the light spatially dispersed by the diffraction grating 304a is incident; and an A/D converter 304c for converting photo-receiving output from the CCD 304b into a digital signal. The digital photo-receiving output signal obtained from the A/D converter 304c is taken out from the spectrometer 304, and then processed in a computer 305 such as a personal computer (PC)

As widely known, the computer 305 (arithmetic unit) comprises: an arithmetic processing part 305a comprised of a microprocessor and the like; a memory part 305b comprised of an ROM, a RAM, an HDD and the like; and a measurement result output part 305c comprised of a display, a printer, a variety of data output devices, a communication device, and the like.

Figure 12:
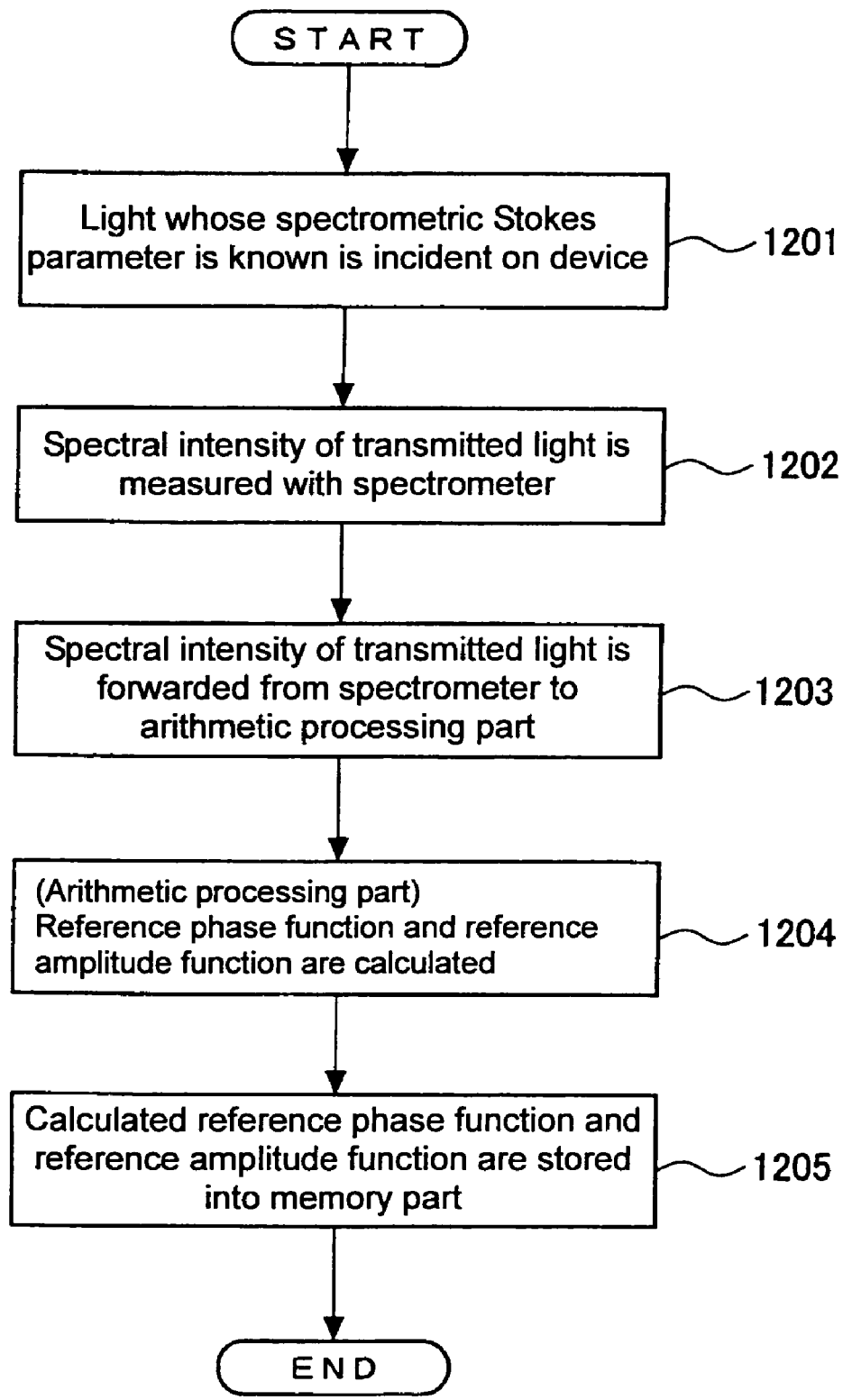
FIG. 12 shows a flowchart of a pre-calibration process.

Next, FIG. 12 shows a flowchart of a pre-calibration process. As shown in this figure, as the pre-calibration process, first in Step 1201, light whose spectrometric Stokes parameters are known is incident on a device (photo-receiving side unit 300 in this case). It should be noted that, for generation of light whose spectrometric Stokes parameters are known, for example, the polarizer 206 of the device in the figure may be rotated so as to be arranged in a desired orientation.

Next in Step 1202, a spectral intensity of transmitted light is measured with the spectrometer. Here, the shutter 205 may be utilized for reduction in influence of unnecessary light, such as lost light. Specifically, a spectrum of the unnecessary light can be canceled out by taking a difference in spectrum between when measured with the shutter open and when measured with the shutter closed.

Next in Step 1203, the spectral intensity of the transmitted light is forwarded from the spectrometer to the computer 305, to be provided to processing in the arithmetic processing part 305a.

Next in Step 1204, reference phase functions and reference amplitude functions are calculated by the action of the arithmetic processing part 305a.

Next in Step 1205, the calculated reference phase functions and reference amplitude functions are stored into the memory part 305b, whereby the pre-calibration process is completed.

Figure 13:
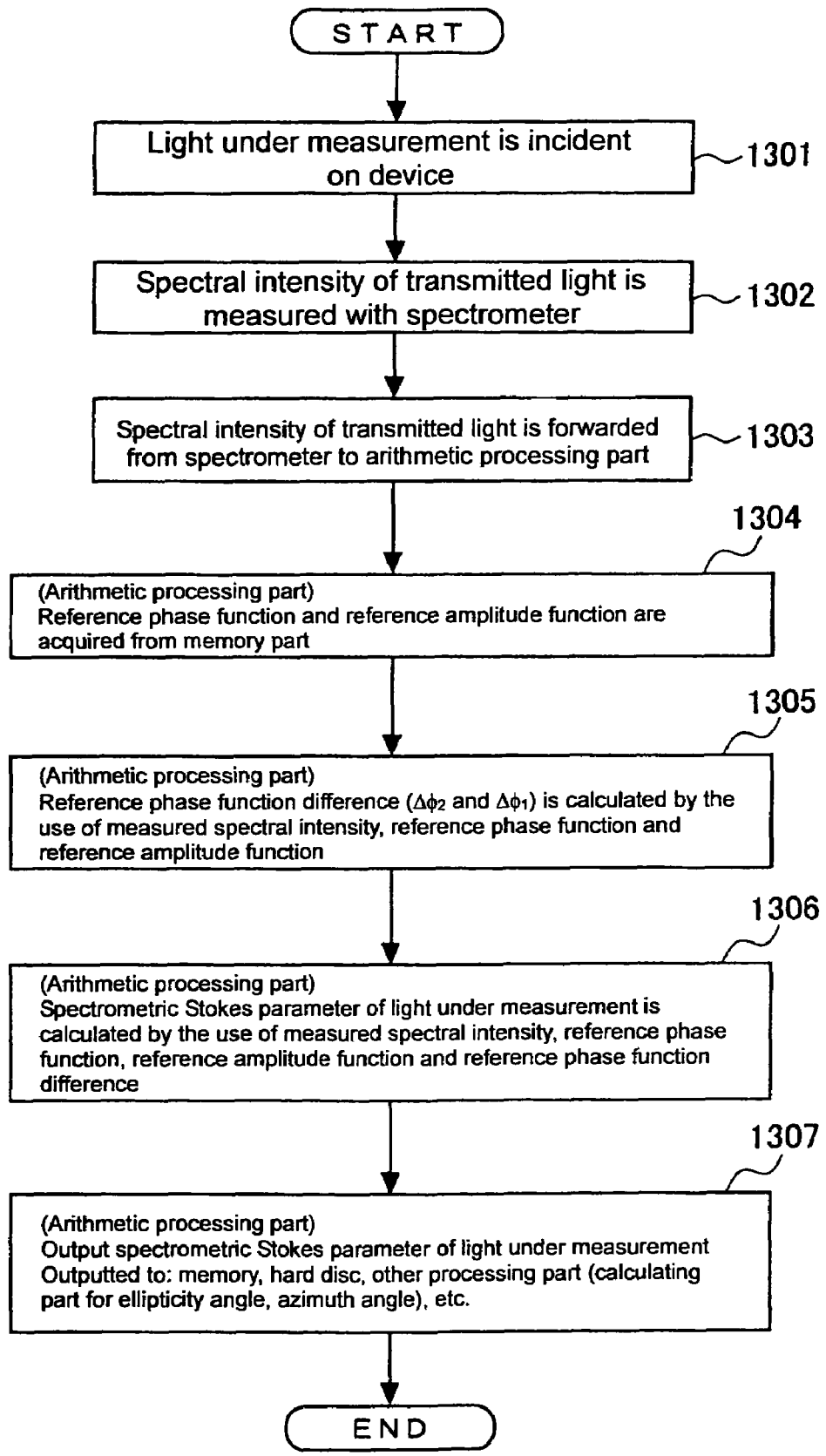
FIG. 13 shows a flowchart of a measurement process.

FIG. 13 shows a flowchart of a measurement process. As shown in the figure, as the measurement process, first, light under measurement is incident on the device in Step 1301. Here, when the aim of measurement is to examine the SOP associated with transmission and reflection of the light through and on the sample 400, first, the sample 400 is irradiated with light whose SOP is known, and then the light transmitted through or reflected on the sample 400 is incident on the device (photo-receiving side unit 300: polarimeter).

Next in Step 1302, the spectral intensity of the transmitted light is measured with the spectrometer 304. Here, the shutter 205 can be utilized for reduction in influence of unnecessary light, such as lost light. Specifically, the spectrum of the unnecessary light can be canceled out by taking a difference in spectrum between when measured with the shutter open and when measured with the shutter closed.

Next in Step 1303, the spectral intensity of the transmitted light is forwarded from spectrometer 304 to the computer 305, to be provided to processing in the arithmetic processing part 305a.

Next in Step 1304, in the computer 305, the arithmetic processing part 305a acquires reference phase functions and reference amplitude functions from the memory part 305b.

Next in Step 1305, in the computer 305, the arithmetic processing part 305a calculates a reference phase function differences ($\Delta\phi_1$ and $\Delta\phi_2$) by the use of the measured spectral intensity, the reference phase functions and the reference amplitude functions.

Next in Step 1306, in the computer 305, the arithmetic processing part 305a calculates spectrometric Stokes parameters of the light under measurement by the use of the measured spectral intensity, the reference phase functions, the reference amplitude functions and the reference phase function differences.

Next in Step 1307, in the computer 305, the arithmetic processing part 305a outputs the spectrometric Stokes parameters of the light under measurement. Examples of the measurement result output part 305c may include a memory, a hard disc, and other processing part (calculating part for ellipticity angle, azimuth angle, etc.).

As described above, in the spectroscopic polarimetry of this example, spectrometric Stokes parameters regarding the light under measurement are calculated through the pre-calibration process shown in FIG. 12 and the measurement process shown in FIG. 13 in the system constitution shown in FIG. 11.

An example of specific experimental results is described with reference to FIGS. 14 to 19. In this experiment, the polarized light is measured while rising the temperatures of the first retarder 301 and the second retarder 302, to identify a temperature compensating property of the device in the example.

Figure 14:
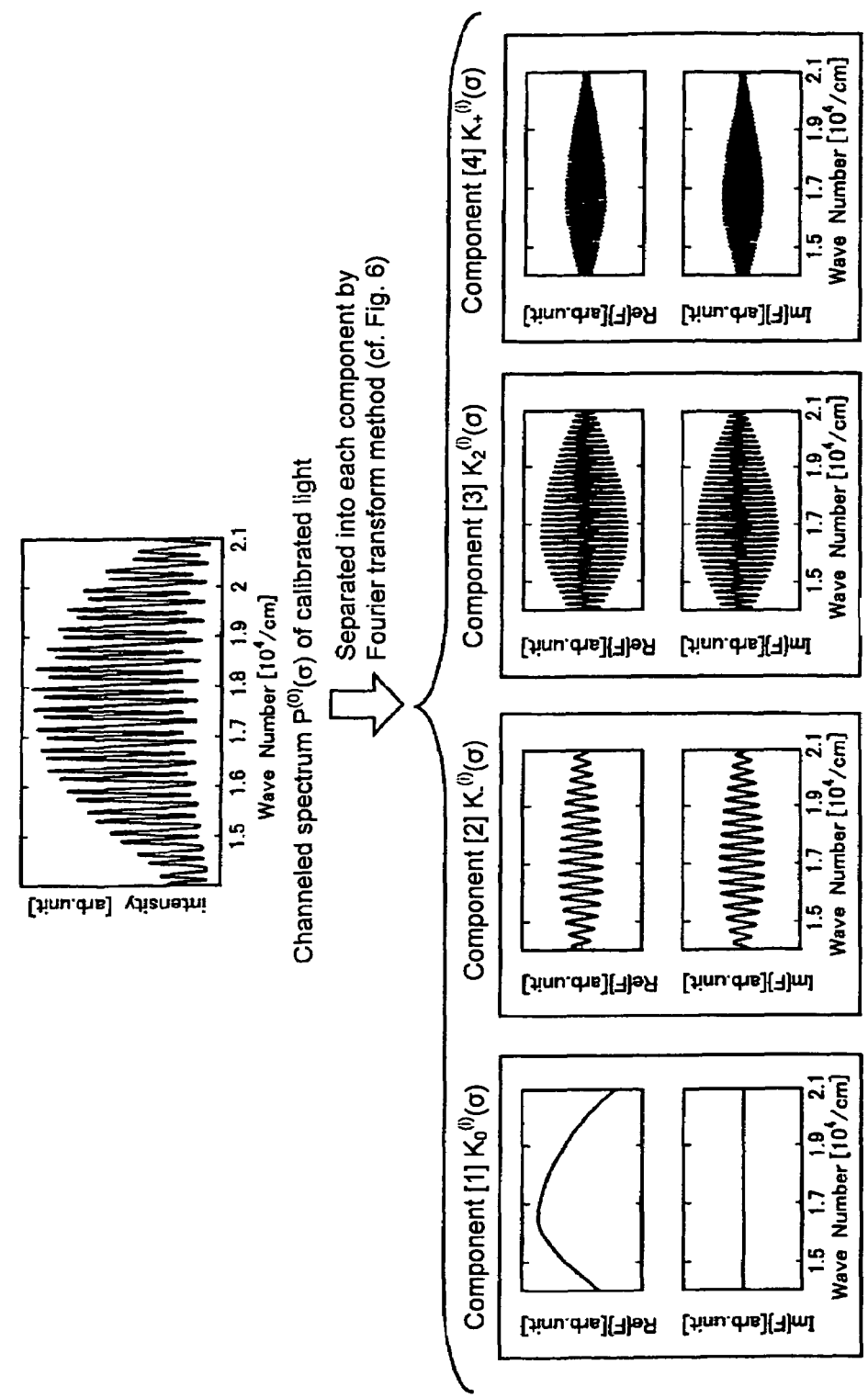
FIG. 14 shows a view of an example of experimental results (I. pre-calibration).

FIG. 14 shows an example of experimental results (I. pre-calibration). As shown in this figure, in pre-calibration, a channeled spectrum of calibrated light drawn on the central upper part of the figure is first acquired. This is separated by the Fourier transform method (cf. FIG. 6) into Components [1] to [4], to obtain reference complex functions. In FIG. 14, $K_0^{(i)}(\sigma)$, $K_-^{(i)}(\sigma)$, $K_2^{(i)}(\sigma)$, and $K_+^{(i)}$ are reference complex functions obtained in pre-calibration.

Figure 15:
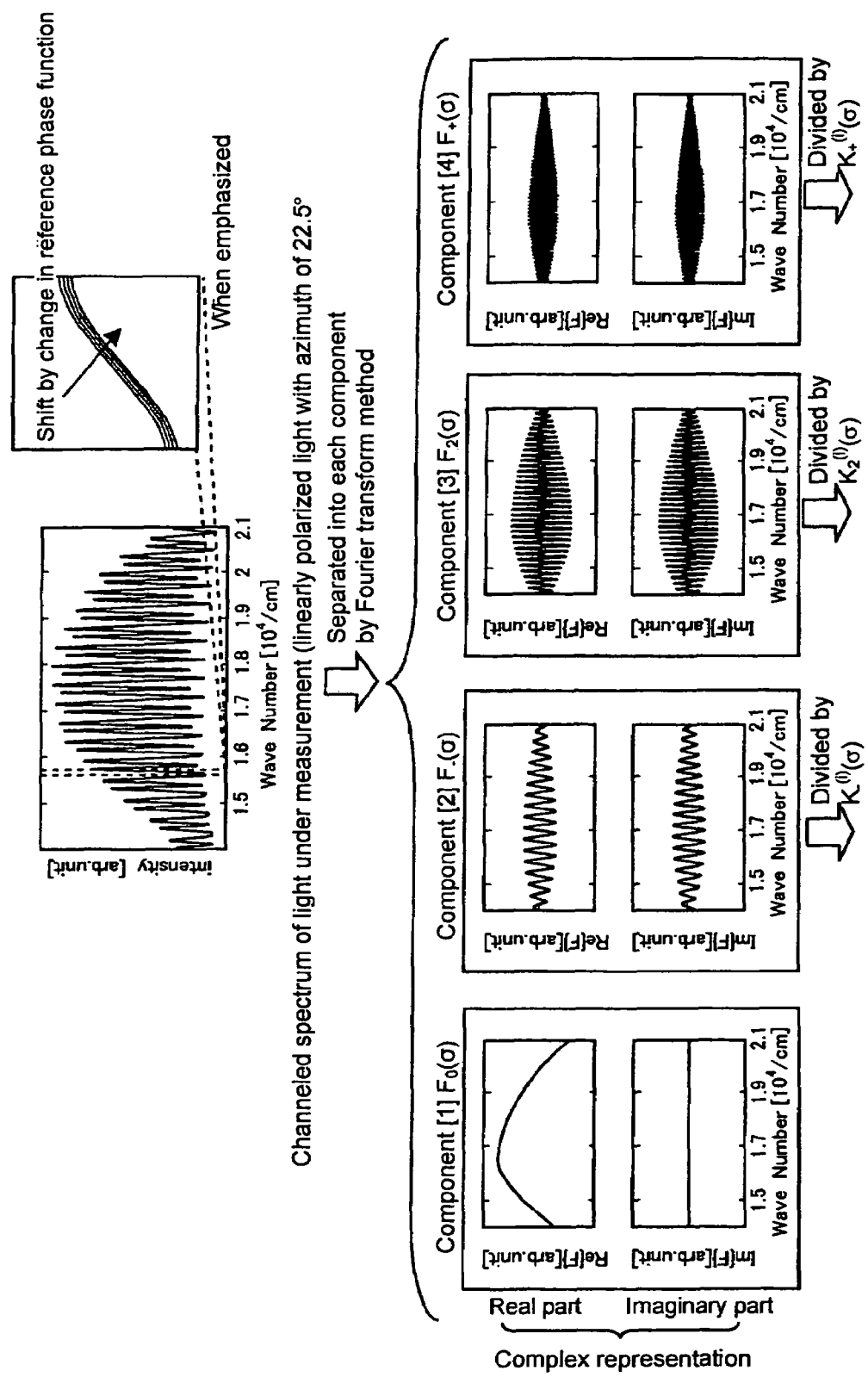
FIG. 15 shows a view of an example of experimental results (II. calculation of reference phase function differences) (No. 1).
Figure 16:
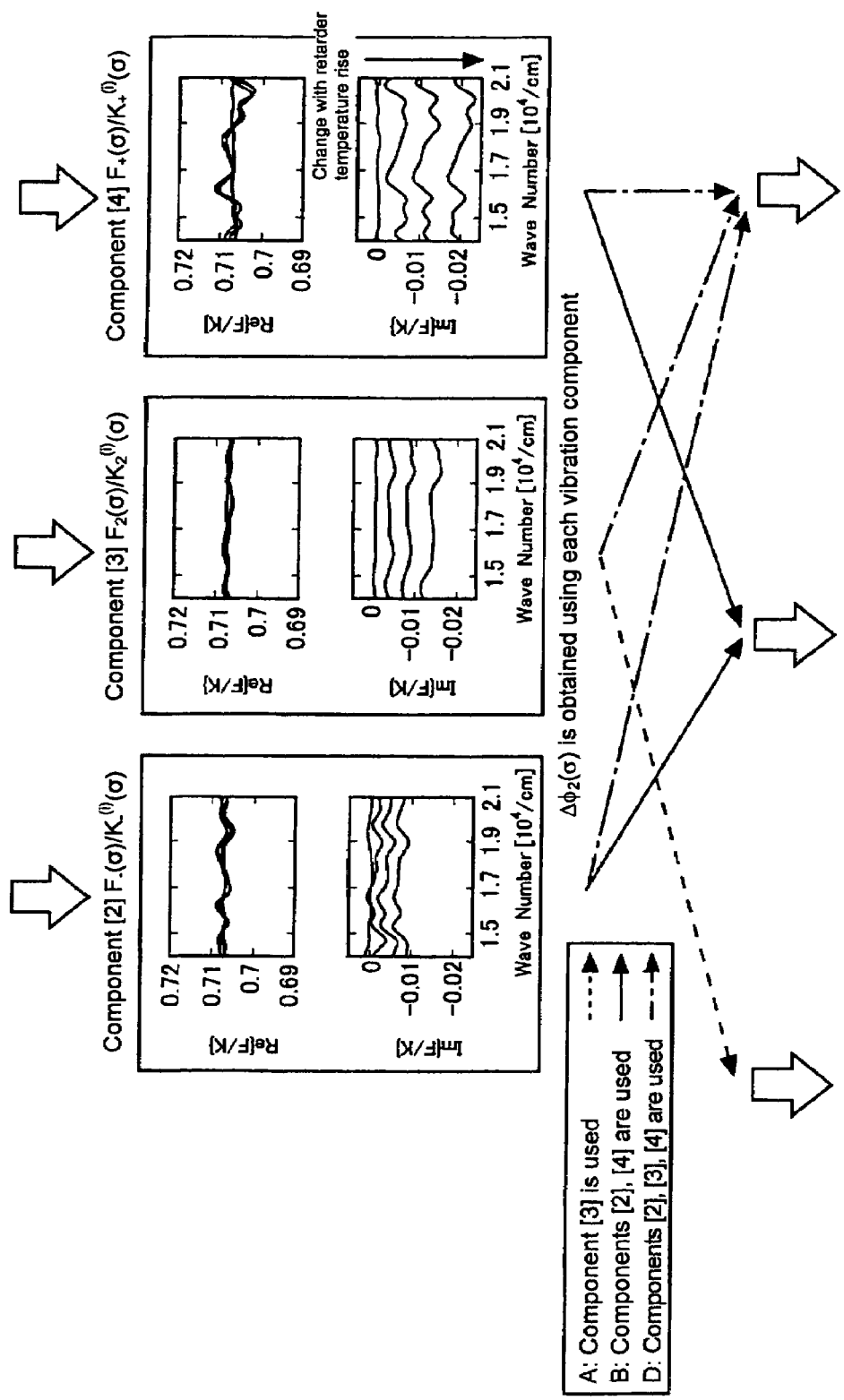
FIG. 16 shows a view of an example of experimental results (II. calculation of reference phase function differences) (No. 2).
Figure 17:
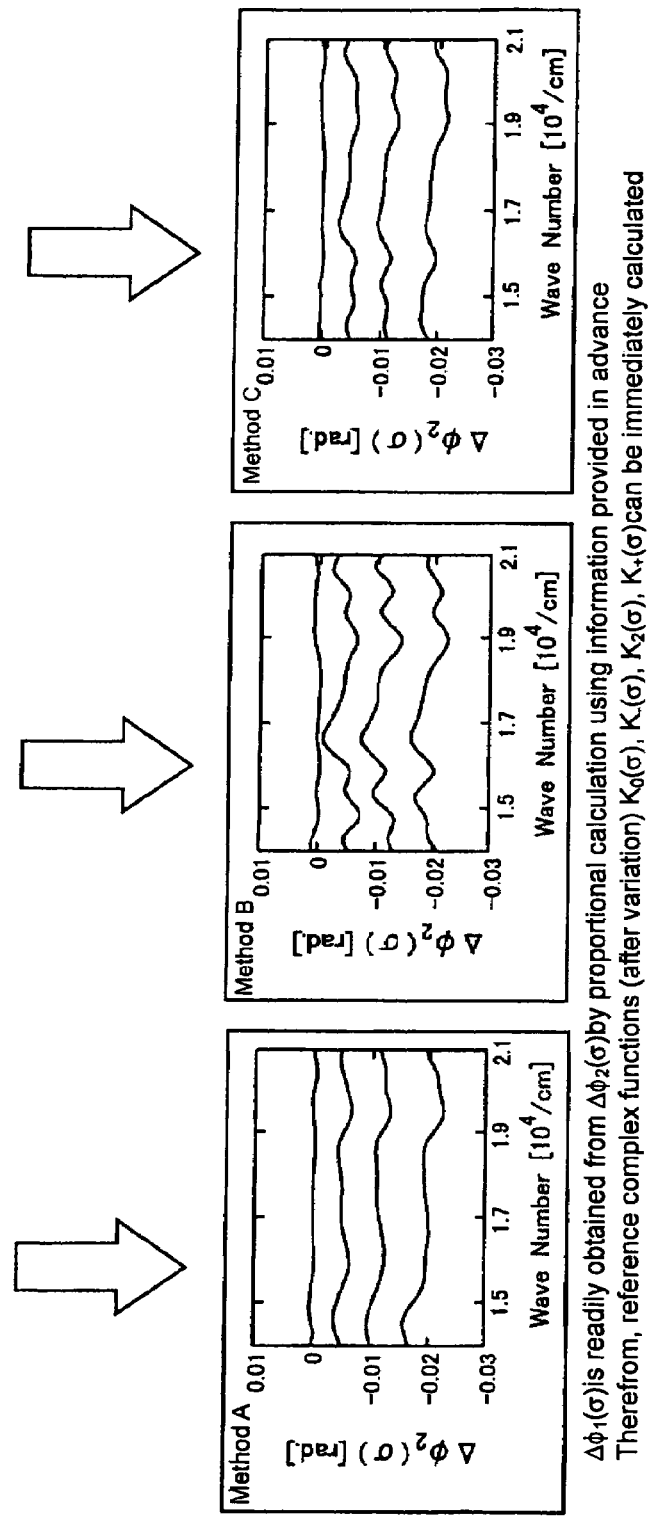
FIG. 17 shows a view of an example of experimental results (II. calculation of reference phase function differences) (No. 3).

FIGS. 15 to 17 show examples of experimental results (II. calculation of a reference phase function difference). In order to obtain the reference phase function difference, first, as shown in FIG. 15, a channeled spectrum of light under measurement (linearly polarized light with an azimuth of 22.5°) is separated by the Fourier transform method into components ([1] to [4]), and Component [2], [3] and [4] are divided respectively by the reference complex functions $K_-^{(i)}(\sigma)$, $K_2^{(i)}(\sigma)$, and $K_+^{(i)}$. In FIG. 16, $F_-(\sigma)/K_-^{(i)}(\sigma)$, $F_2(\sigma)/K_2^{(i)}(\sigma)$, and $F_+(\sigma)/K_+^{(i)}(\sigma)$ are division results (vibration components).

Subsequently, as shown in FIG. 16, $\Delta\phi_2(\sigma)$ is obtained through the use of each vibration component according to Methods A, B and D as shown in FIG. 17. Namely, $\Delta\phi_2(\sigma)$ is obtained by the use of Vibration Component [3] in Method A, by the use of Vibration Components [2] and [4] in Method B, and by the use of Vibration Components [2], [3] and [4] in Method D.

It is to be noted that $\Delta\phi_1(\sigma)$ can be readily obtained from $\Delta\phi_2(\sigma)$ by proportional calculation using information provided in advance. And therefrom, the reference complex functions $K_0(\sigma)$, $K_-(\sigma)$, $K_2(\sigma)$, and $K_+(\sigma)$ after variations can be immediately calculated.

Figure 18:
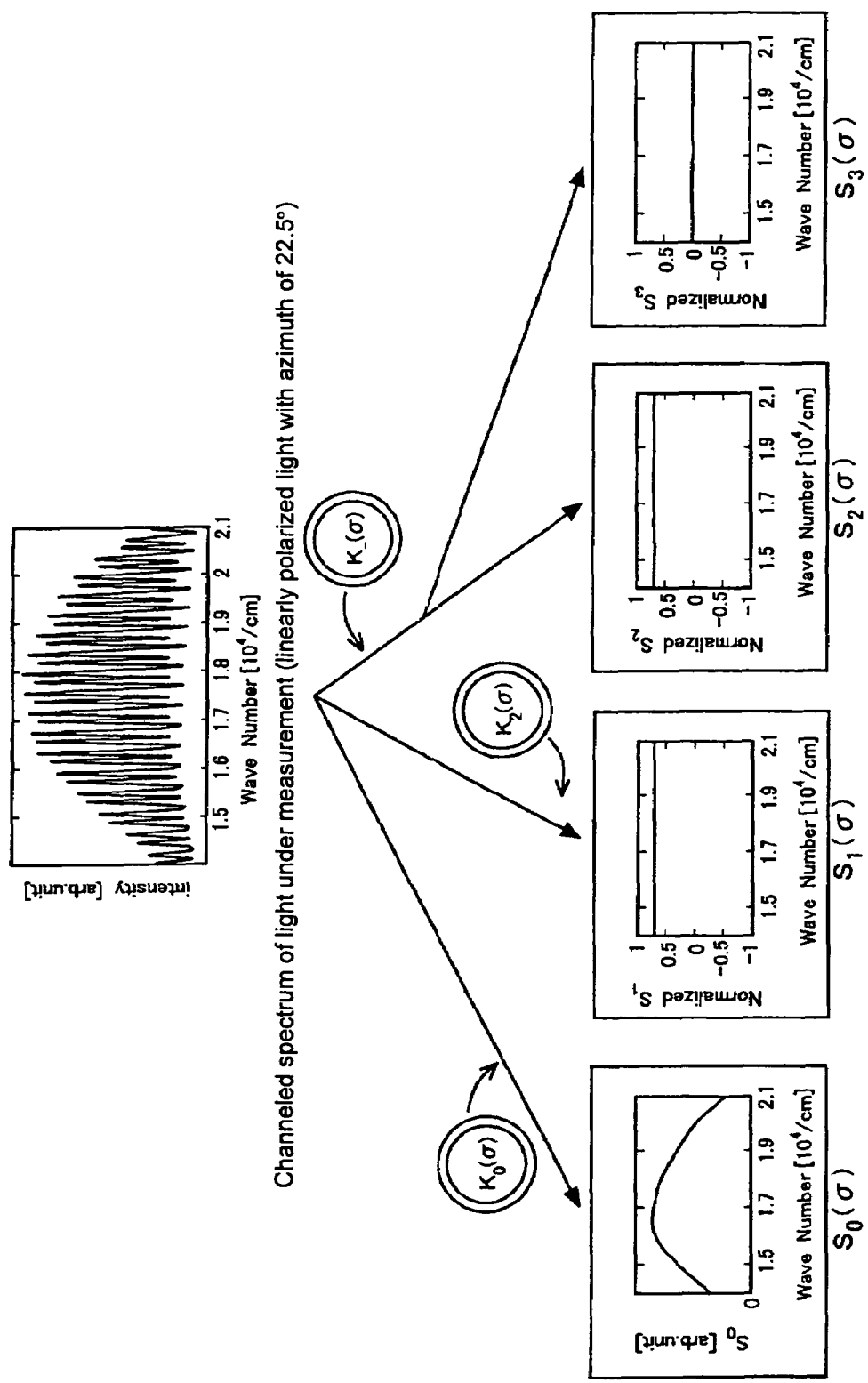
FIG. 18 shows a view of experimental results (III. demodulation of spectrometric Stokes parameters).

FIG. 18 shows an example of experimental results (III. demodulation of spectrometric Stokes parameters). As apparent from the figure, $S_0(\sigma)$, $S_1(\sigma)$, $S_2(\sigma)$, and $S_3(\sigma)$ can be obtained such that a channeled spectrum of light under measurement (linearly polarized light with an azimuth of 22.5°) is separated by the Fourier transform method into components [1] to [4], and concurrently with this, obtained reference complex functions $K_0(\sigma)$, $K_-(\sigma)$, $K_2(\sigma)$, and $K_+(\sigma)$ are applied as appropriate.

Figure 19:
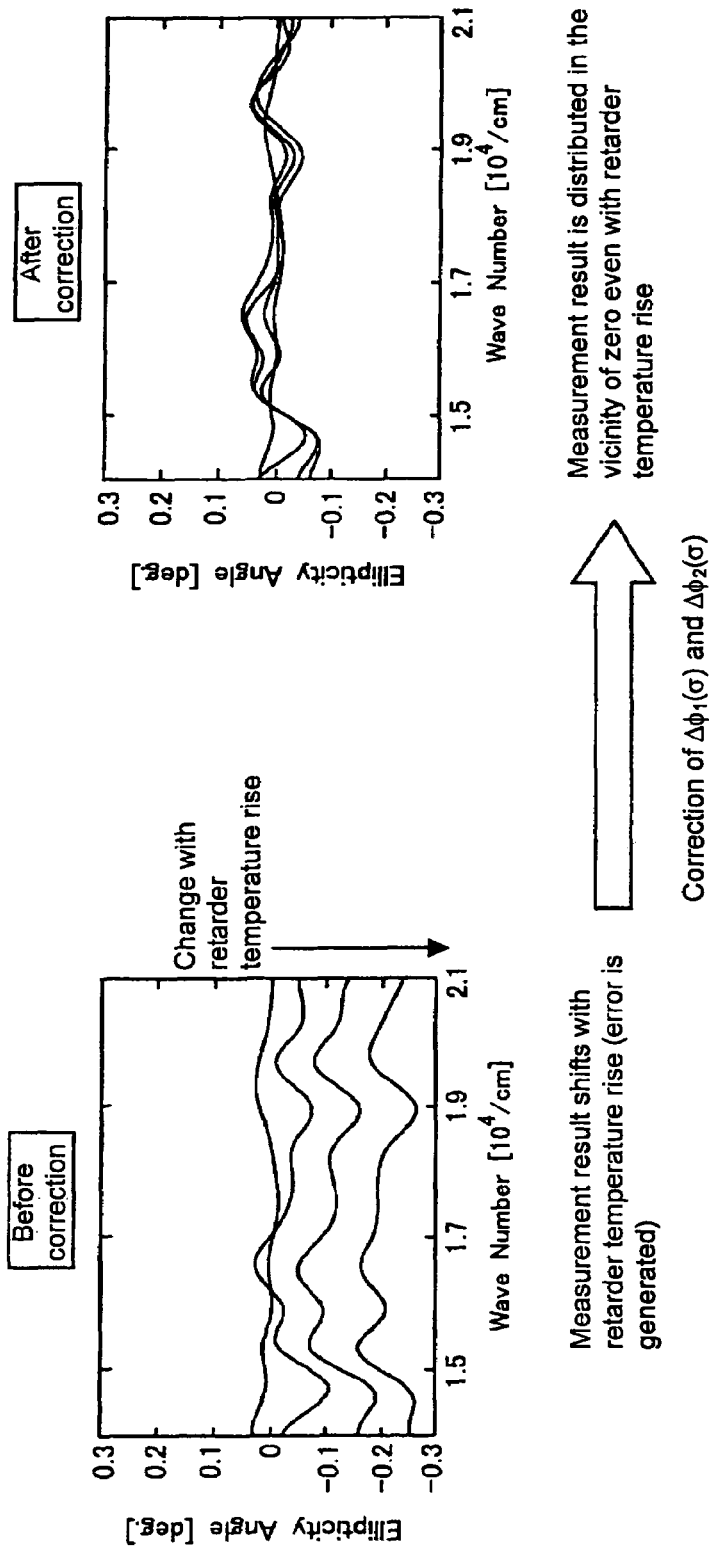
FIG. 19 shows a view of a result of demodulation of an SOP.
Figure 20:
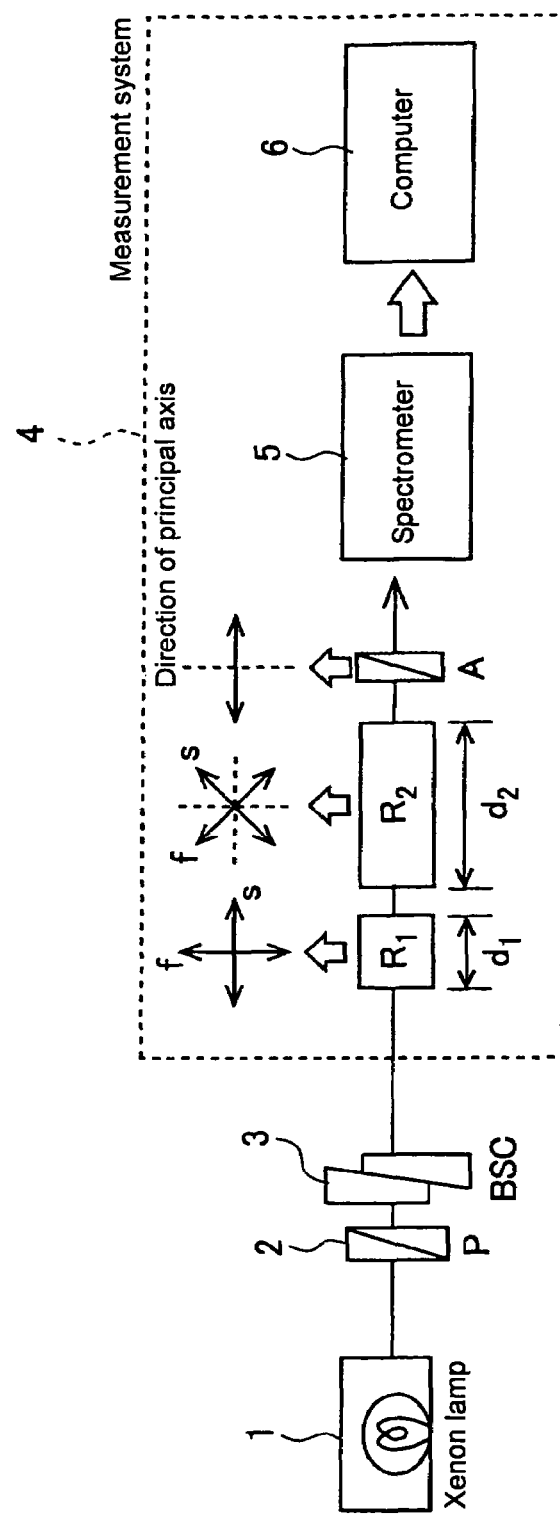
Figure 21:
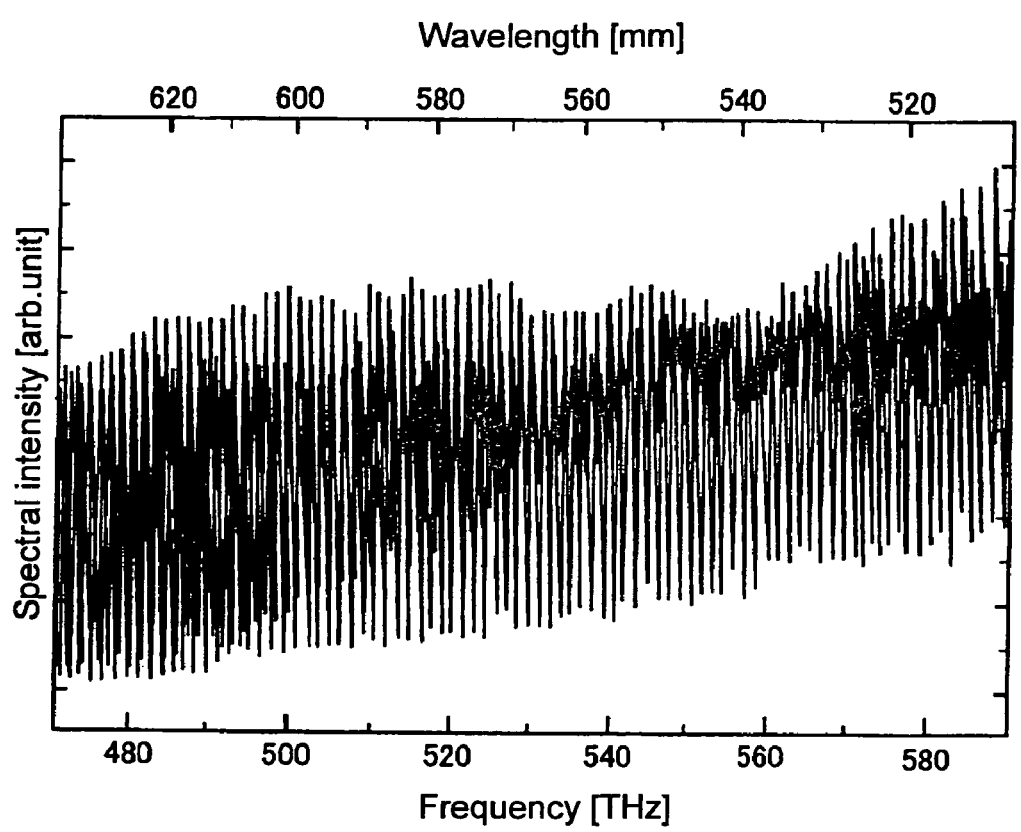
FIG. 21 shows a graph of a channeled spectrum in the experimental system.
Figure 22:
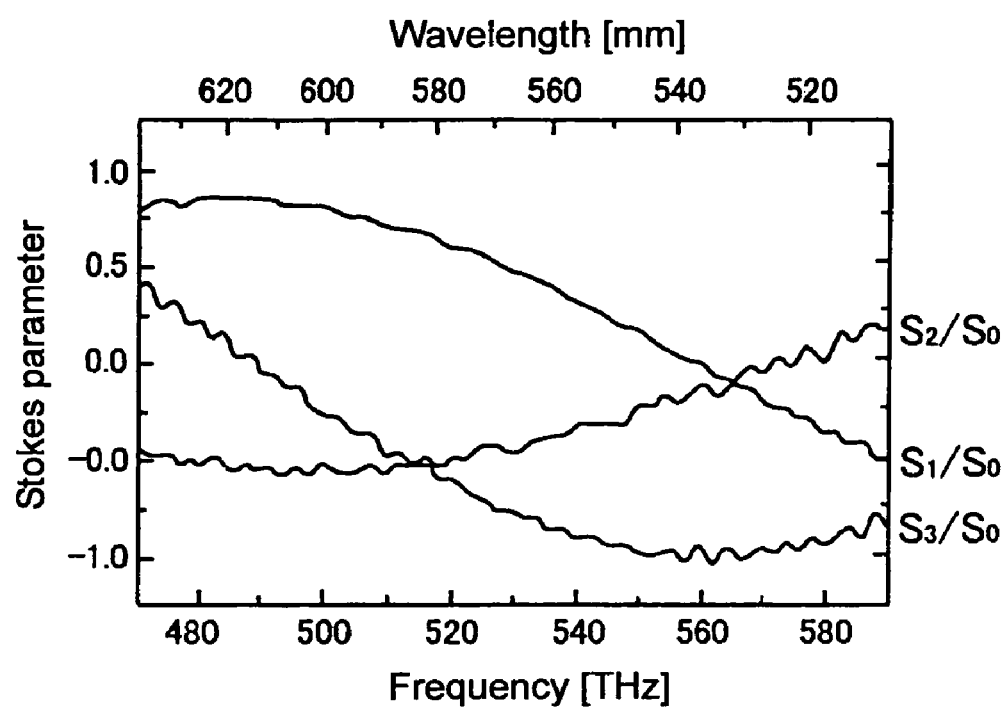
FIG. 22 shows a graph of a standardized Stokes parameter in the experimental system.

FIG. 19 shows a result of demodulation of the SOP. In this example, ellipticity angles before and after correction of $\Delta\phi_1(\sigma)$ and $\Delta\phi_2(\sigma)$ are shown. Since the light under measurement is linearly polarized light with an azimuth of 22.5°, the angle is ideally zero regardless of the wavenumber. As apparent from the figure, before measurement, the measurement result changes with a rise in temperature of the retarder as shown with the indicator in the figure. As opposed to this, after measurement, the measurement result is distributed in the vicinity of zero even with a rise in temperature of the retarder. It is therefore found that, in the spectroscopic polarimeter of the present invention, a stable measurement result can be obtained regardless of changes in temperature.

What is claimed is:

1. A spectroscopic polarimetry, comprising:
a step of preparing a polarimetric spectroscope, where
a first retarder, a second retarder and an analyzer, through which light under measurement passes in sequence, and a device for obtaining a spectral intensity of the light having passed through the analyzer are provided,
the second retarder is arranged such that the direction of a principal axis of the second retarder disagrees with the direction of a principal axis of the first retarder, and
the analyzer is arranged such that the direction of a transmission axis of the analyzer disagrees with the direction of the principal axis of the second retarder;
a step of launching the light under measurement into the polarimetric spectroscope to obtain a spectral intensity; and
an arithmetic step of obtaining a set of phase attribute functions of a measurement system, and also obtaining a parameter indicating a wavenumber-distribution of a state of polarization (SOP) of the light under measurement by the use of the above obtained spectral intensity, wherein
the set of phase attribute functions is a set of functions defined by properties of the polarimetric spectroscope, and includes a function depending upon at least a first reference phase function ($\phi_1(\sigma)$) as retardation of the first retarder and a function depending upon at least a second reference phase function ($\phi_2(\sigma)$) as retardation of the second retarder, and by those functions themselves, or by addition of another function defined by the properties of the polarimetric spectroscope, the set of phase attribute functions becomes a set of functions sufficient to determine a parameter indicating a wavenumber-distribution of the SOP of the light under measurement.

2. The spectroscopic polarimetry according to claim 1, wherein the analyzer is arranged such that the direction of the transmission axis of the analyzer forms an angle of 45° with respect to the direction of a fast axis of the second retarder.

3. The spectroscopic polarimetry according to claim 1, wherein,
in the arithmetic step,
the set of phase attribute functions is composed of the first reference phase function and the second reference phase function, and
data showing a relation between the first reference phase function and the second reference phase function is made available, and
the arithmetic step is a unit where,
by the use of the obtained spectral intensity, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the data showing the relation between the first reference phase function and the second reference phase function and each of the obtained spectral intensity components, the first reference phase function and the second reference phase function are obtained, and also the parameter indicating the wavenumber-distribution of the SOP is obtained.

4. The spectroscopic polarimetry according to claim 1, wherein, in the arithmetic step, the set of phase attribute functions is composed of a difference ($\Delta\phi_1(\sigma)$) of the first reference phase function from a reference value for calibration of the first reference phase function and a difference ($\Delta\phi_2\ \sigma$)) of the second reference phase function from a reference value for calibration of the second reference phase function, and the reference value ($\phi_1^{(i)}(\sigma)$) for calibration of the first reference phase function, the reference value ($\phi_2^{(i)}(\sigma)$) for calibration of the second reference phase function, and data showing a relation between the first reference phase function difference and the second reference phase function difference are made available, and the arithmetic step is a unit where, by the use of the obtained spectral intensity, a first spectral intensity component which nonperiodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and by the use of the reference value for calibration of the first reference phase function, the reference value for calibration of the second reference phase function, the data showing the relation between the first reference phase function difference and the second reference phase function difference, and each of the obtained spectral intensity components, the first reference phase function difference and the second reference phase function difference are obtained, and also the parameter indicating the wavenumber-distribution of the SOP is obtained.

5. The spectroscopic polarimetry according to claim 4, Further comprising a step of launching light for calibration, with known parameters each showing the wavenumber-distribution of the SOP, into the polarimetric spectroscope to obtain a spectral intensity for calibration, so as to obtain the reference value ($\phi_1^{(i)}(\sigma)$ for calibration of the first reference phase function and the reference value ($\phi_2^{(i)}(\sigma)$) for calibration for the second reference phase function by the use of each of the parameters showing the wavenumber-distribution of the SOP of the light for calibration and the obtained spectral intensity for calibration, whereby these reference values for calibration are made available.

6. The spectroscopic polarimetry according to claim 4, further comprising a step of launching light for calibration, with known parameters each showing the wavenumber-distribution of the SOP, into the polarimetric spectroscope to obtain a spectral intensity for calibration, so as to obtain the reference value ($\phi_1^{(i)}(\sigma)$) for calibration of the first reference phase function and the reference value ($\phi_2^{(i)}(\sigma)$) for calibration for the second reference phase function, and the data showing the relation between the first reference phase function difference and the second reference phase function difference, by the use of each of the parameters showing the wavenumber-distribution of the SOP of the light for calibration and the obtained spectral intensity for calibration, whereby these values are made available.

7. The spectroscopic polarimetry according to claim 3, further comprising a step of launching light for calibration, with known parameters each showing the wavenumber-distribution of the SOP, into the polarimetric spectroscope to obtain a spectral intensity for calibration, so as to obtain the data showing the relation between the first reference phase function and the second reference phase function by the use of each of the parameters showing the wavenumber-distribution of the SOP of the light for calibration and the obtained spectral intensity for calibration, whereby the data showing the relation between the first reference phase function and the second reference phase function is made available.

8. The spectroscopic polarimetry according to claim 5, wherein the light for calibration is a linearly polarized light.

9. The spectroscopic polarimetry according to claim 7, wherein the light for calibration is a linearly polarized light.

10. The spectroscopic polarimetry according to claim 1, wherein, in the arithmetic step, a value of each element of a generalized inverse matrix of a matrix is made available such that a relation is formed where a first vector including information on the wavenumber-distribution of the spectral intensity is expressed by a product of the matrix and a second vector including information on the wavenumber-distribution of the SOP of the light under measurement and information on the set of the phase attribute function, and the arithmetic step is a unit where a value of each element of the first vector is specified by the use of the obtained spectral intensity, a value of each element of the second vector is obtained by calculation of a product of the generalized inverse matrix and the first vector, and by the use of the value of the element included in the second vector, the set of phase attribute functions is obtained, and also the parameter showing the wavenumber-distribution of the SOP of the light under measurement is obtained.

11. The spectroscopic polarimetry according to claim 10, wherein, in the arithmetic step, the set of phase attribute functions is composed of a difference ($\Delta\phi_1(\sigma)$) of the first reference phase function from a reference value for calibration of the first reference phase function and a difference ($\Delta\phi_2(\sigma)$) of the second reference phase function from a reference value for calibration of the second reference phase function, data showing a relation between the first reference phase function difference and the second reference phase function difference is made available, and further the generalized inverse matrix of the matrix, obtained from the reference value ($\phi_1^{(i)}(\sigma)$) for calibration of the first reference phase function and the reference value ($\phi_2^{(i)}(\sigma)$) for calibration for the second reference phase function, is made available, and the arithmetic step is a unit where
a value of each element of the first vector is specified by the use of the obtained spectral intensity,
a value of each element of the second vector is obtained by calculation of a product of the generalized inverse matrix and the first vector, and
by the use of the value of the element included in the second vector and the data showing the relation between the first reference phase function difference and the second reference phase function difference, the first reference phase function difference and the second reference phase function difference are obtained, and also the parameter showing the wavenumber-distribution of the SOP is obtained.

12. A spectroscopic polarimeter, comprising:
a polarimetric spectroscope in which
a first retarder, a second retarder and an analyzer, through which light under measurement passes in sequence, and a device for obtaining a spectral intensity of the light having passed through the analyzer are provided,
the second retarder is arranged such that the direction of a principal axis of the second retarder disagrees with the direction of a principal axis of the first retarder, and
the analyzer is arranged such that the direction of a transmission axis of the analyzer disagrees with the direction of the principal axis of the second retarder; and
an arithmetic unit for obtaining a set of phase attribute functions of a measurement system, and also obtaining a parameter indicating a wavenumber-distribution of a state of polarization (SOP) of the light under measurement by the use of the spectral intensity obtained by launching the light under measurement into the polarimetric spectroscope, wherein
the set of phase attribute functions is a set of functions defined by properties of the polarimetric spectroscope, and includes a function depending upon at least a first reference phase function ($\phi_1(\sigma)$) as retardation of the first retarder and a function depending upon at least a second reference phase function ($\phi_2(\sigma)$) as retardation of the second retarder, and by those functions themselves, or by addition of another function defined by the properties of the polarimetric spectroscope, the set of phase attribute functions becomes a set of functions sufficient to determine a parameter indicating a wavenumber-distribution of the SOP of the light under measurement.

13. The spectroscopic polarimeter according to claim 12, wherein the analyzer is arranged such that the direction of the transmission axis of the analyzer forms an angle of 45° with respect to the direction of a fast axis of the second retarder.

14. The spectroscopic polarimeter according to claim 12, wherein,
in the arithmetic unit,
the set of phase attribute functions is composed of the first reference phase function and the second reference phase function, and
data showing a relation between the first reference phase function and the second reference phase function is made available, and
the arithmetic unit is a unit where,
by the use of the spectral intensity obtained by launching the light under measurement into the polarimetric spectroscope, a first spectral intensity component which non-periodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and
by the use of the data showing the relation between the first reference phase function and the second reference phase function and each of the obtained spectral intensity components, the first reference phase function and the second reference phase function are obtained, and also the parameter indicating the wavenumber-distribution of the SOP is obtained.

15. The spectroscopic polarimeter according to claim 12, wherein,
in the arithmetic unit,
the set of phase attribute functions is composed of a difference ($\Delta\phi_1(\sigma)$) of the first reference phase function from a reference value for calibration of the first reference phase function and a difference ($\Delta\phi_2(\sigma)$) of the second reference phase function from a reference value for calibration of the second reference phase function, and
the reference value ($\phi_1^{(i)}(\sigma)$) for calibration of the first reference phase function, the reference value ($\phi_2^{(i)}(\sigma)$) for calibration of the second reference phase function, and data showing a relation between the first reference phase function difference and the second reference phase function difference are made available, and
the arithmetic unit is a unit where,
by the use of the spectral intensity obtained by launching the light under measurement into the polarimetric spectroscope, a first spectral intensity component which non-periodically vibrates with wavenumber and a third spectral intensity component which vibrates with wavenumber at a frequency depending upon a second reference phase function and not depending upon the first reference phase function are obtained, and at least one of a second spectral intensity component which vibrates with wavenumber at a frequency depending upon a difference between the first reference phase function and the second reference phase function, a fourth spectral intensity component which vibrates with wavenumber at a frequency depending upon a sum of the first reference phase function and the second reference phase function, and a fifth spectral intensity component which vibrates with wavenumber at a frequency depending upon the first reference phase function and not depending upon the second reference phase function is obtained, and
by the use of the reference value for calibration of the first reference phase function, the reference value for calibration of the second reference phase function, the data showing the relation between the first reference phase function difference and the second reference phase function difference, and each of the obtained spectral intensity components, the first reference phase function difference and the second reference phase function difference are obtained, and also the parameter indicating the wavenumber-distribution of the SOP is obtained.

16. The spectroscopic polarimeter according to claim 12, wherein, in the arithmetic unit, a value of each element of a generalized inverse matrix of a matrix is made available such that a relation is formed where a first vector including information on the wave-number-distribution of the spectral intensity is expressed by a product of the matrix and a second vector including information on the wavenumber-distribution of the SOP of the light under measurement and information on the set of the phase attribute function, and the arithmetic unit is a unit where a value of each element of the first vector is specified by the use of the spectral intensity obtained by launching the light under measurement into the polarimetric spectroscope, a value of each element of the second vector is obtained by calculation of a product of the generalized inverse matrix and the first vector, and by the use of the value of the element included in the second vector, the set of phase attribute functions is obtained, and also the parameter showing the wavenumber-distribution of the SOP of the light under measurement is obtained.

17. The spectroscopic polarimeter according to claim 16, wherein, in the arithmetic unit, the set of phase attribute functions is composed of a difference ($\Delta\phi_1(\sigma)$) of the first reference phase function from a reference value for calibration of the first reference phase function and a difference ($\Delta\phi_2(\sigma)$) of the second reference phase function from a reference value for calibration of the second reference phase function, data showing a relation between the first reference phase function difference and the second reference phase function difference is made available, and further the generalized inverse matrix of the matrix, obtained from the reference value ($\phi_1^{(i)}(\sigma)$) for calibration of the first reference phase function and the reference value ($\phi_2^{(i)}(\sigma)$) for calibration for the second reference phase function, is made available, and the arithmetic unit is a unit where a value of each element of the first vector is specified by the use of the spectral intensity obtained by launching the light under measurement into the polarimetric spectroscope, a value of each element of the second vector is obtained by calculation of a product of the generalized inverse matrix and the first vector, and by the use of the value of the element included in the second vector and the data showing the relation between the first reference phase function difference and the second reference phase function difference, the first reference phase function difference and the second reference phase function difference are obtained, and also the parameter showing the wavenumber-distribution of the SOP is obtained.

* * * * *